United States Patent
Wohlwend et al.

(10) Patent No.: US 11,972,448 B1
(45) Date of Patent: *Apr. 30, 2024

(54) METHOD AND SYSTEM FOR ENTRY AND DISPLAY OF CUSTOMER EXPERIENCE FEEDBACK WITH REAL-TIME AUTOMATED FILTERING AND EVALUATION OF FEEDBACK, TRANSMISSION OF REAL-TIME NOTIFICATION TO SELECTED PERSONNEL BASED ON FEEDBACK EVALUATION IN A FLEXIBLE MESSAGING AND WORKFLOW SYSTEM, AND FOLLOW-UP SURVEY CONSUMER EVALUATIONS

(71) Applicant: Westwood Capital Partners, Inc., Plano, TX (US)

(72) Inventors: Jeffrey L. Wohlwend, Plano, TX (US); Matthew L. Berg, McKinney, TX (US)

(73) Assignee: Westwood Capital Partners, Inc., Plano, TX (US)

( * ) Notice: Subject to any disclaimer, the term of this patent is extended or adjusted under 35 U.S.C. 154(b) by 363 days.

This patent is subject to a terminal disclaimer.

(21) Appl. No.: 17/396,620

(22) Filed: Aug. 6, 2021

Related U.S. Application Data

(63) Continuation of application No. 15/887,265, filed on Feb. 2, 2018, now Pat. No. 11,087,341, which is a
(Continued)

(51) Int. Cl.
*G06Q 30/02* (2023.01)
*G06F 16/955* (2019.01)
(Continued)

(52) U.S. Cl.
CPC ..... *G06Q 30/0203* (2013.01); *G06F 16/9566* (2019.01); *G06Q 30/0281* (2013.01);
(Continued)

(58) Field of Classification Search
None
See application file for complete search history.

(56) References Cited

U.S. PATENT DOCUMENTS

2013/0041720 A1 2/2013 Spires
2013/0054328 A1 2/2013 Chavie et al.
(Continued)

OTHER PUBLICATIONS

International Searching Authority: Notification of Transmittal of International Search Report, Written Opinion of Int'l Searching Authority, or the Declaration dated Nov. 8, 2016.
(Continued)

*Primary Examiner* — Eric W Stamber
*Assistant Examiner* — Ashley Y Young
(74) *Attorney, Agent, or Firm* — Hemingway & Hansen, LLP; D. Scott Hemingway; Elizabeth P. Hartman

(57) ABSTRACT

The present invention supports the entry of customer experience feedback into the system, which then conducts real-time automated filtering and evaluation of feedback entered by the customer and supports the transmission of real-time notifications to selected personnel based on feedback evaluation in a flexible messaging and workflow system. The present invention supports that ability to obtain constructive feedback, either good or bad, regarding a customer's experience while the customer is still at the service provider or retail sales location. And, if the experience is negative, the invention provides automated evaluation and filtering of the feedback information with real-time notifications to selected personnel so the customer's concerns can be addressed immediately so as to rectify the negative experience with personal attention to the consumer, and preserve the client relationship for the future before the customer departs from the service provider or retail sales location. Identity information relating to the customer can also be preserved so that the customer and its location can be identified as being
(Continued)

present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience.

53 Claims, 53 Drawing Sheets

Related U.S. Application Data continuation-in-part of application No. 15/569,309, filed as application No. PCT/US2016/043773 on Jul. 23, 2016, now abandoned.

(60) Provisional application No. 62/290,362, filed on Feb. 2, 2016, provisional application No. 62/215,447, filed on Sep. 8, 2015, provisional application No. 62/198,908, filed on Jul. 30, 2015, provisional application No. 62/196,752, filed on Jul. 24, 2015.

(51) Int. Cl.
 *G06Q 30/0203* (2023.01)
 *G06Q 30/0282* (2023.01)
 *G06Q 30/06* (2023.01)
 *H04W 4/12* (2009.01)
 *G06Q 50/00* (2012.01)

(52) U.S. Cl.
 CPC ......... *G06Q 30/0282* (2013.01); *G06Q 30/06* (2013.01); *H04W 4/12* (2013.01); *G06Q 50/01* (2013.01)

(56) References Cited

U.S. PATENT DOCUMENTS

2013/0339270 A1 12/2013 Singh
2013/0346155 A1 12/2013 Briggs
2014/0006310 A1 1/2014 Hamilton, II et al.

OTHER PUBLICATIONS

International Searching Authority: International Search Report dated Nov. 8, 2016.
International Searching Authority: Written Opinion of the International Searching Authority dated Nov. 8, 2016.

Demo

Ticket #: _____

Customer: [- - ▼] _____

Customer ID: _____ ← 358

Advisor: [--Select-- ▼] ⎫
⎬ 359
Cashier: [--Select-- ▼] ⎭

Active Delivery [Yes] [No] ⎫
⎬ 360
Valet Delivery [Yes] [No] ⎭

[Start Survey]    Declined

1. Fill out information from work order and press "Start Survey".

2. Please say the following to the customer
While I'm finishing your paperwork...would you please answer a few quick questions so we can improve our service for you...Thank You.

2. Hand the tablet to the customer
*Note: Hold Logo at the top for 2 seconds to reset program from any screen.*

FIG. 3C

Service Department

RO #: [_____] ⎯366

Customer: [--▼] [_____] ⎬365

Customer ID: [_____]

Email: [_____] ⎬364

Cell Phone: [_____]

Custom 1: [_____] ⎬363

Custom 2: [_____]

Advisor: [_____▼] ⎬362

Cashier: [_____▼]

Active Delivery [Yes] [No] ⎬361

Valet Delivery [Yes] [No]

367 → [Start]   Declined

Fill out Information Fields

Press "Start"

*NEW ENTRY: Press/Hold Logo at the top for 2 seconds to reset program from any screen for a new entry*

Logout

FIG. 3C1

Español

1. Based on your experience today how likely is it that you would recommend our dealership to a friend or colleague?

[0] [1] [2] [3] [4] [5] [6] [7] [8] [9] [10]

Poor/Not Likely　　　　　　　　　　　　Excellent/Very Likely

2. Are you likely to return for service in the future at Smith's Ford?

[No]　[Yes]

3. Would you be willing to share your service experience on social media?

[Poor]　[Fair]　[Good]　[Very Good]　[Excellent]

4. Would you like your name entered in a weekly drawing for a gift certificate?

⎫
⎬ 370
⎭

[Submit]

FIG. 3D

371 — Thank You Mr. Smith!

Questions                                           John Smith ▼

Current Questions

| # | Question | Answer Format | Notification | |
|---|---|---|---|---|
| | | | | ADD |
| 1 | How would you rate your overall service experience? | Rating 0 (Poor/Not likely) - 10 (Excellent/Likely) | on | Edit |
| 2 | Are you likely to return for service in the future at our dealership? | Yes/No | off | Edit |
| 3 | Would you be willing to share your service experience if we email you links to our review sites? | Yes/No | on | Edit |
| 4 | Will you be filling out the manufacturer emailed survey regarding today's service experience? | Yes/No | off | Edit |

Archived Questions

| Question | Answer Format | Date Archived |
|---|---|---|
| Based on your experience today, how likely is it that you would recommend our dealership to a friend or colleague? | Rating 0 (Poor/Not likely) - 10 (Excellent/Likely) | 2016-06-03 19:06:53 |
| Did our service staff go out of the way to make you feel like a valued client? | Yes/No | 2016-06-03 19:04:07 |
| If (mfg) emails you a survey about your service experience would you be willing to fill it out? | Yes/No | 2016-03-11 17:10:51 |
| The email survey is the one that counts for our national ranking. The most positive answers to the questions are on the far right of the page. will you please take the email survey if offered? | Yes/No | 2016-03-11 17:09:21 |

TRELA 360                                                                                  John Smith ▼

Edit DCS Question ⓘ                                                              << Back to Questions 531a {
  Question (English) *
  [ How would you rate your overall customer service experience? ]
  Question (Spanish) *
  [ ¿Cómo calificaría su experiencia general de servicio al cliente? ]
}

532a → Answer Format *
[ Rating 0 (Poor/Not likely) -10 (Excellent/Likely) ▲▼ ]

533a → Alert Users * ⦿ Yes ○ No
When the Customer answers *
534a { ☑ 0 (Poor/Not Likely) ☑ 1 ☐ 2 ☐ 3 ☐ 4 ☐ 5 ☐ 6 ☐ 7 ☐ 8 ☐ 9 ☐ 10 (Excellent/Likely)
Alert the following *
535a { ☑ Janice Jones
       ☑ John Smith 535b → Alert Team * ⦿ Yes ○ No
When the Customer answers *
535c { ☑ 0 (Poor/Not Likely) ☑ 1 ☐ 2 ☐ 3 ☐ 4 ☑ 5 ☑ 6 ☑ 7 ☑ 8 ☑ 9 ☑ 10 (Excellent/Likely)
Alert the following *
535d { ☑ Advisors
       ☑ Cashiers 536a → Customer answer required * ⦿ Yes ○ No
538b → Use for TrelaRating * ⦿ Yes ○ No
538c { [ Save ] [ Cancel ]                                                           [ Archive/Delete ]
* indicates required field

TRELA 360  Trela Tech  Notification Status (on)  John Smith ▼

Edit User (?)  << Back to Users Screen

First Name *
544 — [Demo]

Last Name *
541 — [Account]

Email/Login *
545 — [demo@trelatech.com]

Phone/Text *
542 — [(972)555-9893]

543b ⎰ ☐ used for email alerts
     ⎱ ☐ used for email messages

543a ⎰ ☑ used for text alerts
     ⎱ ☑ used for text messages

Notification Status *
546 ⎰ ○ On ◉ Off

Notify the following *
547 ⎰ ☑ Service  ☑ Demo  ☑ New Car

Access/Permissions
548 ⎰ ☑ Users  ☑ Team  ☑ Reports  ☐ Questions  ☑ Maintenance  ☑ Messages New Password
549 — [                    ]

Confirm Password
[                    ]

minimum 8 characters

542a ⎰ [Save] [Cancel]                                    [Delete]
     ⎱ * indicates required field

TRELA 360  Auto Group  Notification Status (on)  John Smith ▼

<< Back to Users Screen

Edit User (?)

544a — First Name *
John

Last Name *
541a — Smith

545a — Email/Login *
johnsmith@autogroup.com

Phone/Text *
542a — (555)555-5555

543c {
☑ used for email DCS Alerts    ☑ used for text DCS Alerts
☑ used for email DCS Usage Alerts    543d { ☑ used for text DCS Usage Alerts
☑ used for email CRS Alerts    ☑ used for text CRS Alerts
☑ used for email CSC Alerts    ☑ used for text CSC Alerts
☑ used for email Messages    ☑ used for text Messages
}

546a { Notification Status *
⦿ On  ○ Off

547a {
ON for the following DCS questions:
1. How would you rate your overall customer service experience?
ON for the following CRS questions:
1. How would you rate your overall customer service experience?

Departments *
547b { ☑ Service Department  ☑ Sales Department

Access/Permissions
☑ Users  ☑ Team  ☑ Reports  ☑ Questions  ☑ Maintenance  ☑ Messages  ☑ DCS App  ☑ CRS  ☑ TrelaRating 549a — New Password
minimum 8 characters Confirm Password 542b — [Save] [Cancel]
* indicates required field TRELA 360 — John Smith ▼

Edit Team Member

551 — First Name *  Jason
552 — Last Name *  Bishop
553 — Type *  ⦿ Advisor  ○ Cashier
554 — NOTIFICATION STATUS  ⦿ On  ○ Off
555 — Email  jbishop@boburrerford.com
        ☐ used for email notifications
556 — Phone/Text  (903)555-2567
        ☑ used for text notifications
557 — Active  ⦿ Yes  ○ No
558 — Save  Cancel
* indicates required field Delete

TRELA 360   Auto Group   Notification Status (on)   John Smith ▼

Edit Advisor (?)

- 551a — Name *
  - Advisor 1

- 552a — Email/Login *
  - advisor1@autogroup.com

- 553a
  - ☑ used for email DCS Alerts
  - ☑ used for email CRS Alerts
  - ☑ used for email CSC Alerts
  - ☑ used for email Messages

- 552b — Cell Phone
  - (555)123-4567

- 553b
  - ☑ used for text DCS Alerts
  - ☑ used for text CRS Alerts
  - ☑ used for text CSC Alerts
  - ☑ used for text Messages

- 554a — Notification Status *
  - ● On  ○ Off

- 556a — Access/Permissions
  - ☑ DCS App

- 557a — Password has been set
  - New Password
  - *minimum 8 characters*

- 557b — Confirm Password

- 558a — [Save] [Cancel]   * indicates required field

[Delete]

FIG. 5G

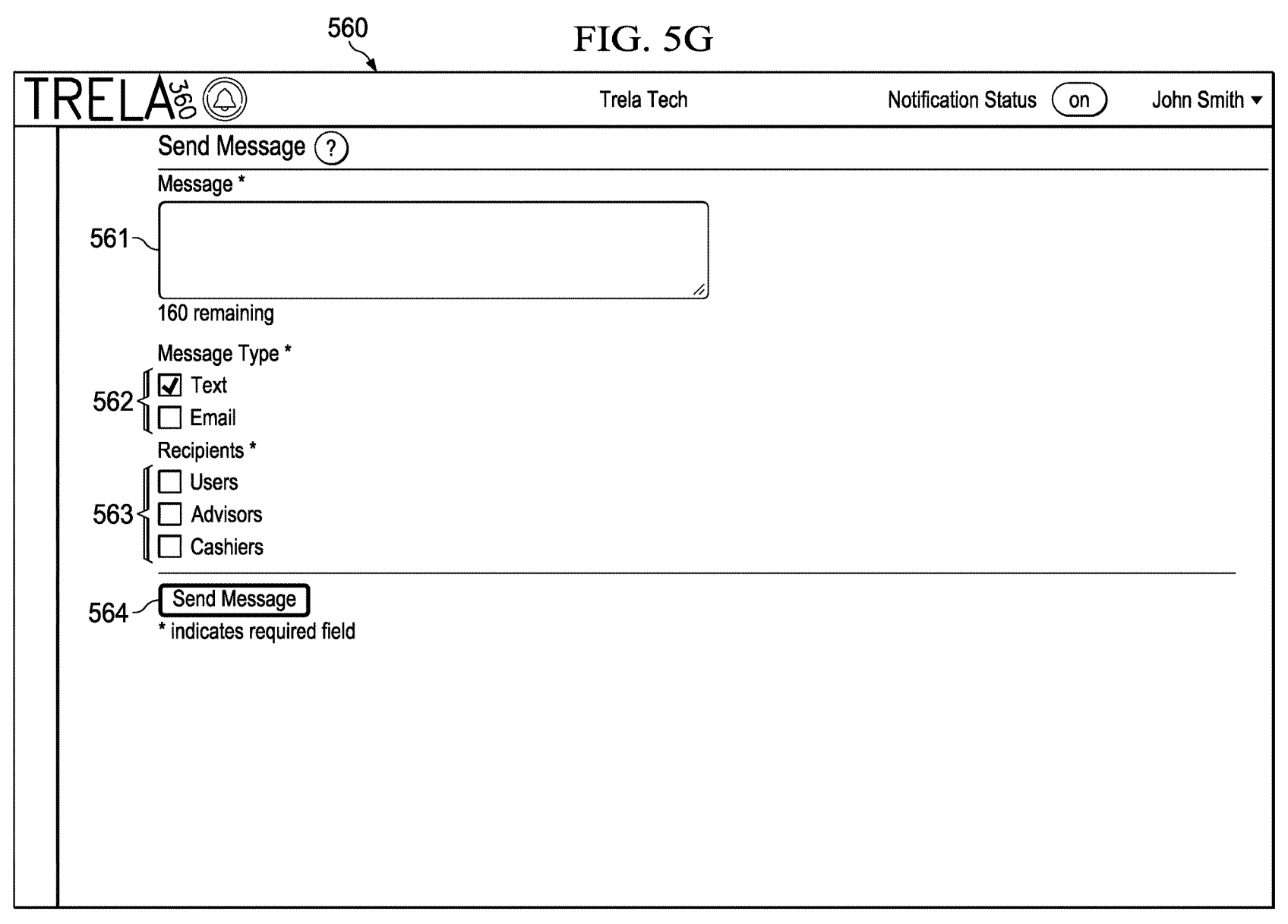

TRELA 360 | Trela Tech | Notification Status (on) | John Smith ▸

Send Message (?)

Message *

561

160 remaining

Message Type *
562 ☑ Text
    ☐ Email

Recipients *
563 ☐ Users
    ☐ Advisors
    ☐ Cashiers

564 [Send Message]
* indicates required field

Trela Tech                                                                    John Smith ▼

Reports: Notifications ⓘ

| | Today | Yesterday | 3 day totals | 7 day totals | |
|---|---|---|---|---|---|
| .TTL Corporate | | | | | |
| Trela Tech - Service | 0 | 0 | 0 | 0 | Details |
| Trela Tech - Demo | 0 | 0 | 0 | 0 | Details |
| Trela Tech - New Car | 0 | 0 | 0 | 0 | Details |
| Acura | Today | Yesterday | 3 day totals | 7 day totals | |
| David McDavid Acura - Plano - Service | 25/41=61% ↑ | 0 | 36/55=65% | 51/77=66% | Details |
| David McDavid Acura - Plano - Collision | 0 | 0 | 0 | 0 | Details |
| Ford | Today | Yesterday | 3 day totals | 7 day totals | |
| Bob Utter Ford - Service | 0 | 0 | 0 | 0 | Details |
| Nissan | Today | Yesterday | 3 day totals | 7 day totals | |
| Trophy Nissan - Service | 0 | 0 | 0 | 0 | Details |
| Toyota | Today | Yesterday | 3 day totals | 7 day totals | |
| Toyota of Plano - Service | 142/145=98% ↑ | 0 | 407/434=94% | 990/1051=94% | Details |
| Unassigned | Today | Yesterday | 3 day totals | 7 day totals | |
| Crest Cadillac - Service | 0 | 0 | 0 | 0 | Details |

FIG. 6A

TRELA 360

CRS: Questions (?)    Auto Group    Notification Status (on)    John Smith ▶

| # | Question | Answer Format | Notification | |
|---|---|---|---|---|
| | | | | ADD — 635 |
| 1 | How would you rate your overall service experience??? | Rating 0 (Poor/Not likely) - 10 (Excellent/Likely) — 633 | on | Edit |
| 2 | Do you have any comments you would like to share with management about your experience??? | Comments — 634 | off | Edit |

637

View Archived Questions

Reorder — 632

TRELA 360     Auto Group     Notification Status (on)     John Smith ▶

620 ⟶

Edit CRS Question (?)     << Back to Questions

621 { Question (English) *
[ How would you rate your overall customer service experience? ]
Question (Spanish) *
[ ¿Cómo calificaría su experiencia general de servicio al cliente? ]

622 { Answer Format *
[ Rating 0 (Poor/Not likely) -10 (Excellent/Likely) ▾ ]

623 { Notify Users/Team *
● Yes ○ No

624 { When the Customer answers *
☑ 0 (Poor/Not Likely) ☑ 1 ☐ 2 ☐ 3 ☐ 4 ☐ 5 ☐ 6 ☐ 7 ☐ 8 ☐ 9 ☐ 10 (Excellent/Likely)

625 { Notify the following *
☐ Janice Jones
☑ John Smith
☑ Advisors
☑ Cashiers

626 { Customer answer required *
● Yes ○ No

627 { Use for TrelaRating*
● Yes ○ No

628 { [Save] [Cancel]     629 ⟶ [Archive/Delete]
* indicates required field

TRELA 360 — Auto Group — Notification Status (on) — John Smith ▶

CRS: Settings (?)

601 — Survey TrelaRating Question
*How would you rate your overall customer service experience?*

CRS Scheduling

602 ⎰ Automatically send CRS when the Customer answers:
    ⎱ ☐ 0 (Poor/Not Likely) ☐ 1 ☐ 2 ☐ 3 ☐ 4 ☑ 5 ☐ 6 ☐ 7 ☐ 8 ☐ 9 ☐ 10 (Excellent/Likely)
      ☐ Include Declined 603 ⎰ Manually (Survey App/Web) send CRS when the Customer answers:
    ⎱ ☐ 0 (Poor/Not Likely) ☑ 1 ☑ 2 ☐ 3 ☑ 4 ☐ 5 ☐ 6 ☐ 7 ☐ 8 ☐ 9 ☐ 10 (Excellent/Likely)
      ☑ Include Declined 604 — At the specified time interval: [ In 4 hours ▼ ]

605 — CRS TrelaRating Question
*How would you rate your overall customer service experience???*

606 ⎰ CRS Social Media
    ⎱ Include Social Media when the Customer answers the CRS TrelaRating Question above:
      ☐ 0 (Poor/Not Likely) ☐ 1 ☐ 2 ☐ 3 ☐ 4 ☐ 5 ☐ 6 ☐ 7 ☐ 8 ☑ 9 ☑ 10 (Excellent/Likely)

607 — [ Save ]

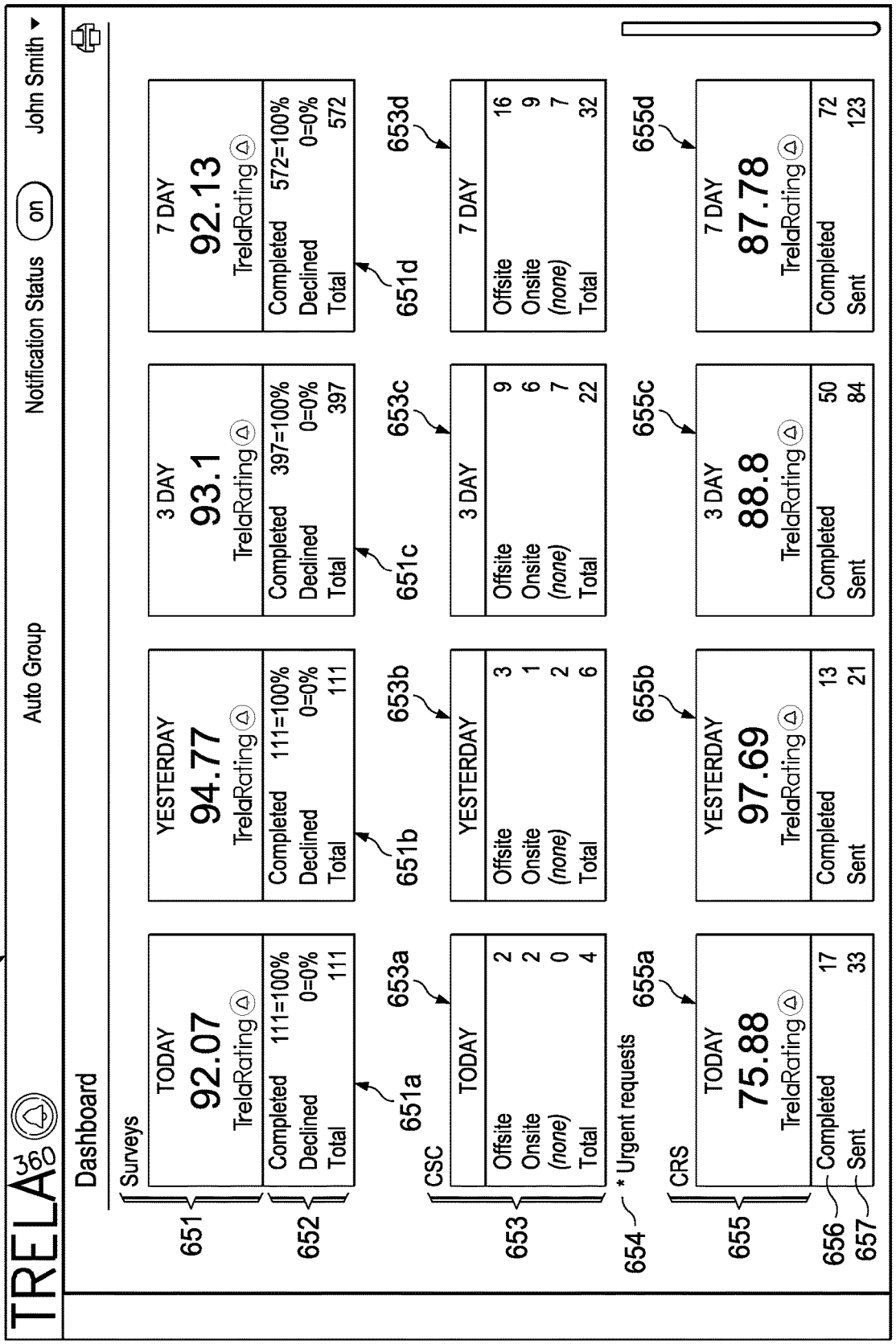
FIG. 6D1

TRELA 360  Auto Group  Notification Status (on)  John Smith ▼

Profile

First Name *
661 — John

Last Name *
662 — Smith

Email *
663 — john@smith.com

Cell Phone *
664 — (972) 555-5555
☑ used for notifications

665 {
☑ used for notifications
Notification Status *
⦿ On ○ Off
}

New Password
666 —
minimum 8 characters

Confirm Password
667 —

668 { [Save] [Cancel]
* indicates required field }

660

FIG. 6G1

FIG. 6G2

FROM FIG. 6G1

| | | | | | | | | |
|---|---|---|---|---|---|---|---|---|
| 4799 | Advisor 4 | Cashier 1 | 100 | 100 | 0 | 8/7/17 7:15am | 8/7/17 7:15am | View |
| 4640 | Advisor 2 | Cashier 1 | 100 | 100 | 0 | 8/7/17 7:13am | 8/7/17 7:13am | View |
| 3759 | Advisor 1 | Cashier 1 | 100 | 100 | 0 | 8/7/17 7:09am | 8/7/17 7:09am | View |
| 4741 | Advisor 2 | Cashier 1 | 90 | 100 | +10 | 8/7/17 6:37am | 8/7/17 6:37am | View |
| 4941 | Advisor 4 | Cashier 2 | 90 | 100 | +10 | 8/7/17 6:28am | 8/7/17 6:28am | View |
| 2113 | Advisor 4 | Cashier 1 | 100 | 10 | -90 | 8/7/17 6:28am | 8/7/17 6:28am | View |
| 5455 | Advisor 4 | Cashier 2 | 100 | 100 | 0 | 8/7/17 6:11am | 8/7/17 6:11am | View |
| 7288 | Advisor 1 | Cashier 2 | 100 | 100 | 0 | 8/7/17 6:10am | 8/7/17 6:10am | View |
| 2661 | Advisor 2 | Cashier 1 | 90 | 100 | +10 | 8/7/17 5:24am | 8/7/17 5:24am | View |
| 17 total | | | 97.65 | 75.88 | | | | |

TRELA 360 — Auto Group — Notification Status (on) — John Smith ▼

Reports: Daily (?)

-- Select Advisor -- | -- Select Cashier -- | Filter | Reset

As of August 7, 2017

How would you rate your overall customer service experience?

| | Today | Yesterday | 3 day totals | 7 day totals |
|---|---|---|---|---|
| 10 (Excellent/Likely) | 83=75% ⇧ | 78=70% | 282=71% | 400=70% |
| 9 | 21=19% ➡ | 30=27% | 96=24% | 139=24% |
| 8 | 0 | 0=0% | 0=0% | 0=0% |
| 7 | 0 | 0=0% | 0=0% | 0=0% |
| 6 | 0 | 0=0% | 0=0% | 0=0% |
| 5 | 0 | 0=0% | 0=0% | 0=0% |
| 4 | 0 | 0=0% | 0=0% | 0=0% |
| 3 | 3=3% ⇧ | 2=2% | 12=3% | 19=3% |
| 2 | | | | |
| 1 | 4=4% ⇧ | 1=1% | 7=2% | 14=2% |
| 0 (Poor/Not Likely) | | | | |
| TrelaRating | 92.07 ➡ | 94.77 | 93.1 | 92.13 |

FROM FIG. 6I1

Are you likely to return for service in the future at J23 Auto Group?

| | Today | Yesterday | 3 day totals | 7 day totals |
|---|---|---|---|---|
| 683 { Yes | 55=50% ➡ | 60=54% | 206=52% | 293=51% |
| No | 56=50% ⇧ | 51=46% | 191=48% | 279=49% |

Active Delivery

| | Today | Yesterday | 3 day totals | 7 day totals |
|---|---|---|---|---|
| 684 { Yes | 0 | 0 | 0 | 0 |
| No | 0 | 0 | 0 | 0 |

Survey Totals

| | Today | Yesterday | 3 day totals | 7 day totals |
|---|---|---|---|---|
| 685 { Completed | 111=100% | 111=100% | 397=100% | 572=100% |
| Declined | 0 | 0=0% | 0=0% | 0=0% |
| Total Surveys | 111 | 111 | 397 | 572 |

CSC

| | Today | Yesterday | 3 day totals | 7 day totals |
|---|---|---|---|---|
| 686 { Offsite | 2 | 3 | 9 | 16 |
| Onsite | 2 | 1 | 6 | 9 |
| (none) | 0 | 2 | 7 | 7 |
| Total Comments | 4 | 6 | 22 | 32 |

* Urgent requests

FROM FIG. 6I2

CRS
How would you rate your overall customer service experience???

| | Today | Yesterday | 3 day totals | 7 day totals |
|---|---|---|---|---|
| 10 (Excellent/Likely) | 10=59% → | 10=77% | 36=72% | 52=72% |
| 9 | 3=18% → | 3=23% | 9=18% | 12=17% |
| 8 | 0 | 0=0% | 0=0% | 0=0% |
| 7 | 0 | 0=0% | 0=0% | 0=0% |
| 6 | 0 | 0=0% | 0=0% | 0=0% |
| 5 | 0 | 0=0% | 0=0% | 0=0% |
| 4 | 0 | 0=0% | 0=0% | 0=0% |
| 3 | 0 | 0=0% | 0=0% | 0=0% |
| 2 | 2=12% | 0=0% | 3=6% | 4=6% |
| 1 | 2=12% | 0=0% | 2=4% | 4=6% |
| 0 (Poor/Not Likely) | | | | |
| TrelaRating | 75.88 → | 97.69 | 88.8 | 87.78 |

687

Do you have any comments you would like to share with management about your experience???

| | Today | Yesterday | 3 day totals | 7 day totals |
|---|---|---|---|---|
| Answered | 13=76% ⇧ | 9=69% | 33=66% | 52=72% |
| Not Answered | 4=24% → | 4=31% | 17=34% | 20=28% |

TRELA360 | Auto Group | Notification Status (on) | John Smith ▼

691 — Social: Google

Google Rating: 4.2

★★★★★ "Excellent service here, I've bought 2 cars here, first car was an excellent experience, the second one not as great but quite good (due to a slightly aggressive sales man, not expected in general when buying a car). I always have my cars serviced here and the service quality is great. They don't waste my time, I have never been upcharged and the service personnel are always courteous. I recommend! - Eniola Suley ★★★★★ "Only visited one dealer, Toyota of Plano, since it was closest to home. Met with Peter Chou, never felt rushed or pressured. He was very knowledgeable and answered all of our questions about the car. He was patient and made us feel very comfortable during the entire process. Got a fair trade in value and good price on the new car. Spent a little longer time at the dealer than we wanted but Peter made sure the entire process moved forward as quickly as he could. Great job Peter and thank you!" - les tung 692 — ★★★★★ "Searching online, I found a low-mileage 2015 truck at Toyota of Plano that had the features my husband and I wanted. Salesman Wayne Brandon contacted us quickly after our initial inquiry. At the dealership, he took us for a test drive and helped us with the transaction. He was friendly, courteous, honest, and professional. It was the easiest and smoothest vehicle purchase we've ever made. - Beverly Peters ★★★★★ "A great buying experience! Brian did everything he could to make our purchase work. He was upfront, honest and I appreciate his integrity. We've had the Jeep for 3 weeks now and couldn't be happier." - Tina Ianni ★★★★★ "So due to a recall I had to bring my Toyota in for an airbag replacement, while the wait has been long the kindness and service here has been fantastic. Absolutely no hasle and they were very forth coming on how everything was going with the replacement part. They didn't have the part on hand so they sent someone to get from a shop and still got the replacement done today. I primarily worked with David in the service center who was so nice and helpful, I asked if they sold headphones and they don't but he happened to have a pair in his truck from his new phone and he just gave it to me. I have worked in retail for 10+ years and I know what true service is, and David goes far beyond the call of duty. Turned a potentially painfully long wait to tolerable with those headphones!" - Amanda Duke

FIG. 6K

TRELA 360 — Trela Tech — John Smith ▼

Dealers (?)      Add Group

694 →

| Acura | Edit |
| No dealers assigned to this group. | |
| Crest | Edit |
| No dealers assigned to this group. | |
| Ford | Edit |
| No dealers assigned to this group. | |
| Hyundai | Edit |
| No dealers assigned to this group. | |
| Nissan | Edit |
| No dealers assigned to this group. | |
| Other | Edit |
| No dealers assigned to this group. | |
| Toyota | Edit |
| No dealers assigned to this group. | |
| Unassigned | |

695

Auto Group *(Service Department, Sales Department)*    Login

FIG. 6L

TRELA 360 — Trela Tech — John Smith

Reports: Trela Rating — 697

| | | | | | | |
|---|---|---|---|---|---|---|
| Acura | | | | | | Edit |
| No dealers assigned to this group. | | | | | | |
| Crest | | | | | | Edit |
| No dealers assigned to this group. | | | | | | |
| Ford | | | | | | Edit |
| No dealers assigned to this group. | | | | | | |
| Hyundai | | | | | | Edit |
| No dealers assigned to this group. | | | | | | |
| Nissan | | | | | | Edit |
| No dealers assigned to this group. | | | | | | |
| Other | | | | | | Edit |
| No dealers assigned to this group. | | | | | | |
| Toyota | | | | | | Edit |
| No dealers assigned to this group. | | | | | | |

698

| | Today | Yesterday | 3 day totals | 7 day totals | |
|---|---|---|---|---|---|
| Unassigned | | | | | |
| Auto Group - Service Department | 92.14 (112) → | 94.77 (111) | 93.12 (398) | 92.15 (573) | Details |
| Auto Group - Sales Department | | | | | Details |

TRELA 360

Reports: Trela Rating Details                                          << Back to Trela Rating    John Smith ▸

Auto Group: Service Department

701a  [-- Select Advisor -- ▸] [-- Select Cashier -- ▸] [Filter] [Reset]

How would you rate your overall customer service experience?

| | Today | Yesterday | 3 day totals | 7 day totals |
|---|---|---|---|---|
| 10 (Excellent/Likely) | 84=75% ⇧ | 78=70% | 263=71% | 401=70% |
| 9 | 21=19% ➡ | 30=27% | 96=24% | 139=24% |
| 8 | 0 | 0=0% | 0=0% | 0=0% |
| 7 | 0 | 0=0% | 0=0% | 0=0% |
| 6 | 0 | 0=0% | 0=0% | 0=0% |
| 5 | 0 | 0=0% | 0=0% | 0=0% |
| 4 | 0 | 0=0% | 0=0% | 0=0% |
| 3 | 0 | 0=0% | 0=0% | 0=0% |
| 2 | 0 | 0=0% | 0=0% | 0=0% |
| 1 | 3=3% ⇧ | 2=2% | 12=3% | 19=3% |
| 0 (Poor/Not Likely) | 4=4% ⇧ | 1=1% | 7=2% | 14=2% |
| TrelaRating | 92.14 ➡ | 94.77 | 93.12 | 92.15 |

FROM FIG. 7A1

How would you rate your overall customer service experience?

| | | Today | Yesterday | 3 day totals | 7 day totals |
|---|---|---|---|---|---|
| 702 | 5 (Excellent) | 1=100% | 0 | 1=100% | 1=100% |
| | 4 (Very Good) | 0 | 0 | 0=0% | 0=0% |
| | 3 (Good) | 0 | 0 | 0=0% | 0=0% |
| | 2 (Fair) | 0 | 0 | 0=0% | 0=0% |
| | 1 (Poor) | 0 | 0 | 0=0% | 0=0% |
| | Not Answered | 0 | 0 | 0=0% | 0=0% |

Are you likely to return for service in the future at J23 Auto Group?

| | | Today | Yesterday | 3 day totals | 7 day totals |
|---|---|---|---|---|---|
| 703 | Yes | 56=50% ⬇ | 60=54% | 207=52% | 294=51% |
| | No | 56=50% ⬆ | 51=46% | 191=48% | 279=49% |

Do you have any comments you would like to share with management about your experience?

| | | Today | Yesterday | 3 day totals | 7 day totals |
|---|---|---|---|---|---|
| 704 | Answered | 0 | 0 | 0=0% | 0=0% |
| | Not Answered | 1=100% | 0 | 1=100% | 1=100% |

If you would like, please enter your email address for special offers

| | | Today | Yesterday | 3 day totals | 7 day totals |
|---|---|---|---|---|---|
| 705 | Answered | 0 | 0 | 0=0% | 0=0% |
| | Not Answered | 1=100% | 0 | 1=100% | 1=100% |

710

Español

Please answer 5 questions, Scroll & SUBMIT when done

1. How would you rate your overall customer service experience?

| 0 | 1 | 2 | 3 | 4 | 5 | 6 | 7 | 8 | 9 | 10 |

Poor/Not Likely             Very Likely/Excellent   711

2. How would you rate your overall customer service experience?

| 1 | 2 | 3 | 4 | 5 |

Poor/Not Likely             Very Likely/Excellent   712

3. Are you likely to return for service in the future at J23 Auto Group? 713

| No | Yes |

4. Do you have any comments you would like to 714

Español

Auto Group
*Service Department*
*Advisor: Advisor 4*

Thank you Mr. Jordan for using Auto Group, we appreciate your business. We are always looking to improve our service so any feedback you could provide would be greatly appreciated.

1. How would you rate your overall customer service experience???

| 0 | 1 | 2 | 3 | 4 | 5 | 6 | 7 | 8 | 9 | 10 | } 731

Poor/Not Likely                           Very Likely/Excellent

1. Do you have any comments you would like to share with management about your experience???

} 732

300 remaining

Submit

Auto Group
*Service Department*

In striving to improve our customer service, we would appreciate your Comments, Suggestions & Concerns.

Name: _____ 741

Advisor: -- Select -- 742

URGENT: [Yes] [No] } 743

Comments: [_____] 744
300 remaining

[Submit] 745

FIG. 7E

METHOD AND SYSTEM FOR ENTRY AND DISPLAY OF CUSTOMER EXPERIENCE FEEDBACK WITH REAL-TIME AUTOMATED FILTERING AND EVALUATION OF FEEDBACK, TRANSMISSION OF REAL-TIME NOTIFICATION TO SELECTED PERSONNEL BASED ON FEEDBACK EVALUATION IN A FLEXIBLE MESSAGING AND WORKFLOW SYSTEM, AND FOLLOW-UP SURVEY CONSUMER EVALUATIONS

CROSS REFERENCE TO RELATED APPLICATIONS

This application is a continuation of United States Patent Application Number 15/887,265, filed Feb. 2, 2018, which is a continuation-in-part application claiming priority to U.S. patent application Ser. No. 15/569,309, filed Oct. 25, 2017, which claims priority to PCT Patent Application No. PCT/US2016/043733, filed Jul. 23, 2016, which claims priority to United States Provisional Patent Application Nos. 62/290,362, filed Feb. 2, 2016; 62/215,447, filed Sep. 8, 2015; 62/198,908, filed Jul. 30, 2015; and, 62/196,752, filed Jul. 24, 2015.

STATEMENT REGARDING FEDERALLY SPONSORED RESEARCH OR DEVELOPMENT

Not applicable.

TECHNICAL FIELD OF INVENTION

This invention relates to the entry of customer experience feedback with real-time automated filtering and evaluation of feedback and the transmission of real-time notifications to selected personnel based on feedback evaluation.

BACKGROUND OF THE INVENTION

Computers and computer networks have transformed the society and the work environment since their introduction in mass to the business community and the consuming public The impact we see today on the way business is conducted and consumers interact with service providers and product retailers is rooted in the technological developments in the recent past.

In the 1960s, the Defense Department developed a communication system that would permit communication between these different computer networks. Recognizing that a single, the Defense Department recognized that developing a centralized communication system would be vulnerable to attacks or sabotage, so the Defense Department required that their new communication system be decentralized with no critical services concentrated in vulnerable failure points. In order to achieve this goal, the Defense Department established a decentralized communication protocol for communication between their computer networks.

A few years later, the National Science Foundation (NSF) established a communication system that facilitated communication between incompatible network computers at various research institutions across the country. The NSF adopted the Defense Department's protocol for communication, and this combination of research computer networks would eventually evolve into the Internet.

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

A computer operating on a network is assigned a unique physical address under the TCP/IP protocols. This is called an EP address. The IP address can include: (1) a network ID and number identifying a network. (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router, agent or gateway is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

Mobile communications and cellular telephony systems have become smaller, lighter, and more powerful, which improved the ability to communicate with individuals on an exponential basis. The Internet protocols were originally developed with an assumption that Internet users would be connected to a single, fixed network. With the advent of cellular wireless communication systems, such as mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

In the past, consumer feedback has been solicited well after the service or product has been provided to the consumer. The requests for feedback occur days and weeks after customer leaves the service provider or retail location. The ability to obtain constructive feedback, either good or bad, is lost by this lag time in the procurement of the feedback from the consumer. And, if the experience is negative, the opportunity to rectify the negative experience with personal attention to the consumer has been lost with the procurement of feedback days and weeks after the customer leaves the service provider or retail location.

When survey have been taken from consumers, the results of surveys have, in the past, been distributed to all employees in the organization. Not only is this survey information "stale" in the sense that it has been taken long after the consumer leaves the service provider or retail location, but the information is largely ignored in a mass of information being provided in a generic manner to an entire group.

Several patents show traditional methods of obtaining survey information, such as U.S. Pat. No. 7,609,832 issued on Oct. 27, 2009 (Patent Publ. No. 2005/0100158A1, published May 12, 2005) to Kreiner, which shows an automatic call center with an interactive voice response system that supports the administration of a survey to a client in communication with the call agent station. The Kreiner system administers a survey to a client when the client has been called by the system and is on-the-line, which is the manner on collecting survey information from the client. Similarly, there are many call center screening survey systems shown in U.S. Pat. No. 8,085,910 issued to Verizon Corporate Services Group, Inc. on Dec. 27, 2011; U.S. Pat. No. 8,386,623 issued to American Express Travel Related Services Co, on Feb. 26, 2013; U.S. Pat. No. 8,494,134 issued to BCE, Inc. on Jul. 23, 2013; U.S. Pat. No. 8,515,803 issued to 3Pd, Inc. on Aug. 20, 2013; US Patent No. 8516,076 issued to American Express Travel Related Services on Aug. 20, 2013; U.S. Pat. Nos. 8,650,315, 8,650,316, 8,650,317, 8,650,318, and 8,650,319 issued to American Express Travel Related Services on Feb. 11, 2014.

These prior art methods and systems fail are not optimized for operational efficiency, consumer expectation, and business strategy to optimize customer retention and satisfaction with products and services provided by a business. These systems, by and large, trigger and conduct an automated survey to collect survey information from a client, but there is a need to utilize this survey information in a better manner so that businesses can better preserve client relationships at the service provider or retail location. There is no present system that satisfactorily correlates and associates various customer data provided during stages of surveys and during associated requests for feed-back to provide integrated notifications and notices, as well as integrated data sharing, to team members, associates, dealers, department members, and any other associated or affiliated person.

BRIEF DESCRIPTION OF THE DRAWINGS

FIGS. 3A-3C, 3C1, 3D, 3E and 3F are screen displays for different types of mobile units as generated according to the present invention, FIGS. 5A-5D, 5D1, 5E, 5E1, 5F, 5F1, 5G, 5H, and 5I show the screen displays for a mobile unit or a desktop unit as generated according to the present invention, FIGS. 6A, 6B, 6C, 6D, 6D1, 6E, 6F, 6G1, 6G-2, 6H, 6I1, 6I2, 6I3, 6J, 6K, and 6L show the screen displays for a mobile unit or a desktop unit as generated according to the present invention; and, FIGS. 7A1, 7A2, 7B, 7C, 7D and 7E show the screen displays for a mobile unit or a desktop unit as generated according to the present invention.

SUMMARY OF THE INVENTION

Figure 1A:
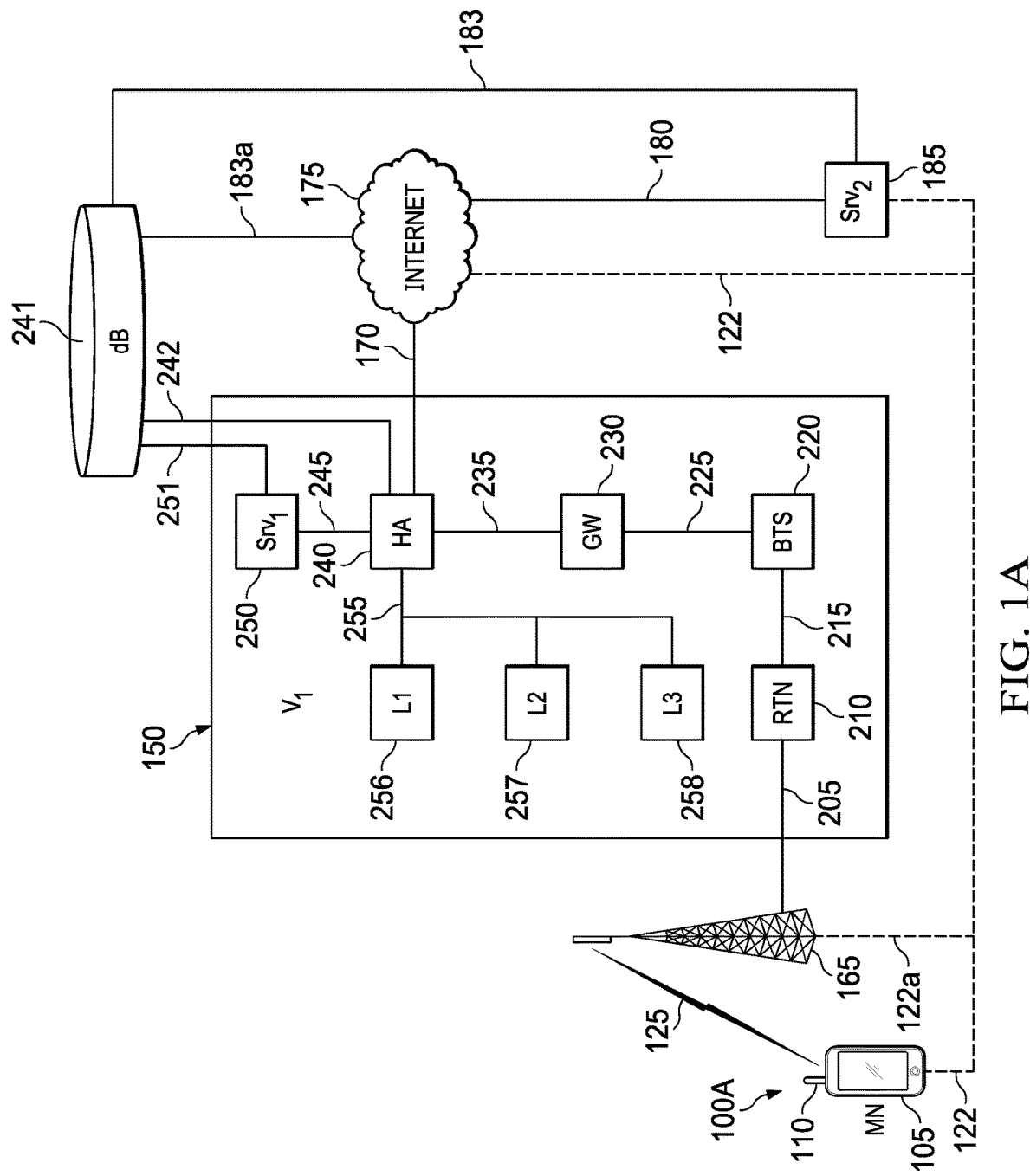
FIGS. 1A-1C are block diagrams showing system components used with the present invention.

The present invention supports the entry of customer experience feedback into the system, which then conducts real-time automated filtering and evaluation of feedback entered by the customer and supports the transmission of real-time notifications to selected personnel based on feedback evaluation in a flexible messaging and workflow system. The present invention correlates and associates various customer data provided during stages of surveys and during associated requests for feed-back to provide integrated notifications and notices, as well as integrated data sharing, to team members, associates, dealers, department members, and any other associated or affiliated person.

The present invention supports that ability to obtain constructive feedback, either good or bad, regarding a customer's experience while the customer is still at the service provider or retail sales location. And, if the experience is negative, the invention provides automated evaluation and filtering of the feedback information with real-time notifications to selected personnel so the customer's concerns can be addressed immediately so as to rectify the negative experience with personal attention to the consumer, and preserve the client relationship for the future before the customer departs from the service provider or retail sales location. Identity information relating to the customer can also be preserved so that the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience.

The following system components, steps and functionality individually are believed to be novel and enhance the operation of the computer system over that of a generic computer system, including the components, steps and functionality relating to: (1) entry of customer experience feedback into the system, (2) then, automated evaluation and filtering of that information on a real-time base, (3) then, real-time notification of selected personnel regarding the customer experience feedback information prior to the customer departing the service provider or retail sales location, where selected personnel include specific members of teams, users, groups or companies (e.g. higher level management), and (4) then, having one or more selected personnel at the service provider or retail sales location address the customer's concerns to enhance the customer's evaluation of the experience or enhance subsequent visits to the service provider or retail sales location. Subsequently, after, step 4, the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. The real-time notifications to said selected personnel include customer background information, survey results, service provider information and services provided to the customer. This ordered sequence of steps 1-4, with and without the addition of the subsequent location recognition steps, is believed to be novel in that the ordered combination of steps transforms the claims into patent-eligible subject matter.

In addition to the above-described invention (which can be referred to as the Direct Customer Survey or "DCS"), the present invention also includes additional system components, steps and functionality individually are believed to be novel and enhance the operation of the computer system over that of a generic computer system, including the components, steps and functionality relating to: (1) the initiation, implementation of filtering and identification of responses and survey survey answers from the Direct Customer Survey (DCS); (2) the initiation, implementation, execution, and operation of a Customer Response (or "CRS") service, protocol system and method, either prompted based on responses to DCS survey questions, automatically initiated, or manually initiated by program users or service personnel; (3) the initiation, implementation of filtering and identification of responses and survey survey answers from the Customer Response Service (CRS); (4) the initiation, implementation, execution, and operation of a Comments, Suggestion and Concerns (or "CSC") service, protocol system and method, either prompted based on responses to DCS and/or CRS survey questions, automatically initiated, or manually initiated by program users or service personnel; (5) the initiation, implementation of filtering and identification of responses and survey survey answers from the Comments, Suggestion and Concerns service (CSC), and (6) the initiation, implementation, execution, and operation of an authenticated survey rating service (or "TRS") that receives marked survey, responses received from the filtering and identification protocols related to the DCS, CRS and/or CSC subsystems, adjusts the scores from those received and marked responses to a normalized measure, calculates an overall IRS rating score from the customer that is associated with the customer's response, and transmits or posts the IRS rating to: (i) identified personnel in the business or associated businesses, (ii) stakeholders or shareholders in the businesses being evaluated, or (iii) publicly to a website, on-line bulletin board maintained and supported by the system, and/or a chat room maintained and supported by the system.

The IRS rating service provides authenticated ratings from known, actual customers, which enhances the reliability and accuracy of the responses over other systems that solicit and receive rating responses from unknown sources that can provide flawed or inaccurate ratings relating to services or products that were never actually purchased or received. The CRS system may use responses and feedback provided by the DCS system or be executed automatically independent from such DCS feedback responses, or be manually executed independent from such DCS feedback responses. Likewise, the CSC system may use responses and feedback provided by the DCS and/or the CRS system or be executed automatically independent from such DCS and/or CRS feedback responses, or be manually executed independent from such DCS and/or CRS feedback responses. And, IRS rating service subsystem may use filtered or identified responses from one or more of the DCS system, the CRS system and/or the CSC system, individually or collectively. And, the CRS and/or CSC subsystems may act independently from each other, or alternatively, rely on information received from the other systems and subsystems such that each protocol and service can be initiated and executed based on responses received from other systems and subsystems, or automatically initiated independent of other protocols/services, or manually initiated by personnel independent of other protocol s/services.

As additional components, functionality and steps used in this system, the present invention provides for the preparation and revision of standard or individualized feedback evaluation questions by authorized users, with flexible assignment of these evaluation questionnaires for specific members of companies, teams, users, or groups providing services or products or entire groups of users, teams or companies. And, the present invention provides for the flexible assignment of team members, users, and companies, as well as the preparation and transmission of messaging to entire team members, users, groups and companies or specific members of teams, users, companies, and groups. These flexibly assigned team members, users and companies can receive real-time notifications by text, email or other instant messaging, as well as daily or periodic reports, inquiries, notifications or bulletins to by the same message formats to improve work flow and attention to the customer experience. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Based on the evaluation and filtering of customer feedback evaluations, benchmark information and trending information can be developed and provided in notifications to selected personnel, including trending information regarding the performance of individuals in a group, team, or company or entire groups of users, teams, or companies. Such trending information can identify individuals or groups that are under-performing or exceeding benchmark standards set by management or officers of the business to that rewards, bonuses, or additional training can be provided based on those results.

Each of these additional components, functionalities and steps, when combined with the attributes, components and steps described immediately above, are considered to be novel because each individually enhances the operation of the computer system over that of a generic computer system. Moreover, the ordered sequence of steps 1-4, with the additional components, functionalities and steps and with the addition of the subsequent location recognition steps, is believed to be novel in that the ordered combination of steps transforms the claims into patent-eligible subject matter. Moreover, the sequence of steps ordered in Direct Customer Survey or "DCS", alone or in combination with the additional system components, steps and functionality individually associated with the Customer Response Service ("CRS"), the Comments, Suggestion and Concerns service ("CSC"), and the TRS authenticated survey rating service believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems. While the preferred embodiment describes a car dealership/service department scenario, the present invention could be used in any retail service situation (or retail sales of goods).

DETAILED DESCRIPTION

The present invention is shown by block diagrams in FIGS. 1A-IC is a communication system supporting the processing communications between a home agent network and one or more mobile units, where the home network has a home agent coupled to a computer server. The home network processes communications to be transmitted and received from one or more mobile units, and a transceiver unit is coupled to say home agent network for receiving and transmitting communications to said mobile unit. The home network processes communications to and from said mobile unit, and information related to the mobile nodes location and proximity can be used to include selected communications that possess information and data relating to specific products or ordering information. The present invention correlates and associates various customer data provided during stages of surveys and during associated requests for feed-back to provide integrated notifications and notices, as well as integrated data sharing, to team members, associates, dealers, department members, and any other associated or affiliated person.

The home network can communicate via wireless transmission or a wired communication link to the mobile node, the Internet, other computer servers or other foreign or associated home networks. Each of the home network embodiments shown in FIGS. 1A-1C support a Wi-Fi connection (or similar mobile network connection) that allows the pushing of data onto the hand-held mobile device. The invention can use the device's Wi-Fi or cellular connection to activate notification message to selected personnel based on the mobile unit's geographic location or proximity to the service provider or retail sales location.

Figure 1B:
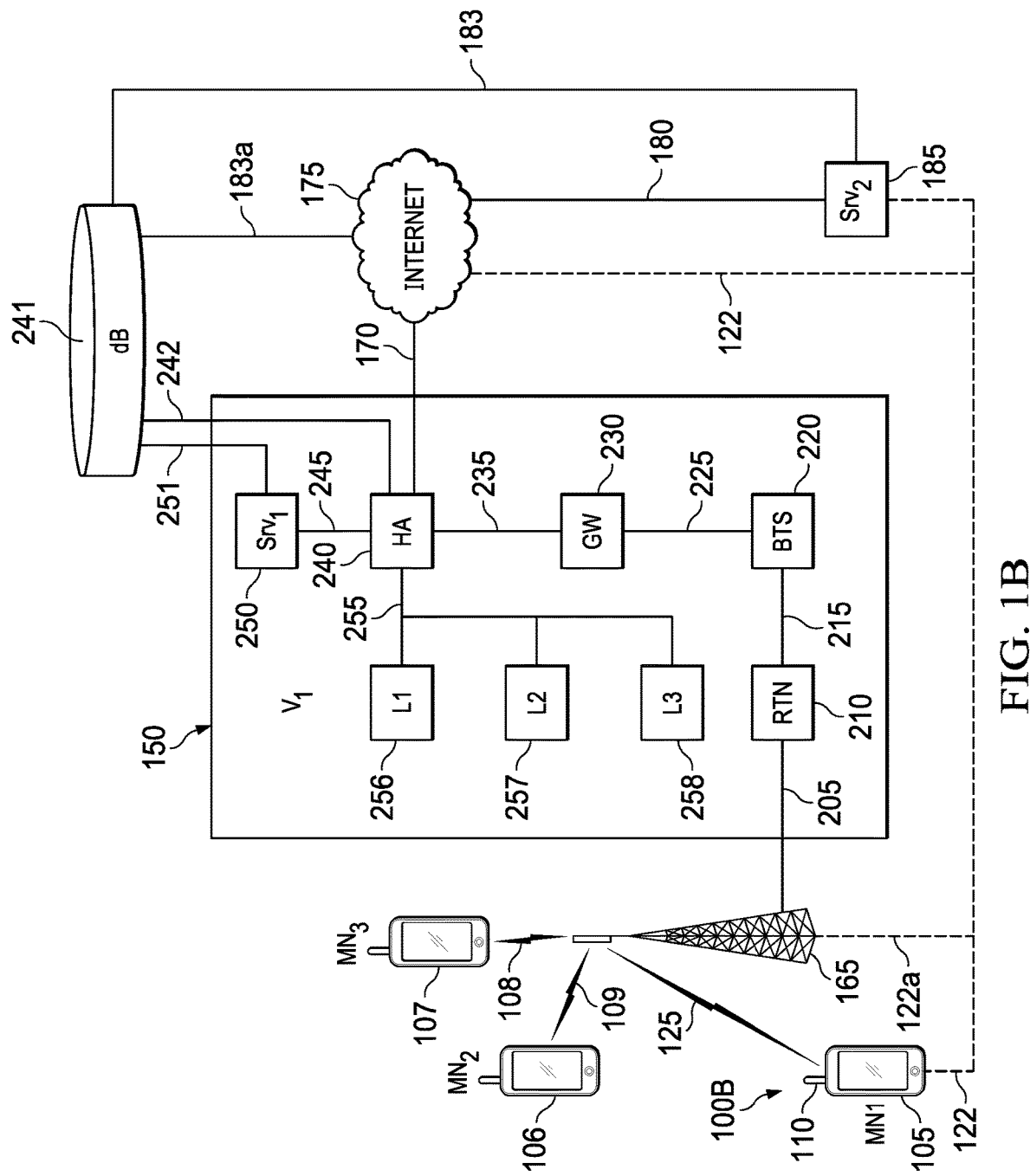
Figure 1C:
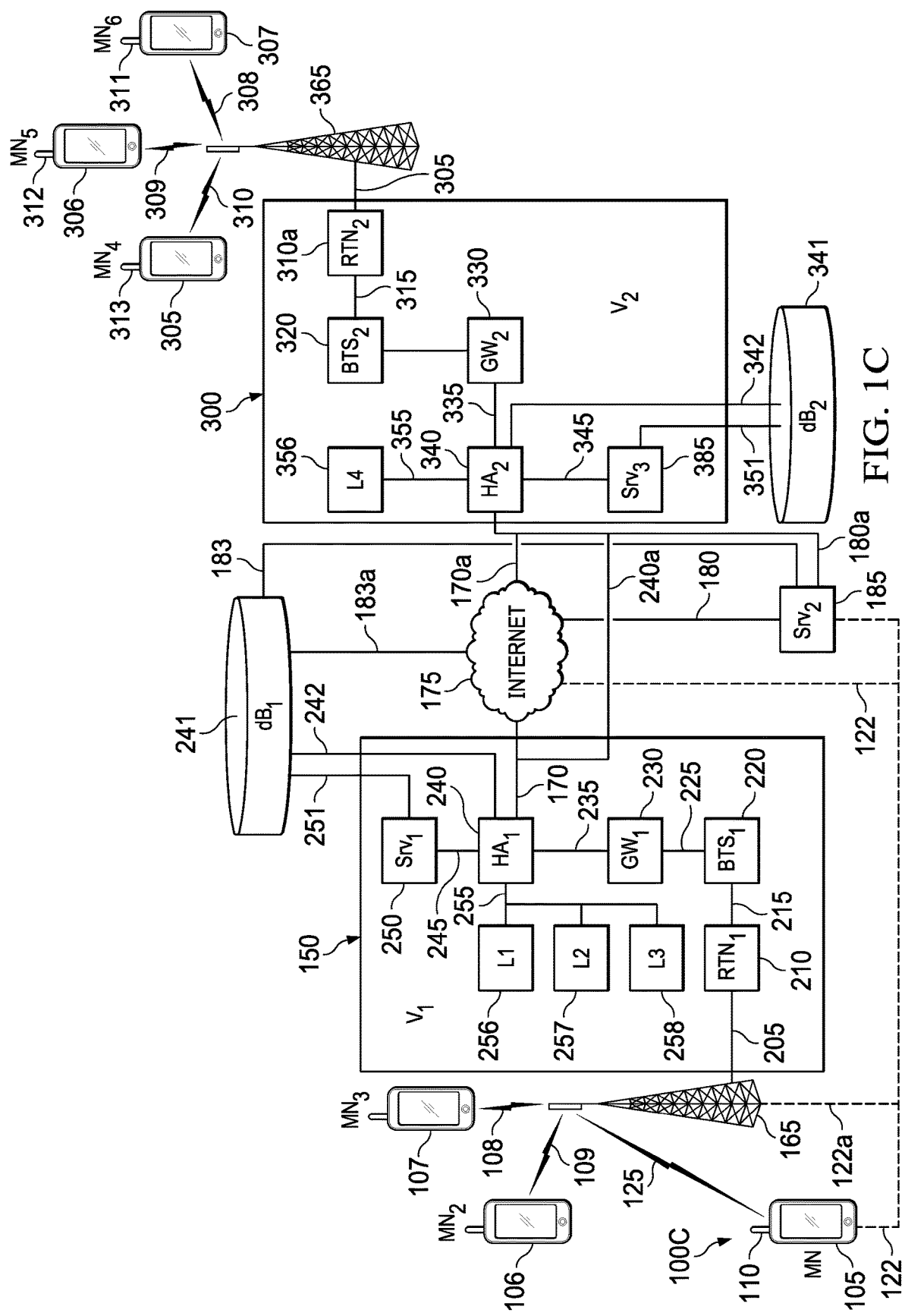

The networks shown in FIGS. 1A-1C support the entry of customer experience feedback into the system, which these systems conduct real-time automated filtering and evaluation of feedback entered by the customer as well as transmission of real-time notifications to selected personnel based on feedback evaluation in a flexible messaging and workflow system. The real-ti me notifications to said selected personnel include customer background information, survey results, service provider information and services provided to the customer. These networks support the ability to obtain constructive feedback, either good or bad, regarding a customer's experience while the customer is still at the service provider or retail sales location. And, if the experience is negative, the invention embodied in these networks provide automated evaluation and filtering of the feedback information with real-time notifications to selected personnel so the customer's concerns can be addressed immediately so as to rectify the negative experience with personal attention to the consumer, and preserve the client relationship for the future before the customer departs from the service provider or retail sales location.

Identity information relating to the customer can also be preserved in the networks so that the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. While the preferred embodiment describes a car dealership/service department scenario, the present invention could be used in any retail service situation (or retail sales of goods).

The following system components, steps and functionality shown in FIGS. 1A-1C individually are believed to be novel and enhance the operation of the computer system over that of a generic computer system, including the components, steps and functionality relating to: (1) entry of customer experience feedback into the system, (2) then, automated evaluation and filtering of that information on a real-time base, (3) then, real-time notification of selected personnel regarding the customer experience feedback information prior to the customer departing the service provider or retail sales location, where selected personnel include specific members of teams, users, groups or companies (e.g. higher level management), and (4) then, having one or more selected personnel at the service provider or retail sales location address the customer's concerns to enhance the customer's evaluation of the experience or enhance subsequent visits to the service provider or retail sales location.

Subsequently, after, step 4, the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. This ordered sequence of steps 1-4, with and without the addition of the subsequent location recognition steps, is believed to be novel in that the ordered combination of steps transforms the claims into patent-eligible subject matter.

In addition to the above-described invention referenced in steps 1-4 (which can be referred to as the Direct Customer Survey or "DCS"), the present invention can be performed on the system shown in FIGS. 1A-1C with additional system components, steps and functionality individually are believed to be novel and enhance the operation of the computer system over that of a generic computer system, including the components, steps and functionality relating to: (1) the initiation, implementation of filtering and identification of responses and survey survey answers from the Direct Customer Survey (DC S); (2) the initiation, implementation, execution, and operation of a Customer Response (or "CRS") service, protocol system and method, either prompted based on responses to DCS survey questions, automatically initiated, or manually initiated by program users or service personnel; (3) the initiation, implementation of filtering and identification of responses and survey survey answers from the Customer Response Service (CRS); (4) the initiation, implementation, execution, and operation of a Comments, Suggestion and Concerns (or "CSC) service, protocol system and method, either prompted based on responses to DCS and/or CRS survey questions, automatically initiated, or manually initiated by program users or service personnel; (5) the initiation, implementation of filtering and identification of responses and survey survey answers from the Comments, Suggestion and Concerns service (CSC), and (6) the initiation, implementation, execution, and operation of an authenticated survey rating service (or "TRS") that receives marked survey responses received from the filtering and identification protocols related to the DCS, CRS and/or CSC subsystems, adjusts the scores from those received and marked responses to a normalized measure, calculates an overall TRS rating score from the customer that is associated with the customer's response, and transmits or posts the TRS rating to: (i) identified personnel in the business or associated businesses, (ii) stakeholders or shareholders in the businesses being evaluated, or (iii) publicly to a website, on-line bulletin board maintained and supported by the system, and/or a chat room maintained and supported by the system.

The TRS rating service provides authenticated ratings from known, actual customers, which enhances the reliability and accuracy of the responses over other systems that solicit and receive rating responses from unknown sources that can provide flawed or inaccurate ratings relating to services or products that were never actually purchased or received. The CRS system may use responses and feedback provided by the DCS system or be executed automatically independent from such DCS feedback responses, or be manually executed independent from such DCS feedback responses. Likewise, the CSC system may use responses and feedback provided by the DCS and/or the CRS system or be executed automatically independent from such DCS and/or CRS feedback responses, or be manually executed independent from such DCS and/or CRS feedback responses. And, TRS rating service subsystem may use filtered or identified responses from one or more of the DCS system, the CRS system and/or the CSC system, individually or collectively. And, the CRS and/or CSC subsystems may act independently from each other, or alternatively, rely on information received from the other systems and subsystems such that each protocol and service can be initiated and executed based on responses received from other systems and subsystems, or automatically irritated independent of other protocols/services, or manually initiated by personnel independent of other protocols/services.

Additionally, components, functionality and steps supported by these networks shown in FIGS. 1A-1C include the preparation and revision of standard or individualized feedback evaluation questions by authorized users, with flexible assignment of these evaluation questionnaires for specific members of companies, teams, users, or groups providing services or products or entire groups of users, teams or companies. And, the networks shown in FIGS. 1A-1C provide for the flexible assignment of team members, users, and companies, as well as the preparation and transmission of messaging to entire team members, users, groups and companies or specific members of teams, users, companies, and groups. These flexibly assigned team members, users and companies can receive real-time notifications by text, email or other instant messaging, as well as daily or periodic reports, inquiries, notifications or bulletins to by the same message formats to improve work flow and attention to the customer experience. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Based on the evaluation and filtering of customer feedback evaluations, the networks shown in FIGS. 1A-1C provide benchmark information and trending information that can be developed and provided in notifications to selected personnel, including trending information regarding the performance of individuals in a group, team, or company or entire groups of users, teams, or companies. Such trending information can identify individuals or groups that are under-performing or exceeding benchmark standards set by management or officers of the business to that rewards, bonuses, or additional training can be provided based on those results.

Each of these additional components, functionalities and steps, when combined with the attributes, components and steps described immediately above, are considered to be novel because each individually enhances the operation of the computer system over that of a generic computer system. Moreover, the ordered sequence of steps 1-4, with the additional components, functionalities and steps and with the addition of the subsequent location recognition steps, is believed to be novel in that the ordered combination of steps transforms the claims into patent-eligible subject matter.

With reference of FIG. 1A, the communication system 100A of the present invention is shown with a detailed explanation of the system components available at the home network 150 as coupled via communication line 205 to the mobile radio transceiver/cellular/VW' systems 165 as coupled to mobile node 105. The mobile node 105 includes a hand-held mobile unit 105 that includes a processor, memory and a power source, as well as a transceiver and antenna 110. While a mobile unit is contemplated, lap top, fixed location computers, or computer pads can also be used instead and freely substituted with the mobile unit 105.

The transceiver and antenna 110 supports radio transmission communications link 125 to an radio transceiver antenna and transmission network 165 (e.g. cellular, GSM, Evdo, 4G/LTE, CDMA, or others), which is coupled via connection 205 to a radio transmission network communication gateway 210 associated with the home network 150. The mobile hand-held unit 105 may also be connected to an outside server computer SRV2 185 via a separate connection 122, which can include a wireless radio connection or a wireline communication system connection. The mobile hand-held unit 105 may also be connected to the Internet 175 via the communication link 180 through outside server computer SRV2 185 or via a separate direct connection 122, which can include a wireless radio connection or a wireline communication system connection.

The mobile hand-held unit 105 can also be coupled to the radio transceiver antenna 165 and a radio transmission network that is coupled to a telecommunications system that supports connectivity 122a to the Internet 175 or another system network without interfacing directly with equipment or components in the home network 150.

The radio transmission network 210 is coupled to a base station transceiver unit 220 via connection 215, where the base station transceiver station provides an interface between radio domain communications and data communications carried over a telecommunications or network computer system. The base station transceiver unit 220 is coupled to a gateway 230 for the network at the home network 150 via connection 225, which provides an interface with the network maintained at the home network 150 or associated with the home network 150. The BTS 220 may also be located remotely from the home network near the remote radio transmission network 165 accessed by the mobile unit 105.

The gateway 230 is coupled to a home agent 240 via connection 235, where the home agent 240 controls communication flow and directions on the network maintained at the home network 150 or in a network associated with the home network 150. The home agent 240 is coupled to a computer server SRV1 250 via connection 245, which maintains past historical and present real-time information, software module, operations software, or other data that may be used or communicated using the invention. The invention contemplates centrally located servers to maintain the software modules and database information at the home network 150 that maintain or provide access to information related to the home network 150, but remotely located servers and computer networks can also be accessed and used with the invention.

The home agent 240 is coupled to the Internet 175 via a connection 170, and the Internet 175 may be coupled to one or more servers SRV2 185 via connection 180. The mobile hand-held, unit 105 may also be connected to SRV2 185 via a separate connection 122, which can include a wireless radio connection or a wireline communication system connection. A database 241 is coupled to the home agent 240 via communication link 242 or computer server 250 via link 251 or computer server SrV2 185 directly via link 183 or indirectly through the Internet 175 via communication links 183a and 180. The database 241 may maintain information related to the customers, users, groups, team members, or companies, but it could also maintain remote access to software modules and database information used with the software operated by the present invention as well as database information related the business operations. While only one database 241 is shown, this representation is understood to include one or more separate databases and storage locations of data and information.

The home agent is also coupled via connection 255 to various locations L1 256, L2 257, and L3 258 at home network 150 so that operations software, data, customer evaluations, notifications or other information can be entered, transmitted or received on the system and controlled by users at the business location. Customers, users and controllers at the home network location may also access the home network 150 remotely via communication links and wireless communication links or mobile units.

The mobile unit 105 represents a mobile unit used by the customer to prepare and enter the customer feed-back evaluation information, Communications to the system, customer evaluation, requests for information, or notifications can be received by the customer from remote access locations or the home network using the hand-held mobile unit 105 as connected to the home network 150.

The computer server SrV1 250 on the home network 150 also supports the maintenance and use of data, customer information, software modules and operational code for the present invention, as well as maintaining the webpages that support the applications program download for the present invention, and supporting the interaction of communications with the mobile unit 105 and database 241. The Internet 175 can also maintain server computers, cloud storage, or server for maintaining database information, code, software modules, or the webpages that support the applications program download for the present invention, as well as supporting the interaction of communications with the mobile unit 105 or database 241. Furthermore, home network 150 or the computer server SRV2 185 can facilitate or assist with the maintenance of database information, code, software modules, or the webpages that support the applications program download for the present invention, as well as supporting the interaction of communications with the mobile unit 105 or database 241.

With reference of FIG. 113, the communication system 10013 of the present invention is shown with a detailed explanation of the system components available at the home network 150 as coupled via communication line 205 to the mobile radio transceiver/cellular/WWI systems 165 as coupled to mobile nodes 105, 106 and 107. The mobile nodes 105, 106, and 107 includes a hand-held mobile unit 105, 106 and 107 that includes a processor, memory and a power source, as well as a transceiver and antenna. While a mobile unit is contemplated, lap top, fixed location computers, or computer pads can also be used instead and freely substituted with the mobile unit 105, 106 and 107. All the other system components shown in FIG. 113 are similar to, and possess the same functionality, as the system components shown in FIG. 1A, which is incorporated herein by reference.

More notably, multiple mobile nodes 106 and 107 are shown connected to the home network 150 via connections 109 and 108, respectively, to the mobile radio transceiver system 165. These additional mobile nodes support the use of the wireless communication system to multiple customers, or multiple team members, group members, users or employees associated with the company or associated with other companies owned by common management. The mobile units 105, 106 and 107 are mobile units used by customer to prepare and enter the customer feed-back evaluation information, but also could be mobile units used to support communications to the system, customer evaluation, requests for information, or notifications as received by multiple customers, or multiple team members, group members, users or employees associated with the company or associated with other companies owned by common management.

With reference of FIG. 1C, the communication system 100C of the present invention is shown with a detailed explanation of the system components available at the home network 150 as coupled to a second foreign network 300. Apart from the system components in foreign network 300 and its connections to the home network 150, all the other system components shown in FIG. 1C are similar to, and possess the same functionality, as the system components shown in FIG. 1A, which is incorporated herein by reference. FIG. 1C has a second home agent HA2 340 (or through a similar device or component connection) on the foreign network 300 coupled to the home network 150 via communication links, which can be wired or wireless connections, 170a through the Internet 175, communication link 240a to the home agent 240, or communication link 180a to the second computer server SRV2.

With respect to FIG. 1C, foreign network 300 is coupled via communication line 305 to the mobile radio transceiver/cellular/WIFI systems 365 as coupled to mobile node 305, 306 and 307. The mobile nodes 305, 306 and 307 includes a hand-held mobile unit a processor, memory and a power source, as well as a transceiver and antenna 313, 312 and 311, respectively. While a mobile unit is contemplated, lap top, fixed location computers, or computer pads can also be used instead and freely substituted with the mobile unit 305, 306 and 307. The transceiver on each mobile node 305, 306 and 307 supports radio transmission communications link 310, 309 and 308 to an radio transceiver antenna and transmission network 365 (e.g. Wi-Fi, cellular, GSM, Evdo, 4G/LTE, CDMA, or others), which is coupled via connection 305 to a radio transmission network communication gateway 310a associated with the foreign network 300.

The mobile hand-held units 305, 306 and 307 may also be connected to an outside server computer SRV2 185 via a separate connection including a wireless radio connection or a wireline communication system connection. The mobile hand-held units 305, 306 and 307 may also be connected to the Internet 175 through an outside server computer or via a separate direct connection, which can include a wireless radio connection or a wireline communication system connection. The mobile hand-held units 305, 306 and 307 can also be coupled to the radio transceiver antenna 365 and a radio transmission network that is coupled to a telecommunications system that supports connectivity to the Internet 175 or another system network without interfacing directly with equipment or components in the foreign network 300.

The radio transmission network 310s is coupled to a base station transceiver unit 320 via connection 315, where the base station transceiver station provides an interface between radio domain communications and data communications carried over a telecommunications or network computer system. The base station transceiver unit 320 is coupled to a gateway 330 for the network at the foreign network 300 via connection 325, which provides an interface with the network maintained at the foreign network 300 or another associated network. The BTS 320 may also be located remotely from the foreign network near the remote radio transmission network 365 accessed by the mobile units 305, 306 or 307.

The gateway 330 is coupled to a home agent 340 via connection 335, where the foreign agent 340 controls communication flow and directions on the network maintained at the foreign network 300 or in a network associated with the foreign network 300. The foreign agent 340 is coupled to a computer server SRV3 350 via connection 345, which maintains past historical and present real-time information, software module, operations software, or other data that may be used or communicated using the invention. The invention contemplates centrally located servers to maintain the software modules and database information at the foreign network 300 that maintain or provide access to information related to the foreign network 300, but remotely located servers and computer networks can also be accessed and used with the invention.

A database 341 is coupled to the home agent 340 via communication link 342 or computer server 350 via link 342 or computer server SrV3 385 directly via link 351. The database 341 may maintain information related to the customers, users, groups, team members, or companies, but it could also maintain remote access to software modules and database information used with the software operated by the present invention as well as database information related the business operations. While only one database 341 is shown, this representation is understood to include one or more separate databases and storage locations of data and information.

The foreign agent 340 is also coupled via connection 355 to various location L1 356 at foreign network 300 so that operations software, data, customer evaluations, notifications or other information can be entered, transmitted or received on the system and controlled by users at the business location. Customers, users and controllers at the home network location may also access the foreign network 300 remotely via communication links and wireless communication links or mobile units.

The foreign network 300 represents outside networks of associated companies, teams, groups or users that interface with the home network 150, and mobile units 305, 306 and 307 represent mobile units used by the customer to prepare and enter the customer feed-back evaluation information. Communications to the system, customer evaluation, requests for information, or notifications can be received by the customer from remote access locations or the home network using the hand-held mobile units 305, 306 and 307 as connected to the foreign network 300.

The software routines used to support various operations on the networks shown in FIGS. 1A-1C, are shown in the flow chart diagram of FIGS. 2, 2A-2G. The software modules and system software are programmed in an application software that can be/is utilized by the hand held or portable devices in whatever programming language the said device utilizes to operate the applications and then utilizes the wireless communication networks(s) available to that device in that area or any other area where the mobile units 105, 106, 107, or 305, 306 or 307, which can operate in using the functions and/or features of present system. An applications program can be downloaded to the hand-held mobile unit that supports an interface with home computer network 100 or the foreign network 300, and the mobile unit will have access to multiple functions and features identified above relating to the present invention. In the present invention, the mobile unit can include a mobile phone, smartphone device, or portable computer having a wireless radio transmission connection to the home network 150. (e.g. iPhone, Droid, iPad, Slate, etc.).

The software packages residing and operating on the home network 150, preferably the computer server SrV1 250 on the home network 150 and the mobile unit 100, is a universally exportable and importable data format preferably employed so that data from the financial institution's core processing system can be collected and maintained on database 241 in a form that can be recognized by the stand alone software package of the invention. A preferred universally exportable and importable data format such as a text file for example tact. This format is commonly used in business and therefore providing software that can import data from this format for further analysis is cost-efficient and convenient. The software may also be provided with the capability to import data in other formats generated by the core processing unit.

Figure 2:
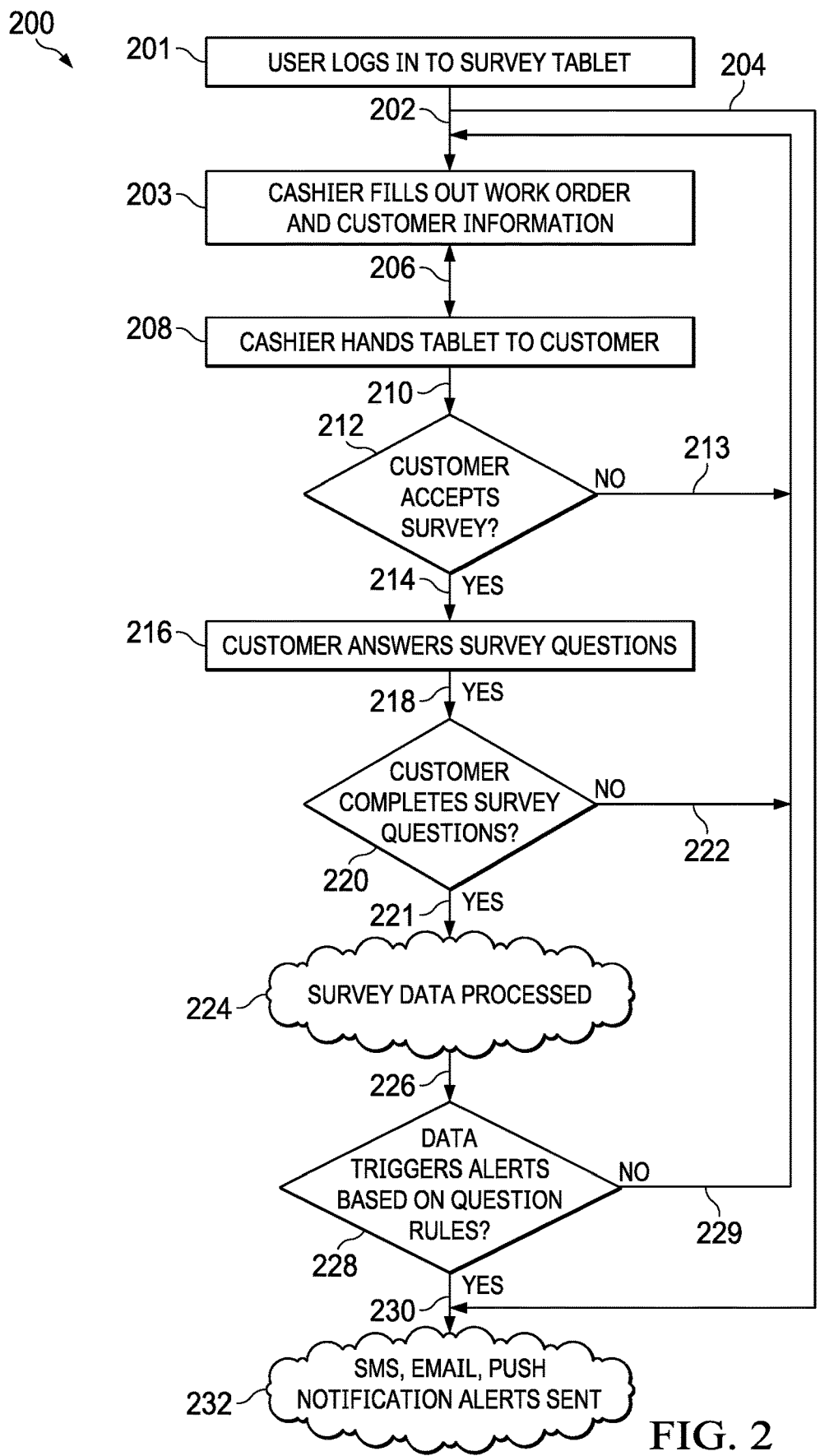
FIG. 2, 2A-2G are flowcharts and block diagrams showing the operation and configuration of the present invention.

As shown in FIG. 2 (DCS protocol), the user logs into the customer evaluation software system at step 201, and proceeds via step 202 to step 203 where the cashier or other service personnel fills out the work order or customer information. From step 203, the system proceeds to step 208 via step 206 where the customer is asked to complete a customer evaluation of its experience at the service location or retail purchase location. The survey can also be transmitted to the survey recipient/taker in steps 212-216 by telephone calls directly to the recipient, text messages, entails, push notification alerts, website links and full text, email or webpage transmissions. The process proceeds to question 212 via step 210 where the customer is accepted whether he wishes to provide evaluation answers. If the answer is no, the program proceeds to step 203 via process step 213 where the cashier or office personnel finalizes the paperwork for the customer, which completes the service or retail transaction for the customer.

If the customer agrees to participate in the evaluation in question 212, the process proceeds to step 216 via step 214 where the customer answers various inquiries. The process then proceeds to question 220 via step 218, where the question is asked if the customer wishes to complete the evaluation. If the answer to question 218 is no, the program proceeds to step 203 via process step 213 where the cashier or office personnel finalizes the paperwork for the customer, which completes the service or retail transaction for the customer.

If the answer is yes at question 220, the survey continues at step 224 via step 221 with the completion of the entry of evaluation answers. Upon completion of the entry of evaluation answers by the customer in step 220, the system filters and evaluates the responses of the customer in step 224. The answers of the customer may trigger real-time alerts and notifications that are prepare for transmission via text, email or other instant messaging system to selected personnel in step 228. The real-time notifications to said selected personnel include customer background information, survey results, service provider information and services provided to the customer. Those SMS, email or push notification alerts can be sent to selected personnel in step 232, which is how the program proceeds via step 230. The notification alerts in step 232 can include telephone calls directly to the recipient, text messages, emails, push notification alerts, website links and full text, email or webpage transmissions. The notifications sent in step 232 to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

If the customer evaluation answers do not trigger any alerts or notifications based on the real-time evaluation, the program proceeds to step 203 via process step 213 where the cashier or office personnel finalizes the paperwork for the customer, which completes the service or retail transaction for the customer. The program can also proceed from step 201 directly to the transmission of alters and notifications using step 204.

The DCS protocol shown in the FIG. 2 system components, steps and functionality individually are believed to be novel and enhance the operation of the computer system over that of a generic computer system, including the components, steps and functionality relating to: (1) entry of customer experience feedback into the system, (2) then, automated evaluation and filtering of that information on a real-time base, (3) then, real-time notification of selected personnel regarding the customer experience feedback information prior to the customer departing the service provider or retail sales location, where selected personnel include specific members of teams, users, groups or companies (e.g. higher level management), and (4) then, having one or more selected personnel at the service provider or retail sales location address the customer's concerns to enhance the customer's evaluation of the experience or enhance subsequent visits to the service provider or retail sales location.

Moreover, the steps in FIG. 2 support the initiation, implementation of filtering and identification of responses and survey survey answers from the DCS protocols. Subsequently, after, step 4, the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. The real-time notifications to said selected personnel include customer background information, survey results, service provider information and services provided to the customer.

The one or more alerts are transmitted to one or more users, dealers, department members or managers, or other team members via electronic delivery (text, email, push notification, SMS). The notification alerts identified above can include telephone calls directly to the recipient, text messages, emails, push notification alerts, website links and full text, email or webpage transmissions. The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Moreover, the notifications to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey, recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

This ordered sequence of steps 1-4, with and without the addition of the subsequent location recognition steps, is believed to be novel in that the ordered combination of steps transforms the claims into patent-eligible subject matter. Based on the evaluation and filtering of customer feedback evaluations, benchmark information and trending information can be developed and provided in notifications to selected personnel, including trending information regarding the performance of individuals in a group, team, or company or entire groups of users, teams, or companies. Such trending information can identify individuals or groups that are under-performing or exceeding benchmark standards set by management or officers of the business to that rewards, bonuses, or additional training can be provided based on those results.

Each of these additional components, functionalities and steps, when combined with the attributes, components and steps described immediately above, are considered to be novel because each individually enhances the operation of the computer system over that of a generic computer system. Moreover, the ordered sequence of steps 1-4, with the additional components, functionalities and steps and with the addition of the subsequent location recognition steps, is believed to be novel in that the ordered combination of steps transforms the claims into patent-eligible subject matter.

Figure 2A:
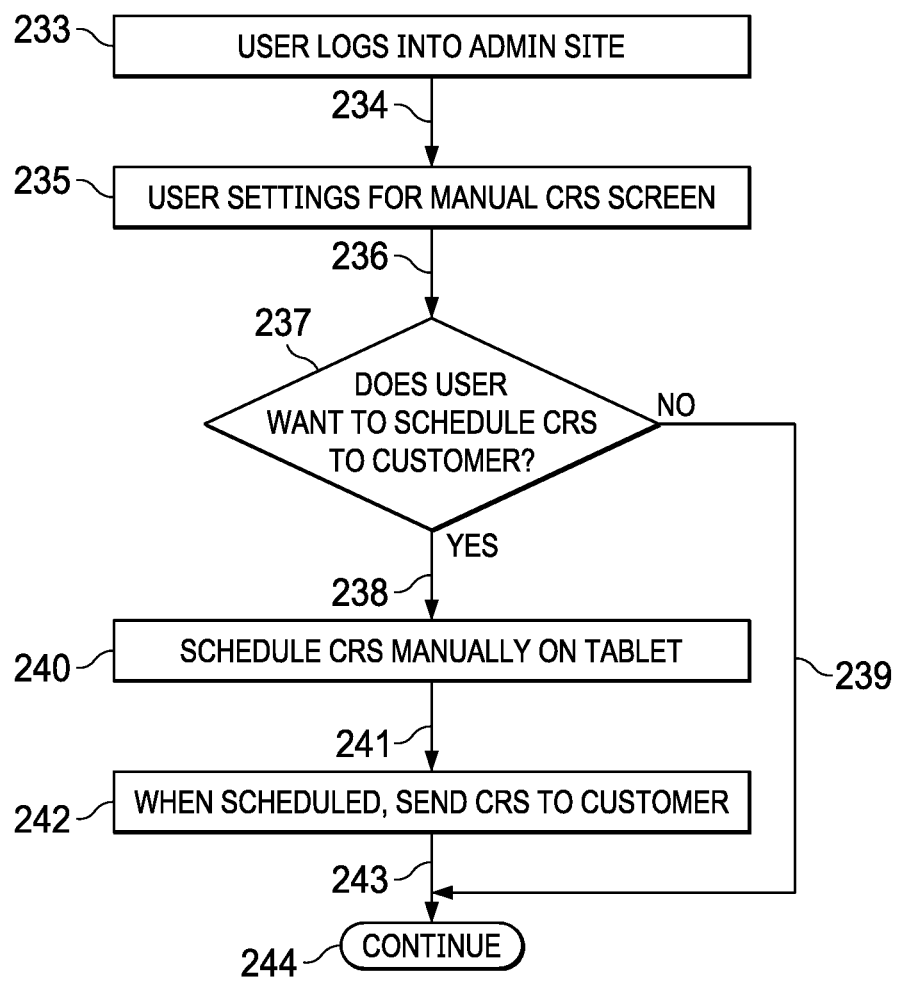

As shown in FIG. 2A (Customer Response Service CRS protocol), the user logs into the customer administration site at step 233, and proceeds via step 234 to step 235 where the user settings are implemented on the manual CRS screen. These user in step 235 can filter existing surveys and survey responses to determine what customers to send CRS customer response service follow-up surveys, select a specific survey or survery questions to send in the follow-up CRS survey, enter contact information such a phone, fax, cell or email of the survey respondents, choose whether to show final custom screen to customer, which can include social media, websites, advertisements, or other web content.

From step 235, the system proceeds to step 237 via step 236 where the user is asked if the user wishes to schedule a CRS customer response service. 0.1f the answer is "no," the program proceeds to step 244 via process step 239 where the user continues from the CRS routine protocols to other subsystem or system operations. If the answer to the query at step 236 is "yes," the program proceeds to step 240 via step 238 where the user can schedule the CRS customer response service follow-up survey manually on the tablet or other computing device (e.g. cell phone, tablet, laptop, desktop computer). In step 240, the user can immediately send the CRS customer response service follow-up survey to the customer, or send it at a later time/date or day using present or manually input options, or set a specific time/day/date when the CRS customer response service follow-up survey will be sent to the customer.

The user can also set custom settings to determine whether the CRS customer response service follow-up survey is automatically sent or sent via a survey application program, and these options (as well as other options) can be dictated based on the responses to the survey provided by the customer in the DCS protocol steps (FIG. 2), which are answers that can be filtered and analyzed to set these CRS customer response service follow-up survey options. Moreover, if a DCS survey was initially declined, the CRS customer response service follow-up survey protocols can be set to send that customer a CRS customer response service follow-up survey. Further, the user in step 240 can set the interval to wait before the CRS customer response service follow-up survey is sent to the customer, and whether that CRS customer response service follow-up survey includes a custom final screen based on the customer's answers provided in the DCS protocol and/or the CRS protocol.

The system proceeds from step 240 to step 242 via step 241 where the system transmits the CRS customer response service follow-up survey to the customer, and the system proceeds therefrom to the continue step 244 via step 243. The continue step 244 proceeds to step 245 in FIG. 2B where the customer receives the CRS customer response service follow-up survey via email, text message, or other electronic transmission. The survey can also be transmitted to the survey recipient/taker in steps 242-245 by telephone calls directly to the recipient, text messages, email s, push notification alerts, website links and full text, email or webpage transmissions.

The CRS customer response service follow-up survey and/or message is sent to the customer fully customized by the dealer/department/user regardless of the manner of transmission, such as by email, text or other electronic transmission. The CRS customer response service follow-up survey can include user selected parameters and survey questions based on prior responses received from the DCS protocol shown in FIG. 2 or other existing survey or customer information on file, and a unique URL link can be provided in the CRS customer response service follow-up survey to the customer.

The system proceeds from step 245 to step 247 via step 246, where the customer answers the survey questions posed in the CRS customer response service follow-up survey received by that customer in step 245. The customer can answer the CRS customer response service follow-up survey questions directly from the electronic transmission or the customer may open a dedicated webpage, a URL or other computer link (e.g. third party or user supported survey application) that supports the presentation and receipt of answers to the CRS customer response service follow-up survey questions. The number of questions, text font and size, and the format of the CRS customer response service follow-up survey questions can be adjusted, modified and customized by the user, dealer or department.

In step 247, the customer answers the CRS customer response service follow-up survey questions, and the system proceeds to step 249 via step 248 where the query is asked "did the customer complete the survey?". If the answer is "no," the system proceeds to step 251 via step 250 where the user continues from the CRS routine protocols to other subsystem or system operations, the system continues to wait on the customer to complete the survey, or queries are made of the customer to inquire if he or she would like to complete the survey. If the answer is "yes" to the query in step 249, the user has completed the survey and the system proceeds to step 253 via step 252 where the data provided by the customer in the CRS customer response service follow-up survey is analysed, processed and filtered for content. The filtering, processing and analysis of the data provided by the customer in the CRS customer response service follow-up survey questions is dictated by the user, dealer, or department.

After the data retrieved from the CRS customer response service follow-up survey questions is processed, filtered and analyzed by the system in step 253, the system proceeds to step 255 via step 254 where the system triggers alerts (text, email, push, other electronic notification) to be sent and transmitted to one or more selected users, dealers, department members or managers, or other team members based on the content of the customer's responses to CRS customer response service follow-up survey questions.

If the answer to this query in step 255 is "yes," the program proceeds to step 261 where the one or more alerts are transmitted to one or more users, dealers, department members or managers, or other team members via electronic delivery (text, email, push notification, SMS). The notification alerts in step 261 can include telephone calls directly to the recipient, text messages, emails, push notification alerts, website links and full text, email or webpage transmissions. The notifications sent in step 261 to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey, recipient or background information that can be used when the survey recipient is contacted.

The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Figure 2B:
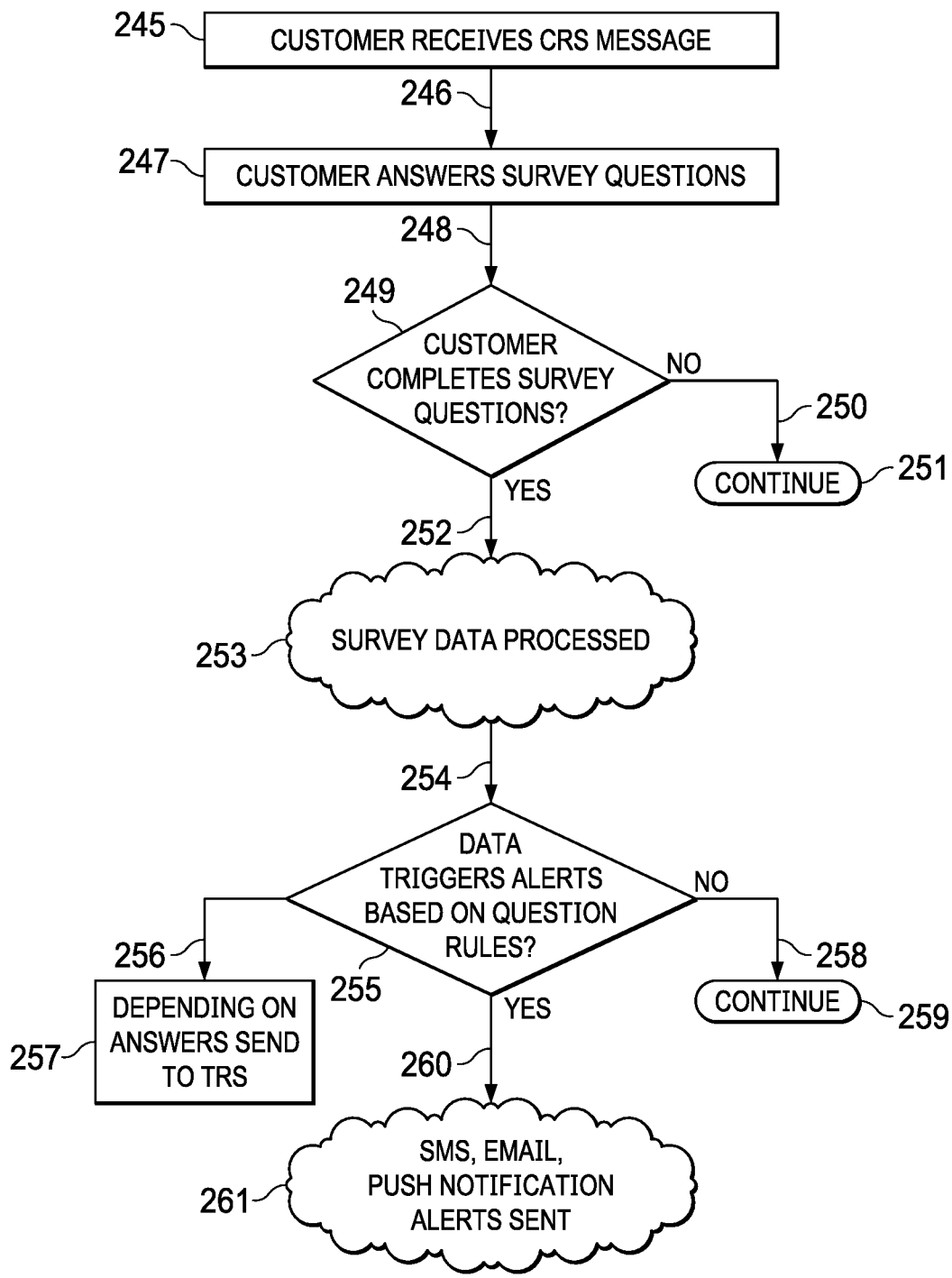

Each question in the CRS customer response service follow-up survey can be associated with a set of rules or parameters that can be set up to include various combinations of answers, users, team members, alert notification recipients, previous survey question responses, date/time, as well as other information, data or associations to other questions, customers, team members, dealers or departments. Responses outside normal responses, or within certain other parameters for a response, can initiate a trigger to transmit an alert via electronic transmission to one or more users, dealers, department members or managers, or other team members. Depending on the responses given to survey questions, the program may also proceed from step 255 to step 257 via step 256 where responses to the survey are transmitted to the TRS Rating service protocol, which is shown in FIGS. 2E-2G.

Figure 2C:
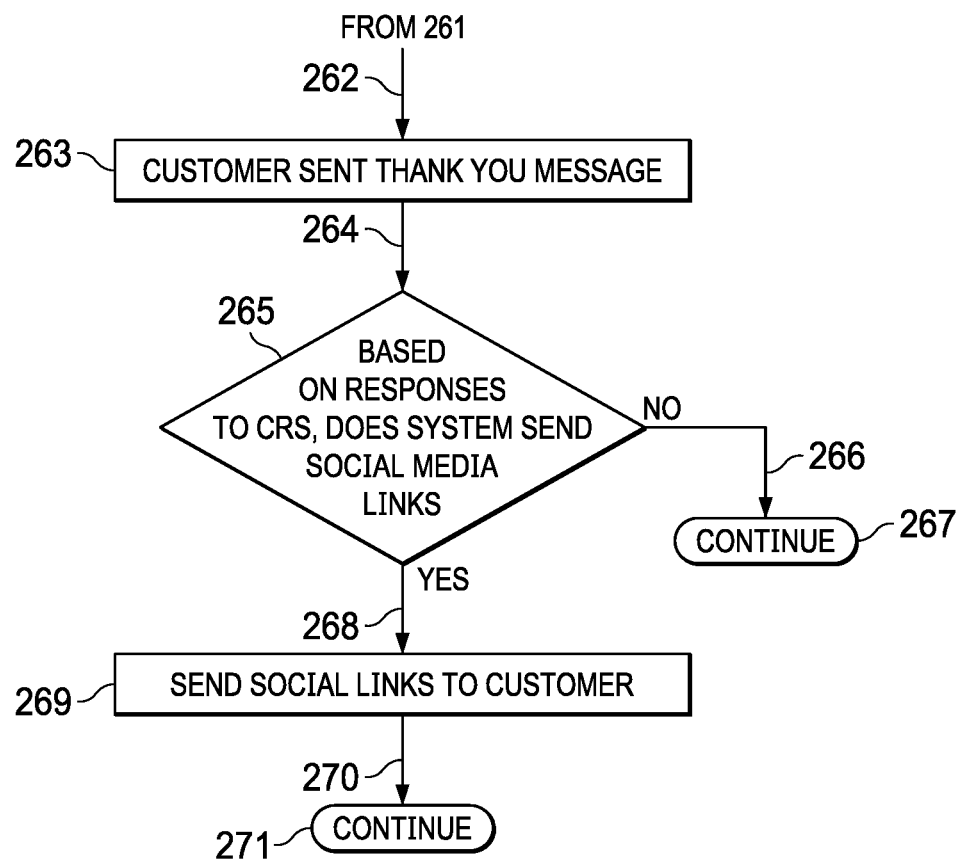

If the answer to this query in step 255 is "no," the program proceeds to step 259 via step 256 where the program proceeds to step 263 via 262 in FIG. 2C. In step 263, the customer is sent a thank you message for participating in the CRS customer response service follow-up survey. The thank you message can be a simple thank you message or a custom final screen based on the user's selections for the final screen, which are set before sending the CRS customer response service follow-up survey.

After step 263, the program proceeds to step 265 via step 264 where the final customer screen presents a question if any of the customer's responses to the CRS customer response service follow-up survey trigger sending social media links to the customer. If the answer to the query in step 265 is "yes," the program proceeds to step 269 via step 268 where the social media links are transmitted to the customer. Social media links can include the TRS Rating service, or other chatrooms or communication platforms maintained and serviced by the program, user, dealer, or team member, or maintained and serviced by a third party. The links can also be transmitted to the customer in step 268 by telephone calls directly to the recipient, text messages, emails, push notification alerts, website links and full text, email or webpage transmissions. Alternatively, the system may also provide the social media links in the thank you message for the customer to access. After step 269, the program proceeds to step 271 via step 270 where the program continues. If the answer to the query in step 265 is "no," the program proceeds to step 267 via step 266 where the program continues.

The CRS protocols shown in the FIG. 2A-2C system components, steps and functionality individually are believed to be novel and enhance the operation of the computer system over that of a generic computer system, including the components, steps and functionality relating to: (1) the initiation, implementation, execution, and operation of a Customer Response (or "CRS") service, protocol system and method, either prompted based on responses to DCS survey questions, automatically initiated, or manually initiated by program users or service personnel, and, (2) the initiation, implementation of filtering and identification of responses and survey survey answers from the Customer Response Service (CRS). The sequence of steps ordered in Customer Response Service ("CRS"), alone or in combination with the additional system components, steps and functionality individually associated with the Direct Customer Survey or "DCS" are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey survey answers from the DCS and CRS protocols, as well as other subsystems and protocols in the system.

The one or more alerts are transmitted to one or more users, dealers, department members or managers, or other team members via electronic delivery (text, email, push notification, SMS). The notification alerts identified above can include telephone calls directly to the recipient, text messages, emails, push notification alerts, website links and full text, email or webpage transmissions. The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Moreover, the notifications to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems CRM) maintained users, dealers, department members or managers, or other team members or affiliated persons to alert personnel regarding the need to contact the survey recipient or background information that can be used when the survey recipient is contacted.

Figure 2D:
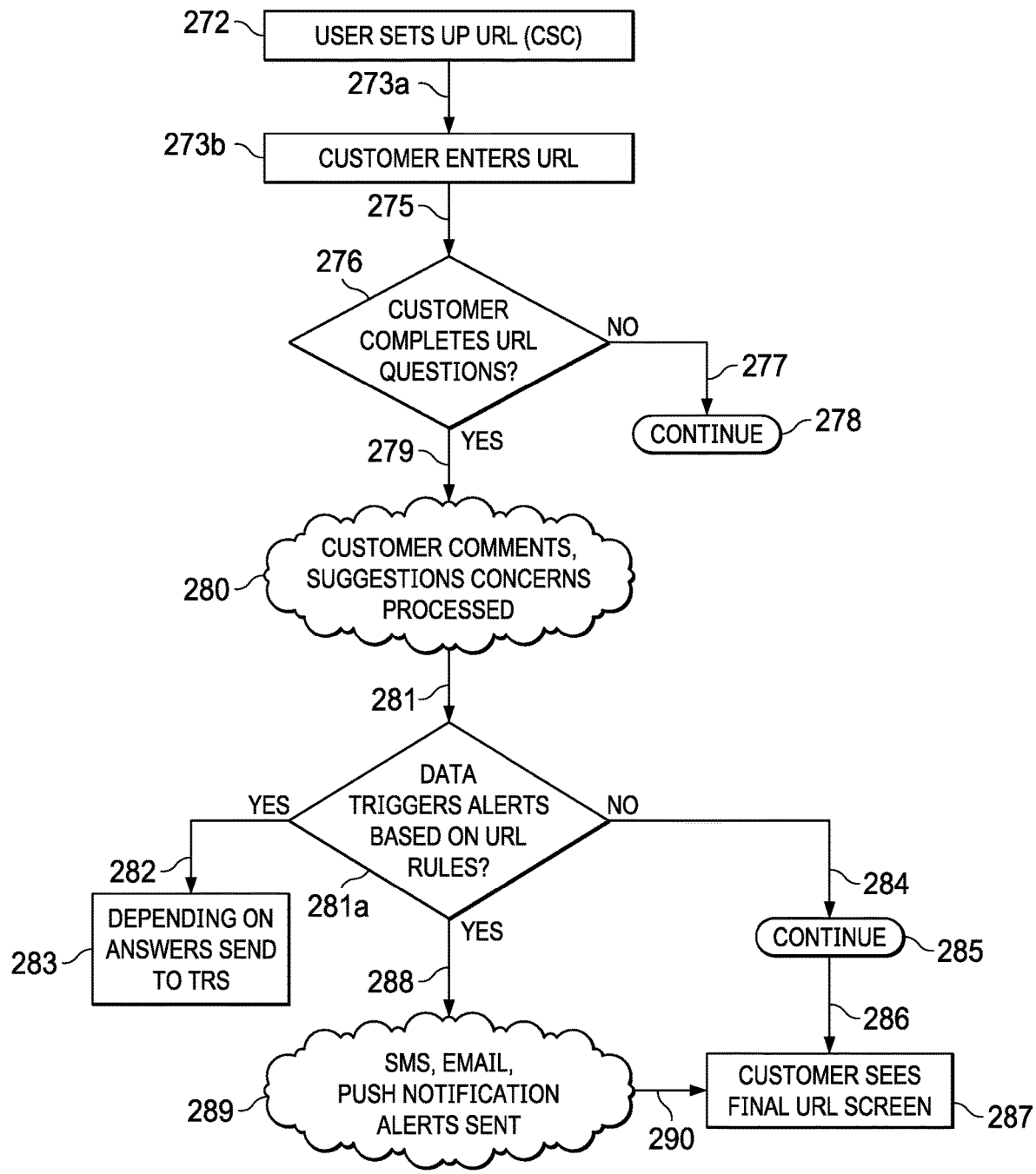
Figure 2E:
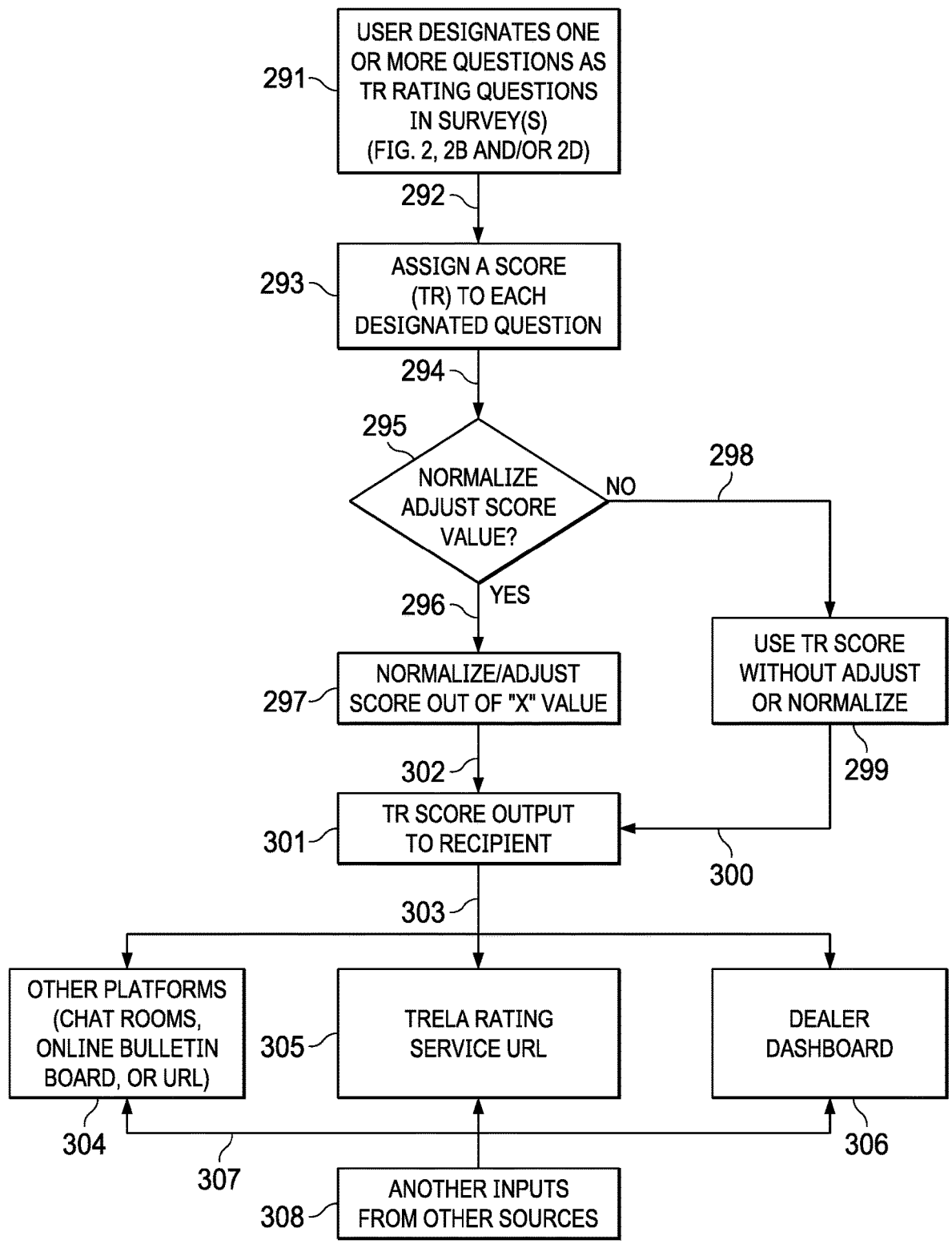
Figure 2F:
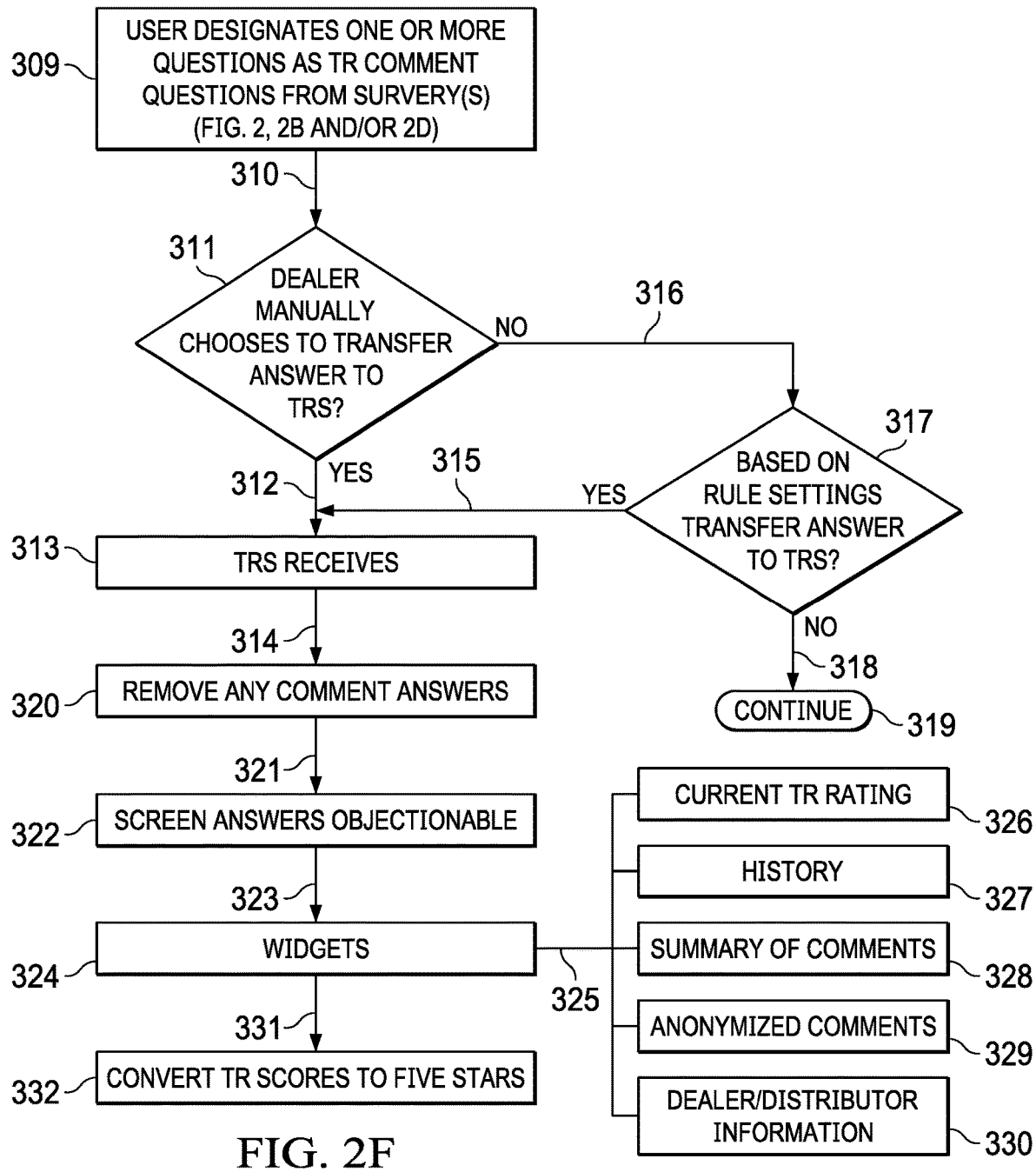
Figure 2G:
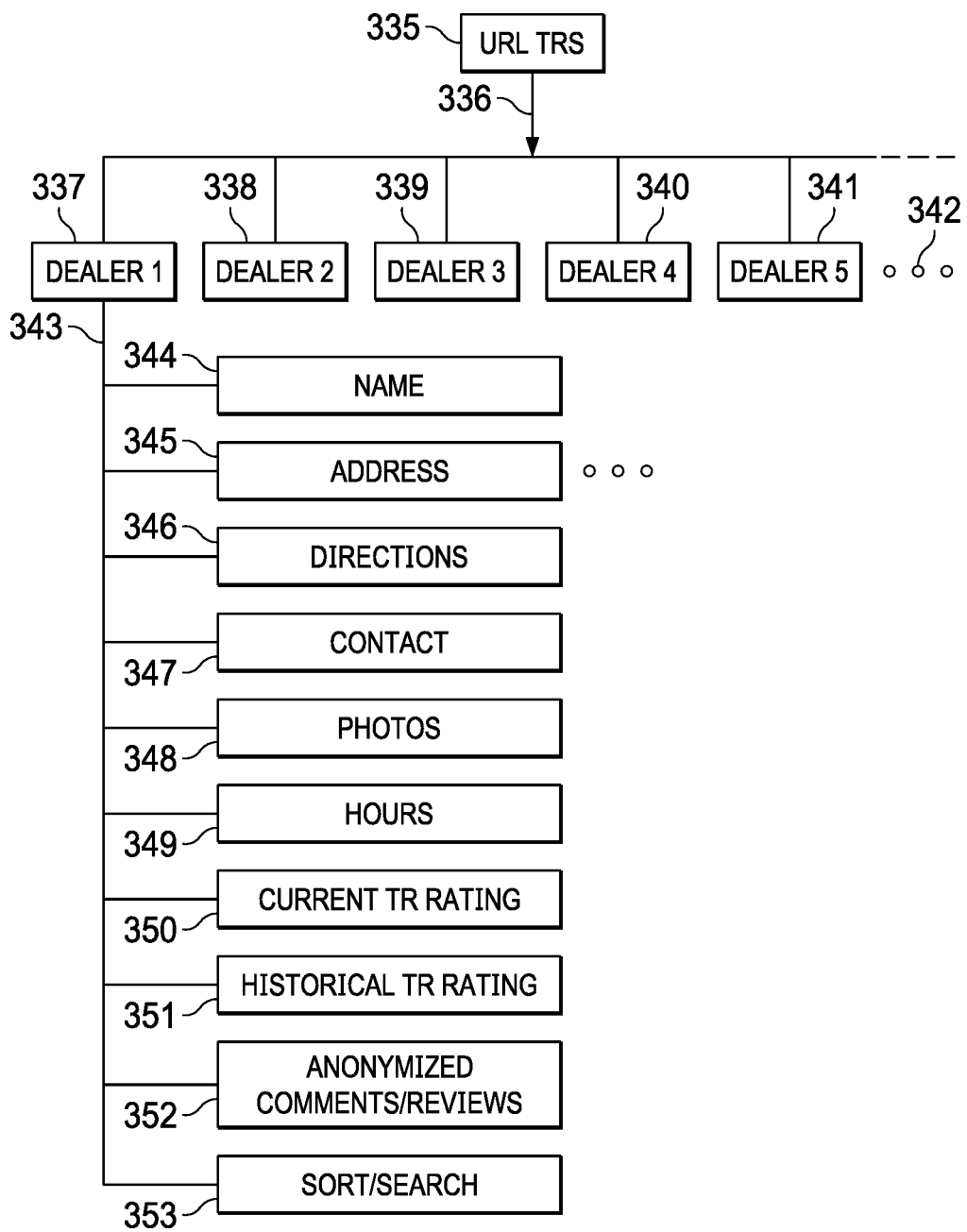

As shown in FIG. 2D (Comments, Suggestions, Concerns CSC protocol), the user sets up a portal, URL, website or other platform to receive customer comments, suggestions, or concerns at step 272. The URL established by the user can be a unique and different URL or other portal based on the particular marketing or promotion campaign being run at the time, or can be an established URL or portal that is used by the dealer, department, service center, member or affiliated party without regard to any particular marketing campaign. The marketing campaigns can be more effectively tracked for reporting purposes back to the dealer, department, service center, member or affiliated party. The marketing campaign being run by the dealer, department, service center, member or affiliated party can include waiting rooms, chat rooms, websites, business card transmittal, or third party referrals. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

The system proceeds from step 272 to step 273b via step 273a where the customer encounters, enters or signs onto the portal, URL, website or other platform to receive customer comments, suggestions, or concerns, which was set up by the user in step 272. The URL or survey can be transmitted to customer in steps 272-273b by telephone calls directly to the recipient, text messages, emails, push notification alerts, website links and full text, email or webpage transmissions. The customer encounters a unique URL or portal, or can be provided with a link to the URL, or portal.

Moreover, the link can be automatically accessed by clicking on the link, or the customer may type in the link to a laptop, pad, mobile phone or desktop computer. As part of step 273a, the customer enters their name, describes their comments, suggestions or concerns, answers any predetermined questions posed by the user, and designates their response urgent or not urgent. Customers can also direct their comments, suggestions or concerns to select individuals, dealers, departments or team members, such as being able to identify or designate one or more team members to receive the comments, suggestions or concerns entered on the CSC portal or URL, if that information is made available to the customer.

After step 273b, the program proceeds to step 276 via step 275, where the program inquires if the customer has completed their entry of comments, suggestions, or concerns on the established portal, URL, website or other platform to receive customer comments, suggestions, or concerns. If the answer is "no" at step 276 that the customer has not completed their entry of comments, suggestions or concerns, the program proceeds to step 278 via step 277 where the program waits a certain period of time before repeating the step 276 query, which gives the customer an opportunity to complete their entry of comments, suggestions or concerns. At step 278, if it is determined that a time period has expired or that a predetermined number of query cycles have occurred, the program will continue on with other operations in step 278.

If the answer is "yes" that comments, suggestions or concerns of the customer have been completed and entered to the customer's satisfaction, the program will proceed to step 280 via step 279 where the customer comments, suggestions and concerns are processed by the system and filtered by the rules and guidelines established by the user on the system. Each question answered on the CSC comments, suggestions and concerns portal, website, URL or platform by the customer can be associated with a set of rules or parameters that can be set up to include various combinations of answers, users, team members, alert notification recipients, previous survey question responses, date/time, as well as other information, data or associations to other questions, customers, team members, dealers or departments. Responses to the questions posed in the CSC comments, suggestions and concerns portal, website, URI, or platform that are outside normal responses, or within certain other parameters for a response, can initiate a trigger to transmit an alert via electronic transmission to one or more users, dealers, department members or managers, or other team members.

After processing of the comments, suggestions and concerns entered by the customer in step 280, the system proceeds to step 281a where the program questions whether any of the customer's comments, suggestions or concerns entered onto the portal, website, URL or platform service follow-up survey will initiate a trigger alert to an appropriate team member, dealer, department, team member or associated person. After the comments, suggestions or concerns entered by the customer are processed, filtered and analyzed by the system in step 280 and if determined to merit a trigger alert in step 281a, the system proceeds to step 289 via step 288 where the system triggers alerts (text, email, push, other electronic notification) to be sent and transmitted to one or more selected users, dealers, department members or managers, or other team members based on the content of the customer's responses to questions presented on the CSC comments, suggestions and concerns portal, website, URI_ or platform.

In step 289, one or more alerts are transmitted to one or more users, dealers, department members or managers, or other team members via electronic delivery (text, email, push notification, SMS). The notification alerts in step 289 can include telephone calls directly to the recipient, text messages, emails, push notification alerts, website links and full text, email or webpage transmissions. The notifications sent in step 289 to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses. After alerts are sent and transmitted, the program proceeds from step 289 to step 287 via step 290.

Depending on the responses given to questions posed in the CSC comments, suggestions and concerns portal, website, URI, or platform, the program may also proceed from step 281a to step 283 via step 282 where responses to the survey are transmitted to the TRS Rating service protocol, which is shown in FIGS. 2E-2G. The TRS Rating service can be linked to other chatrooms or communication platforms maintained and serviced by the program, user, dealer, or team member, or maintained and serviced by a third party.

If the answer to this query in step 281a is "no," the program proceeds to step 285 via step 284 where the program continues to proceed with other subsystems and protocol and proceeds to step 287 via step 286 where the customer can view the final screen on the CSC comments, suggestions and concerns portal, website, URL or platform. On this final screen, the customer can be sent a thank you message for participating in the CRS customer response service follow-up survey. The thank you message can be a simple thank you message or a custom final screen based on the user's selections for the final screen, which are set before the customer enters the CSC comments, suggestions and concerns portal, website, URL or platform.

The CSC protocols shown in the FIG. 2D system components, steps and functionality individually are believed to be novel and enhance the operation of the computer system over that of a generic computer system, including the components, steps and functionality relating to: (1) the initiation, implementation, execution, and operation of a Comments, Suggestion and Concerns (or "CSC") service, protocol system and method, either prompted based on responses to DCS and/or CRS survey questions, automatically initiated, or manually initiated by program users or service personnel; and (2) the initiation, implementation of filtering and identification of responses and survey survey answers from the Comments, Suggestion and Concerns service (CSC).

The sequence of steps ordered in Comments, Suggestion and Concerns service ("CSC"), alone or in combination with the additional system components, steps and functionality individually associated with the Customer Response Service ("CRS"), and the Direct Customer Survey (or "DCS") are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey survey answers from the DCS, CRS and/or CSC systems.

The one or more alerts are transmitted to one or more users, dealers, department members or managers, or other team members via electronic delivery (text, email, push notification, SMS). The notification alerts identified above can include telephone calls directly to the recipient, text messages, emails, push notification alerts, website links and full text, email or webpage transmissions. The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Moreover, the notifications to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

As shown in FIG. 2E (TRS rating service subsystem), the user starts the protocol program at step 291 where the user designates one or more questions from the DCS, CRS and/or CSC surveys as TR Rating survey questions. The marking of the TR Rating survey questions and request to use the TR rating service subsystem can be made at any time, and can be applied to any responses given for any time frame if the responses are maintained in the system. After designating those DCS, CRS and/or CSC survey questions as TR Rating survey questions in step 291, the program proceeds to step 293 via step 292 where a score or value is assigned to the responses from each TR Rating survey question designated in step 291.

After the TR Rating questions are assigned a value or score in step 293, the program proceeds to the query in step 295 via step 294, where the program asks whether the user wants the value or score assigned to the TR Rating questions to normalized and adjusted to a normalized value. If the answer to the question in step 295 is "no," the program proceeds to step 299 via step 298 where the score or value assigned to the responses from each TR Rating survey question are used without being adjusted to a normalized value or normalized in any manner, which makes them raw TR scores.

If the answer to the question in step 295 is "yes," the program proceeds to step 297 via step 296 where the scores and values assigned to the responses from each TR Rating survey question is normalized and adjusted based on a predetermined "x" value, which provides weighting or adjusting to certain answers or divides all the scores by an "x" value to obtain an average rating score or weights certain answers and divides to obtain a weighted average rating score using the values and scores from the assigned responses to the TR Rating questions. Certain responses may be viewed as more important or less important to show the overall customer satisfaction with the service or products, which may dictate how the scores are weighted and averaged to obtain a normalized and adjusted TR Rating score.

Once normalized in step 297, the program proceeds to step 301 via step 302 where the TR rating score is output to the recipient for use in another program, subprogram or application. The TR rating score may be the normalized value rating score resulting from the normalization (weightings, averaging) done in step 297 if normalization is desired by the user or the raw TR scores if no adjusting or normalization is desired by the user in step 299.

After step 301, the program proceeds to step 304 via step 303 where the TR Rating score output in step 301 is provided to platforms, URL, website, bulletin boards or other electronic rating systems, either maintained and supported by the user or another party, as designated by the user, dealer, department, team member or associate to receive such information. The TR Rating score output from step 301 can be some or all of the information posted on the recipient platform, URL, website, bulletin board or other electronic rating systems, either maintained and supported by the user or another party. Other input and information developed or received in step 308 may also be transmitted to the platforms, URL, bulletin boards or other electronic rating systems, which are maintained and supported by the user or another party in step 304 via step 307, with this other input and information may be displayed thereon or used internally in the system.

After step 301, the program also proceeds to step 305 via step 303 where the TR Rating score output in step 301 is provided to a specialized TR Rating platform, URL, website, bulletin board or other electronic rating systems maintained and supported by a TR Rating service, the user or a third party for the benefit of the user, as designated by the user, dealer, department, team member or associate to receive such information. The TR Rating score output from step 301 can be some or all of the information posted on the specialized TR Rating platform, URL, website, bulletin board or other electronic rating system. Other input and information developed or received in step 308 may also be transmitted to the specialized TR Rating platform, URL, electronic bulletin board or other electronic rating system, either maintained and supported by a TR Rating service, the user or another party in step 305 via step 307, with this other input and information may be displayed thereon or used internally in the system.

After step 301, the program also proceeds to step 306 via step 303 where the TR Rating score output in step 301 is provided to an internal or external dashboard, platform, URL, website, bulletin board or other electronic rating systems maintained and supported by a dealer, department, team member or associate, a third party for the benefit of those parties, as designated by the user, dealer, department, team member or associate to receive such information. The TR Rating score output from step 301 can be some or all of the information posted on the internal or external dashboard, platform, URL, website, bulletin board or other electronic rating systems maintained and supported by a dealer, department, team member or associate, a third party for the benefit of those parties. Other input and information developed or received in step 308 may also be transmitted to the internal or external dashboard, platform, URL, website, bulletin board or other electronic rating systems in step 305 via step 307, with this other input and information may be displayed thereon or used internally in the system.

As shown in FIG. 2F (TRS rating service subsystem), the user continues the protocol program at step 309 where the user designates one or more questions from the DCS, CRS and/or CSC surveys as TR comment survey questions. The marking of the TR comment survey questions and request to use the TR rating service subsystem can be made at any time, and can be applied to any responses given for any time frame if the responses are maintained in the system. After designating those DCS, CRS and/or CSC survey questions as TR comment questions in step 309, the program proceeds to step 311 via step 310 where the dealer, department, team member or associated party is asked whether it wants to manually transfer answers to TR comment questions to the TRS Rating service URI, (step 305), the other platform (step 304), or the dealer dashboard (step 306) as described above for disclosure or use by that system.

If the answer in step 311 is "no," the TRS rating service protocol will proceed to step 317 via step 316 to a question step where the rules set by the user are analyzed to determine whether the rule settings permit the answer to the TR comment questions to be transferred to the TRS Rating service URL (step 305), the other platform (step 304), or the dealer dashboard (step 306) as described above for disclosure or use by that system. If the answer to step 317 is "no," the TRS rating service protocol proceeds to step 319 via step 318 where the system does not transfer the chosen responses to the TR comments question to TRS Rating service URI, (step 305), the other platform (step 304), or the dealer dashboard (step 306) as described above for disclosure or use by that system, and the other protocol and subsystems continue to be executed.

If the answer to step 311 or step 317 is "yes," the IRS rating service protocol will proceed via steps 312 and 315, respectively, to step 313 where the response to the TR comment question is transmitted and received by the TRS Rating service URL (step 305), the other platform (step 304), or the dealer dashboard (step 306) as described above for disclosure or use by that system. After step 313, the TRS rating service protocol proceeds to step 320 via step 314 where responses to TR comment questions can be removed based on the rules set by the user or the IRS Rating service URL (step 305), the other platform (step 304), or the dealer dashboard (step 306) as described above for disclosure or use by that system.

Following step 320, the TR rating service protocol proceeds to step 322 via step 321 where any unremoved responses to TR comment questions are screened for any objectionable comments or language.

After step 322, the TR rating service protocol proceeds to step 324 where widgets or specialized applications and tools can be accessed by the user of the TRS rating service, or the dealer, department, team member or associated party if they are given access to the TRS Rating service URL (step 305), the other platform (step 304), or the dealer dashboard (step 306) as described above for disclosure or use by that system. These widgets or specialized applications can be accessed via step 325 to step 326 for current TR Ratings, step 327 for history, step 328 for summary of comments, step 329 for anonymized comments, or 330 for dealer/distributor information. After step 324, the TR rating service protocols proceed to step 322 where the TR Rating scores are converted from one submitted format into a one to five star rating (could be "x" star rating, where "x" is a whole number of 1 or more) based on the level of satisfaction evidenced in the response provided by the customer.

As shown in FIG. 2G (FRS rating service subsystem), the TRS Rating service ITU (step 305), the other platform (step 304), or the dealer dashboard (step 306) as described above for disclosure or use by that system can be accessed in step 335. From step 335, the dealers can access the TRS Rating service URL (step 305), the other platform (step 304), or the dealer dashboard (step 306) via step 336 in step 337 for dealer 1, or in step 338 for dealer 2, or in step 339 for dealer 3, or in step 340 for dealer 4, or in step 341 for dealer 5, or step 342 for other dealers. By dealer, the system may also interchange a dealer with a department, user, associate, team member, or other party.

In step 335, for each TRS Rating service URL (step 305), the other platform (step 304), or the dealer dashboard (step 306) as described above for disclosure or use by that system, the following information, applications and inputs can be accessed (as shown for example in step 337 for dealer 1) via step 343 including: name at 344, address at 345, directions at 346, contact information at 347, hours of operation at 349, current TR Rating score at 350, historical TR Rating score at 351, anonymized comments/review at 352, and sort/search applications at 353. Other information can be added or modified from the above listing, and similar information, applications and inputs can be accessed by the other dealers 2 to x in steps 338-342 as described above.

The TRS rating service protocols shown in the FIG. 2E-2G system components, steps and functionality individually are believed to be novel and enhance the operation of the computer system over that of a generic computer system, including the components, steps and functionality relating to: (1) the initiation, implementation, execution, and operation of an authenticated survey rating service (or "TRS") that receives marked survey responses received from the filtering and identification protocols related to the DCS, CRS and/or CSC subsystems, adjusts the scores from those received and marked responses to a normalized measure, calculates an overall TRS rating score from the customer that is associated with the customer's response, and transmits or posts the IRS rating to: (i) identified personnel in the business or associated businesses, (ii) stakeholders or shareholders in the businesses being evaluated, or (iii) publicly to a website, on-line bulletin board maintained and supported by the system, and/or a chat room maintained and supported by the system. The sequence of steps ordered in TRS authenticated survey rating service, alone or in combination with the additional system components, steps and functionality individually associated with the Customer Response Service ("CRS"), the Comments, Suggestion and Concerns service ("CSC"), and the Direct Customer Survey or "DCS" are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey survey answers from the DCS, CRS and/or CSC systems.

The one or more alerts are transmitted to one or more users, dealers, department members or managers, or other team members via electronic delivery (text, email, push notification, SMS). The notification alerts identified above can include telephone calls directly to the recipient, text messages, emails, push notification alerts, website links and full text, email or webpage transmissions. The alerts to one or more users, dealers, department members or managers, or other team members, can be triggered by responses that indicate assistance, at times immediate assistance, is needed to rectify impressions of the customer as expressed in the survey responses, or the alerts can be triggered based on responses or information provided by the survey recipient that are within or outside the parameters set for survey responses.

Moreover, the notifications to the users, dealers, department members or managers, or other team members or affiliated persons may possess data related to the survey recipient, and this data can be placed in pre-populated and existing databases on the computer systems maintained by the users, dealers, department members or managers, or other team members or affiliated persons. The data related to the survey recipient can include name, address, contact information, and information related to topics answered by the survey recipient regarding desires of the survey recipient to make purchases, preferences on product selection, or views on desired future goods purchases or services to be provided, which can prepopulate fields in the computer systems (e.g. CRM) maintained users, dealers, department members or managers, or other team members or affiliated persons to alert personnel regarding the need to contact the survey recipient or background information that can be used when the survey recipient is contacted.

Figure 3A:
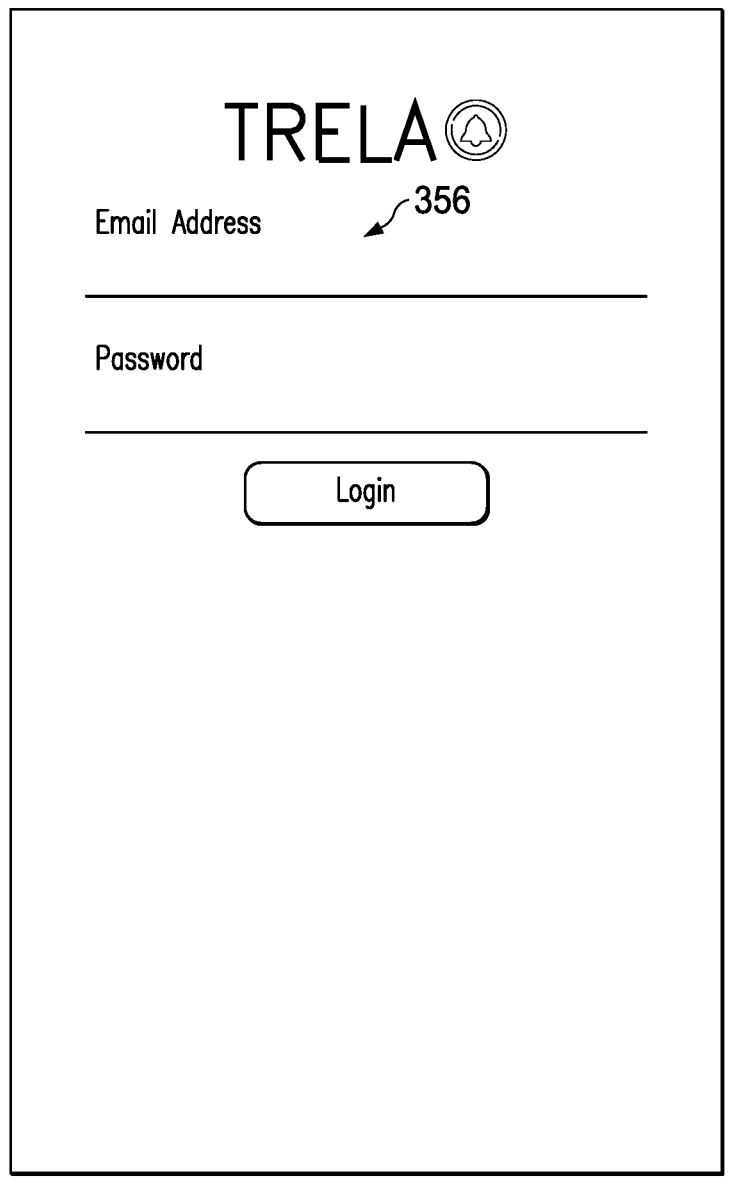
Figure 3B:
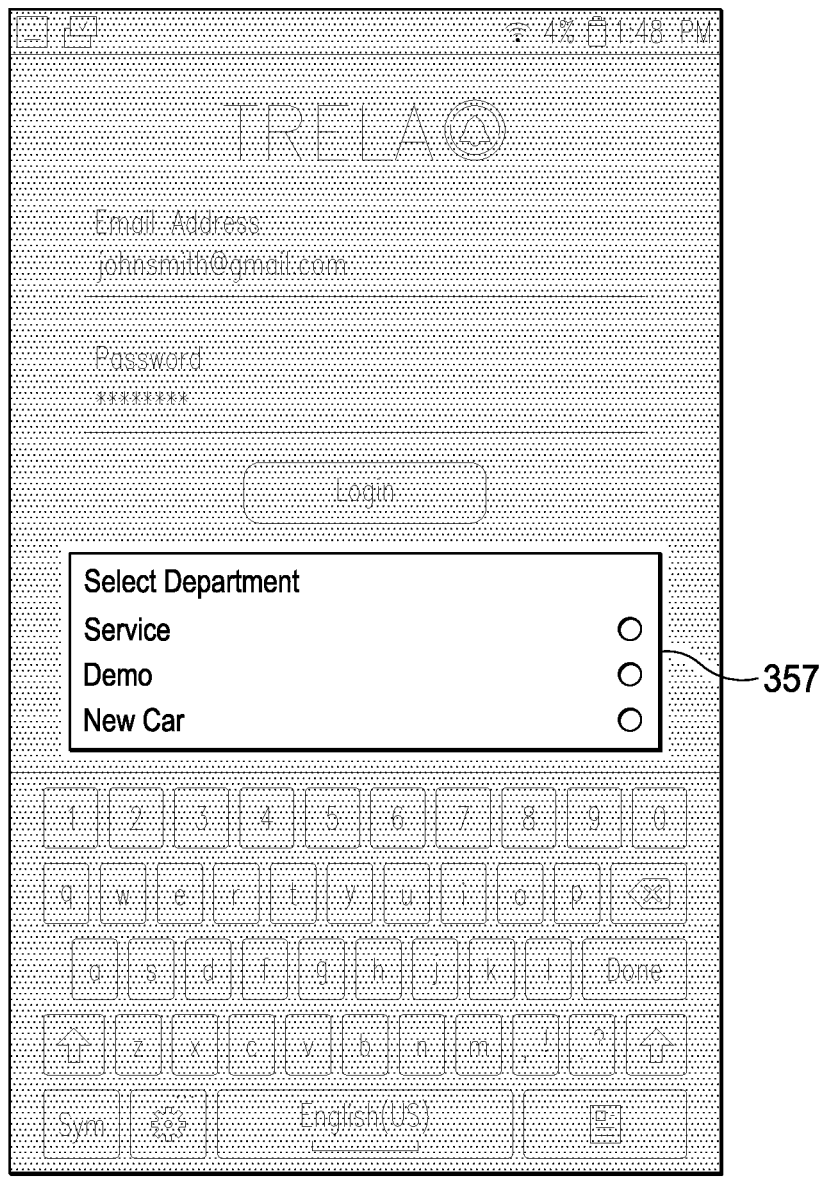
Figure 3E:
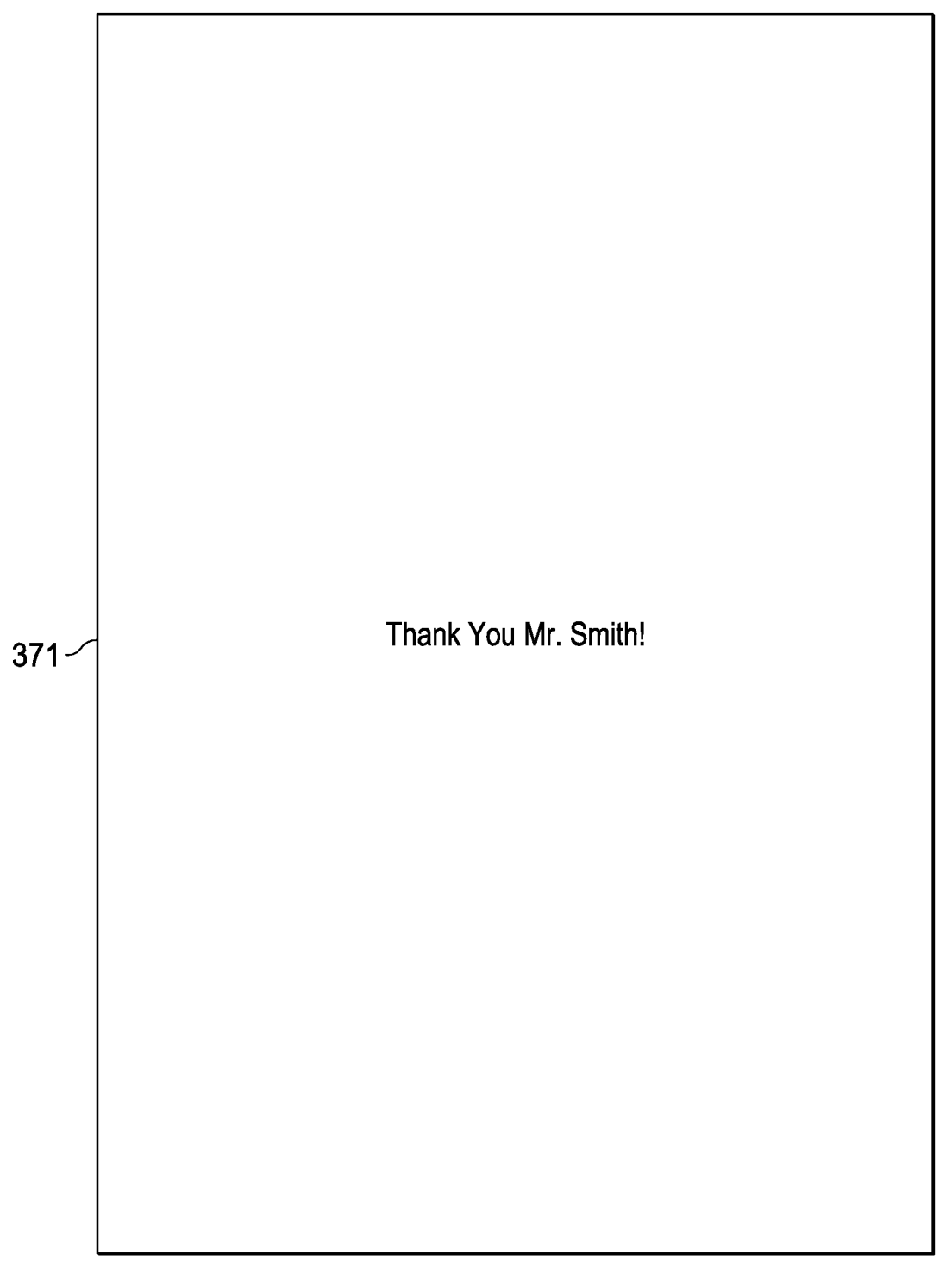
Figure 3F:
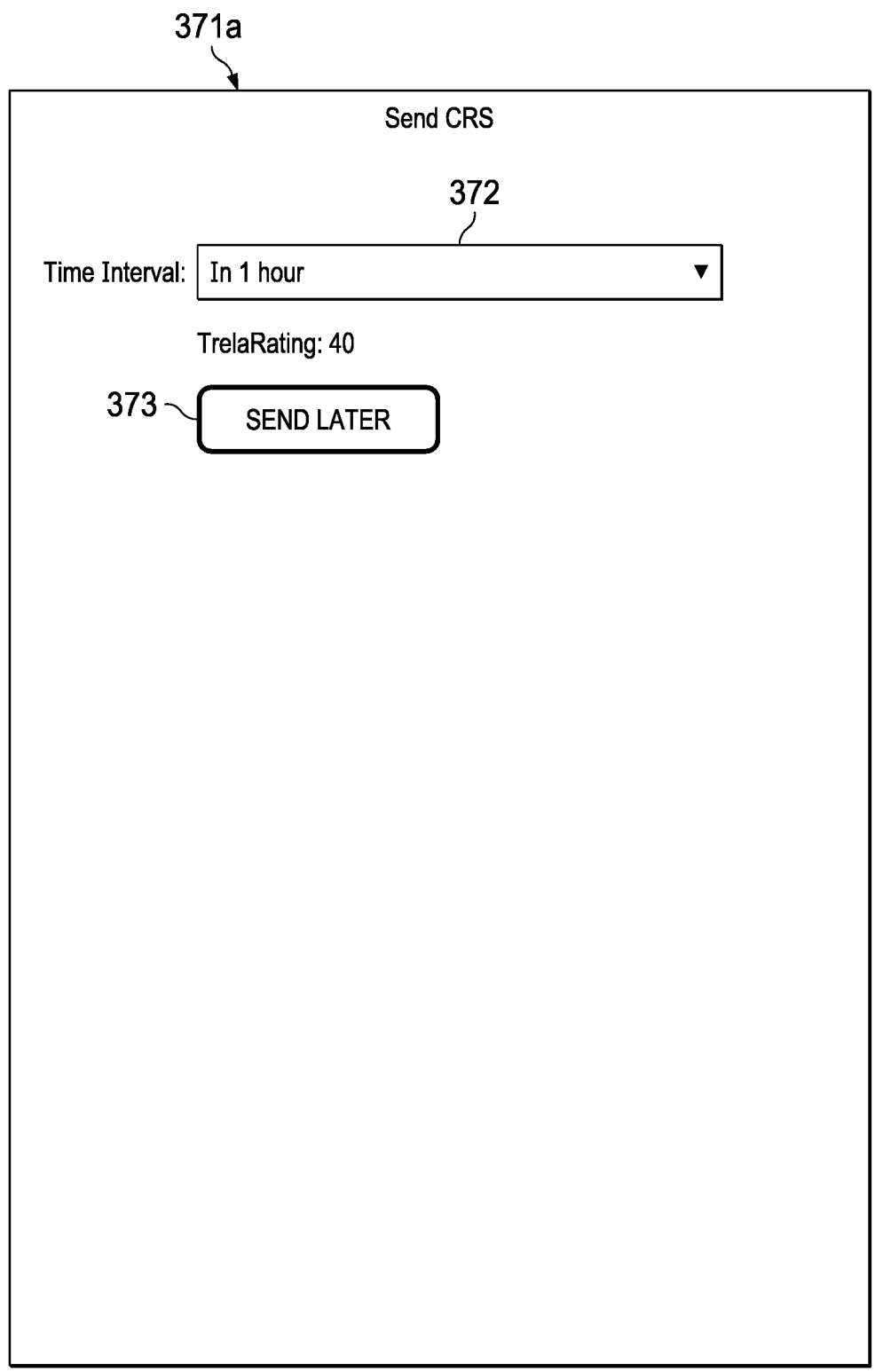

The evaluation information screen displays presented to the customer are shown in FIGS. 3A-3C, 3C1, 3D, 3E and 3F, which include the entry of customer contact information 356 on the login screen shown on FIG. 3A, a department selection 357 as utilized by the customer on screen shown on FIG. 3B, and ticket information 358, advisor and cashier information 359, and vehicle delivery mode 360, with a start survey button on the screen shown on FIG. 3C. As shown on FIG. 3C1, a service department input screen is shown with RO#366, customer name and ID 365, contact information (email, cell phone) 364, customized 1 and 2 inputs 363, advisor and cashier identification fields 362, active and valet delivery designations 361, start button and start instructions 367 shown thereon.

The survey questions 370 on screen FIG. 3l) for the particular vehicle service embodiment, but the system and the survey can be modified to be used in other environments and businesses, such as health care hospital locations, various retail sales locations, apartment complex locations, or any type of business that could benefit from real-time notification of dissatisfied customers with an ability to rectify the customer experience before the customer departs or shortly thereafter. The survey ends with an appreciation statement 371 on the screen shown on FIG. 3E. The setting for sending or transmitting a subsequent CRS survey questionnaire to the customer can be set in screen 371a of FIG. 3F by the "send later" button 373 and the time interval can be specified in designation 372.

After entry of the answers to the questions by the customer, the systems conduct real-time automated filtering and evaluation of feedback entered by the customer as well as transmission of real-time notifications to selected personnel based on feedback evaluation in a flexible messaging and workflow system. These networks support the ability to obtain constructive feedback, either good or bad, regarding a customer's experience while the customer is still at the service provider or retail sales location. And, if the experience is negative, the invention embodied in these networks provide automated evaluation and filtering of the feedback information with real-time notifications to selected personnel so the customer's concerns can be addressed immediately so as to rectify the negative experience with personal attention to the consumer, and preserve the client relationship for the future before the customer departs from the service provider or retail sales location or a short time thereafter.

Identity information relating to the customer can also be preserved in the networks so that the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience.

The following system components, steps and functionality individually are believed to be novel and enhance the operation of the computer system over that of a generic computer system, including the components, steps and functionality relating to: (1) entry of customer experience feedback into the system, (2) then, automated evaluation and filtering of that information on a real-time base, (3) then, real-time notification of selected personnel regarding the customer experience feedback information prior to the customer departing the service provider or retail sales location, where selected personnel include specific members of teams, users, groups or companies (e.g. higher level management), and (4) then, having one or more selected personnel at the service provider or retail sales location address the customer's concerns to enhance the customer's evaluation of the experience or enhance subsequent visits to the service provider or retail sales location. The real-time notifications to said selected personnel include customer background information, survey results, service provider information and services provided to the customer.

Subsequently, after, step 4, the customer and its location can be identified as being present at the service provider or retail sales location upon a subsequent visit, and real-time notifications can be sent to selected personnel so that the customer experience during the subsequent visit to that location can be enhanced in some manner or more personal attention can be provided to reduce the risk of a negative experience. This ordered sequence of steps 1-4, with and without the addition of the subsequent location recognition steps, is believed to be novel in that the ordered combination of steps transforms the claims into patent-eligible subject matter.

Additionally, components, functionality and steps supported by these networks include the preparation and revision of standard or individualized feedback evaluation questions by authorized users, with flexible assignment of these evaluation questionnaires for specific members of companies, teams, users, or groups providing services or products or entire groups of users, teams or companies. And, the networks provide for the flexible assignment of team members, users, and companies, as well as the preparation and transmission of messaging to entire team members, users, groups and companies or specific members of teams, users, companies, and groups. These flexibly assigned team members, users and companies can receive real-time notifications by text, email or other instant messaging, as well as daily or periodic reports, inquiries, notifications or bulletins to by the same message formats to improve work flow and attention to the customer experience. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Based on the evaluation and filtering of customer feedback evaluations, the networks provide benchmark information and trending information that can be developed and provided in notifications to selected personnel, including trending information regarding the performance of individuals in a group, team, or company or entire groups of users, teams, or companies, Such trending information can identify individuals or groups that are under-performing or exceeding benchmark standards set by management or officers of the business to that rewards, bonuses, or additional training can be provided based on those results.

Each of these additional components, functionalities and steps, when combined with the attributes, components and steps described immediately above, are considered to be novel because each individually enhances the operation of the computer system over that of a generic computer system. Moreover, the ordered sequence of steps 1-4, with the additional components, functionalities and steps and with the addition of the subsequent location recognition steps, is believed to be novel in that the ordered combination of steps transforms the claims into patent-eligible subject matter.

Figure 4:
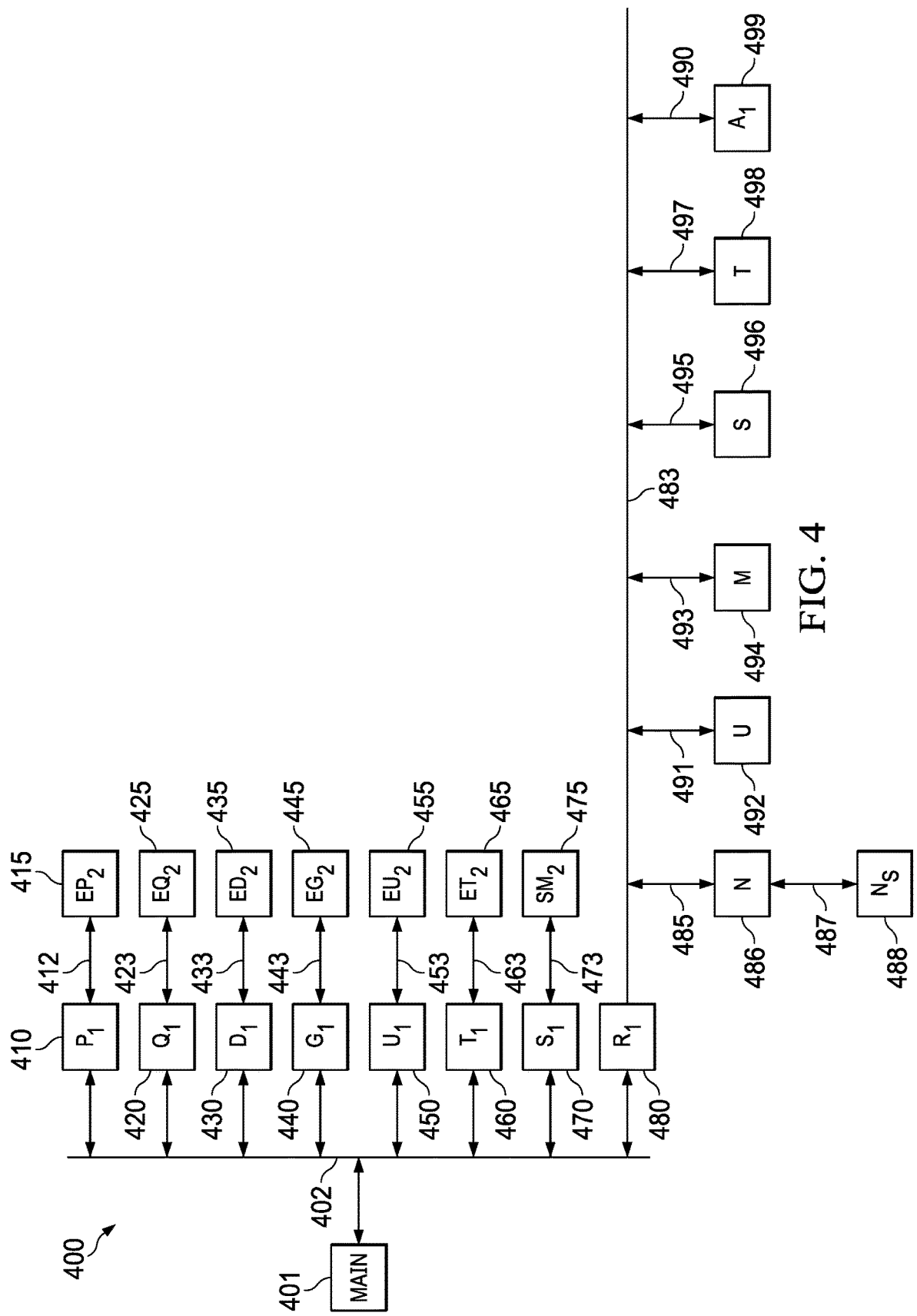
FIG. 4 is a diagram illustrative of message flows and communication links used in the present invention.

The process workflow for the present invention is shown in FIG. 4, where the main page 401 can access other pages in the program via connection 402. From the main page 401, the profiles of users, team members, companies or groups can be viewed on the profiles page 410, and the profiles can be edited on edit profile page 415 via connection 412. From the main page 401, the questions can be reviewed for standard questions or particularize users, team members, companies or groups on the questions page 420, and the questions can be edited on question edit department can have questions asked that are particularized for their service or abilities, and the evaluation of these questions by the network can provide a benchmark standard for typical, mean or median responses (within the standard of deviation) so that personnel will be notified if responses are received outside or below that benchmark standard.

From the main page 401, the dealer identification profile can be viewed on the dealer profile page 430, and the dealer profile can be edited on edit profile page 435 via connection 433. From the main page 401, the group profiles can be viewed on page 440, and the group profiles can be edited on page 445 via connection 443. From the main page 401, the profiles of users can be viewed on the user's profiles page 450, and the user profiles can be edited on page 450 via connection 453. From the main page 401, the profiles of team members can be viewed on the team profiles page 460, and the team profiles can be edited on edit team profile page 465 via connection 463.

Messages can be viewed as received by a person on the network as shown on message page 470 as accessed via connection 402 from the main page 401, and messages can be edited on the edit message page 475 as connected to message page 470 via connection 473. Reports are generated and selected through reports screen 480, as accessed through connection 402 from the main screen 401. Reports can be viewed and generated from screen 480 via connection 483 to notifications report 486 accessed through connection 485 (which is connected to a notifications sent report page 488 accessed from notifications page 486 through connection 487, user listing reports 492 (can include users, groups, companies, or teams) accessed through connection 491, maintenance report 494 accessed through connection 493, survey results report 496 accessed through connection 495, trending report 498 accessed through connection 497. Reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Daily reports can also be generated from page 480, which will include the benchmark standards for selected users, group, company, team or department using a benchmark rating subroutine. The authorization access report page 499 can be accessed via connection 499. Daily reports can also be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Figure 5A:
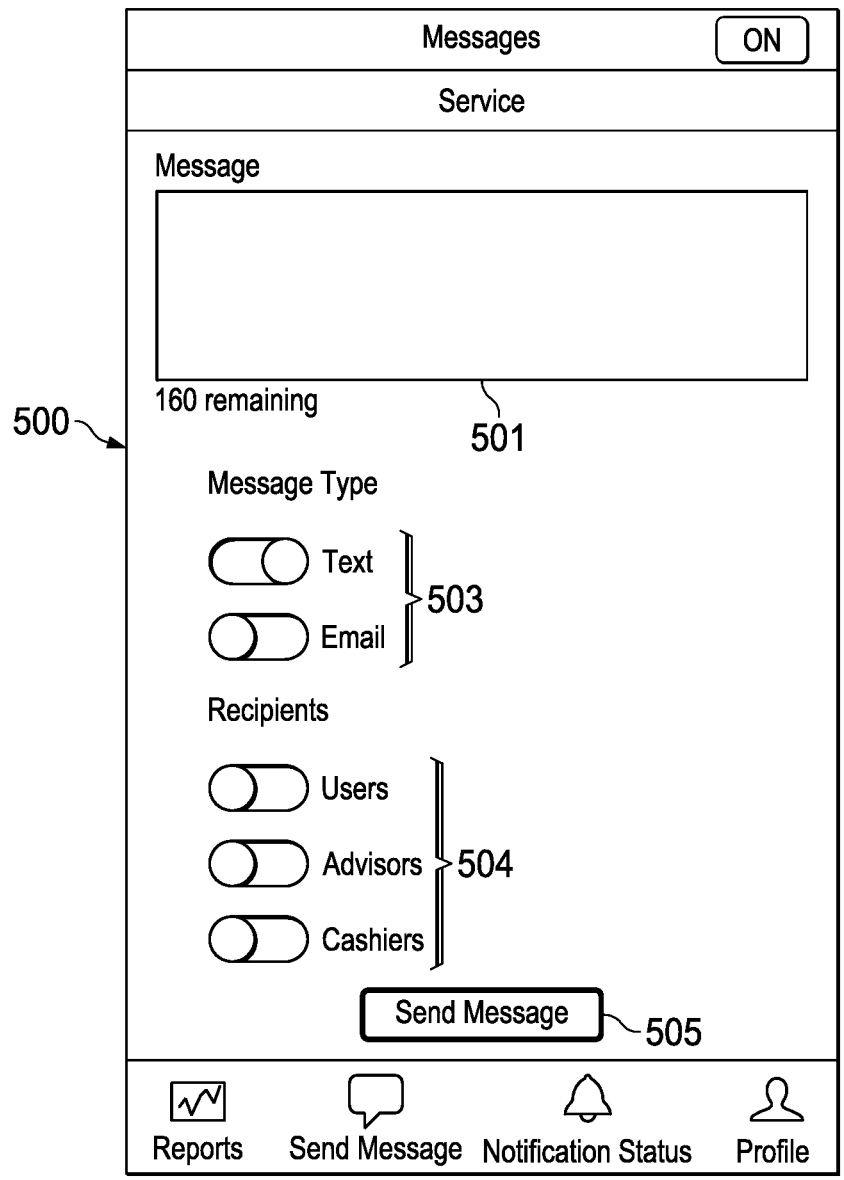
Figure 5B:
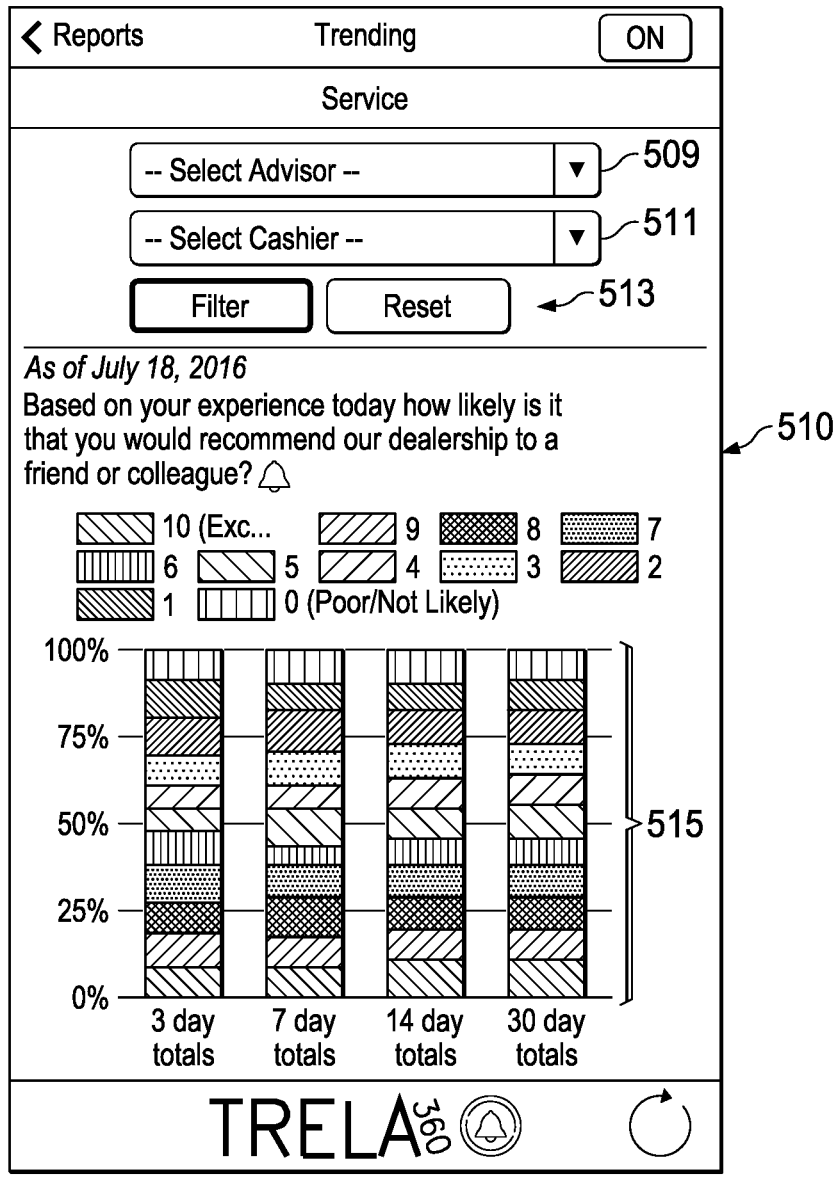
Figure 5D:

As shown in FIGS. 5A-5D, 5D1, 5E, 5E1, 5F, 5F1, 5G, 5H, and 5I, several different graphical user interfaces for the mobile hand-held unit or the desktop application are shown. These user interfaces include the messages user interface 500 shown in FIG. 5A, which shows the message 501 to be sent, the type of message selected 503, the recipients 504 and a send button 505. The trending interface 510 is shown in FIG. 5B with the advisor selection 509, cashier selection 511, filter engage or reset buttons 513, and the graphical trending data chart 515 for evaluation answers provided by customers. The Questions user interface 520 shown in FIG. 5C includes the questions posed 522 posed to customers, edit buttons 521 and the archived questions 523. The edit questions user interface 530 shown in FIG. 5D shows the question being edited 531, the answer format 532, the notification setting 533, the range of customer answers 534, required answer field 536, sort order 537 for question presentation, benchmark selection 538 for use in benchmarking the results, and a save/cancel button 538. FIG. 5D1 shows the question page 530a with fields for question being edited 531s, the answer format 532s, the alert notification setting 533a, the range of customer answers 534a, alert notification to specified recipients 535a, alert team notification setting 535l, threshold of responses that trigger the alerts 535c, other team members or persons to alert 535d, required answer field 536a, designate as a TR rating or TR comment question 538b, and a save/cancel button 538a.

The edit user interface 540 is shown in FIG. 5E with a first name 544 and last name 541 fields, an email address 545, phone/text number 542, a selection to use for text alerts and messages 543a, a selection to use for email alerts and messages 543b, a notification status 546, a department selection field 547, access/permission field 548, password and confirm password fields 549, and a save/cancel button 542a. The edit user or team member interface 540a is shown in FIG. 5E1 with a first name 544a and last name 541a fields, an email address 545a, phone/text number 542a, a selection to email alert from DCS, CRS or CSC protocols 543c, a selection to text alert from DCS, CRS or CSC protocols 543d, a notification status 546a, a designation of the activated notification questions 547a, a department notifications selected field 547b with access/permission field, a password and confirm password fields 549a, and a save/cancel button 542b.

Figure 5F:

The edit team member or advisor interface 550 is shown in FIG. 5F with a first name 551 and last name 552 entry field, a type field 553 for the member, a notification status field 554, and email address 555 field with selection button, a phone/text number entry field 556 with selection button, an active button 557, and a save/cancel button 558. The edit team member or advisor interface 550a is shown in FIG. 5F1 with a first name 551a and last name 552a entry field, a selection to email alert from DCS, CRS or CSC protocols or other messages 553a, a selection to text alert from DCS, CRS or CSC protocols or other messages 553b, a notification status field 554a, an access/permission field 556a, a password 557a and confirm password fields 557b, and a save/cancel button 558.

Figure 5I:
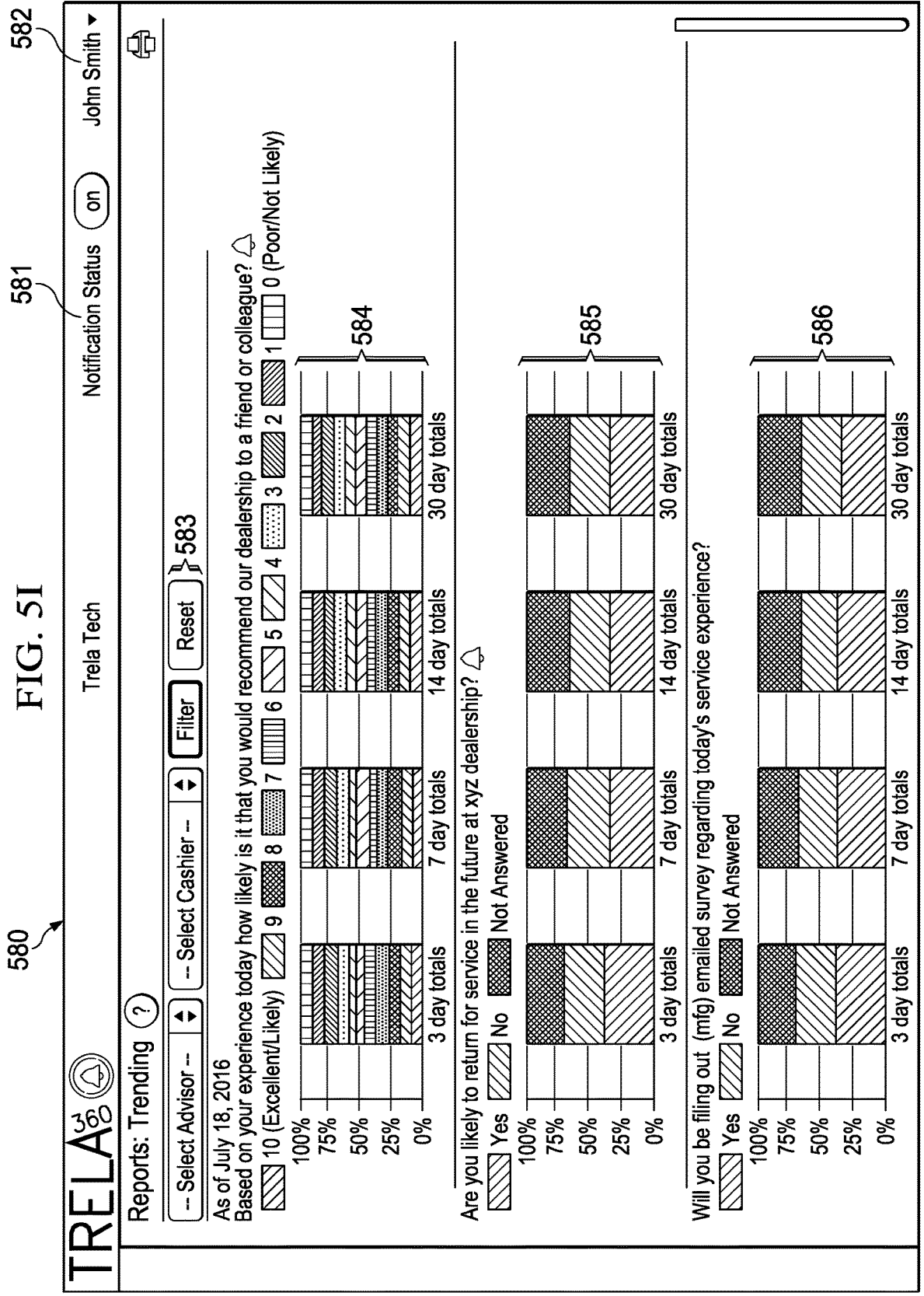

A send message interface 560 is shown in FIG. 5G, which shows the message 561 to be sent, the type of message selected 562, the recipients 563 and a send button 564. The Reports interface for Notifications 570 is shown in FIG. 5H with different company listings 571, 572 and 573 and the details buttons 575 to provide additional information on the company. The Reports interface for Trending 580 is shown in FIG. 5I with the notification status 581, the user identification 582, the selection buttons for advisor, cashier, filter and reset buttons 583 and the trending results by question 584, 585 and 586. The Notifications and Trending reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Figure 6C:
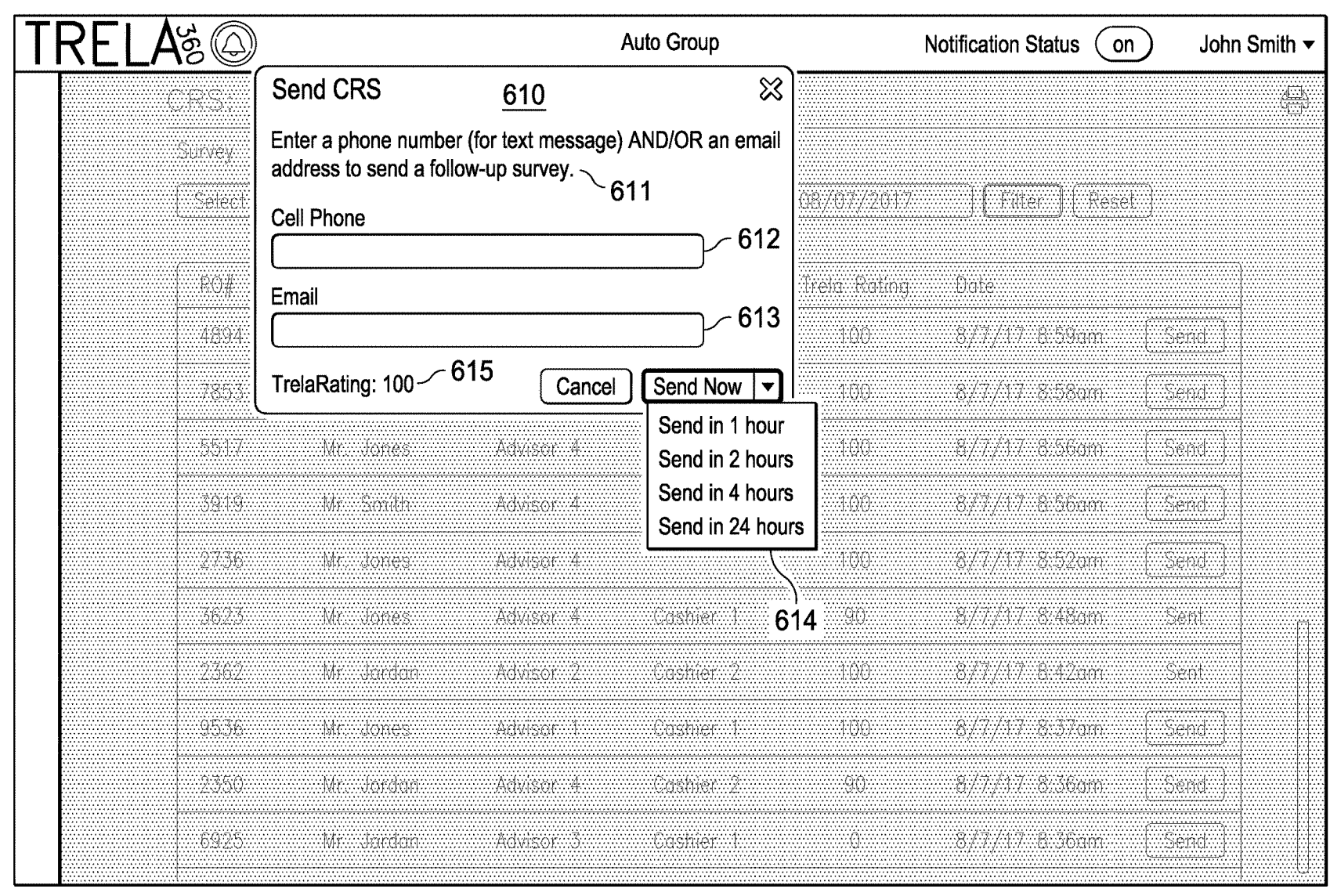

As shown in FIGS. 6A, 6B, 6C, 6D, 6D1, 6E, 6F, 6G1, and 6G2, the screen displays for a mobile unit or a desktop unit as generated according to the CRS protocols in the present invention as described above. A CRS Question display screen 630 is shown in FIG. 6A with fields for inputting and displaying the CRS questions 631, a reorder button selection 632, the answer format numeric designation 633, the comment answer format 634, a notification alert trigger activation button 637, an add button 635 to add a question, and an edit question button 636. An edit CRS question display screen 620 is shown in FIG. 6B, where fields are shown for input and display of CRS questions 621, answer format designation 622 (numeric, comment), user/team notification trigger alert activation 623, threshold for customer responses to activate and trigger alter notifications 624, persons designated to receive alters and notifications 625, requirement for customer answer 626, TR rating designation for survey question 627, a save/cancel button 628, and an archive/delete button 629.

As shown in FIG. 6C, the Send CRS protocol screen 610 has instructions 611, a cell phone entry field 612, an email entry field 613, a TR rating score display, and a cancel/send now (or later) button 614. FIG. 6D shows the CRS screen 600 that permits designation of TR questions 601 as a TR rating survey question or TR comment questions, scheduling of the CRS field 602, manual send CRS field 603 for designation of threshold responses to trigger a CRS request, interval to send CRS field 604, TR designation question display field 605, social media linkage activation 606 and the save button 607. FIG. 6D1 shows a dashboard screen 650 with survey TR ratings 651 at 651a-d for different time periods, percentage of completion information fields 652, CSC responsiveness fields 653 at 653a-d for different time periods, urgent CRS designation flags 654, CRS responsiveness fields 655 at 655a-d for different time periods, and completion and transmission fields 656 and 657.

Figure 6E:
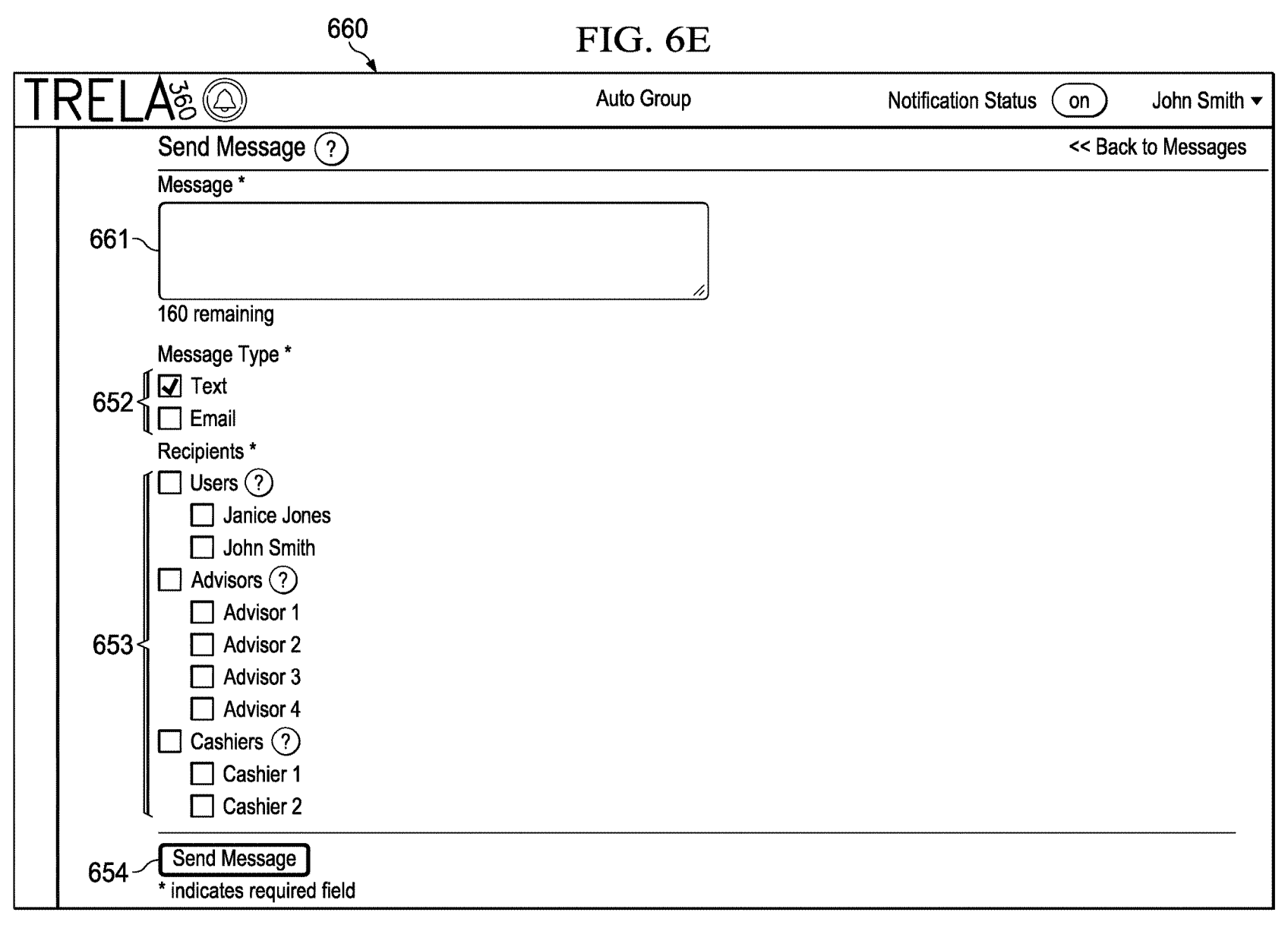

In FIG. 6E, the transmission message screen 660 is shown with message field 661, message type field 652, recipient designation 653, and send message button 654; and, in FIG. 6F, the profile page 660 for the customer, user, or team members is shown with fields for first name 661, last name 662, email address 663, cell phone 664; notification status field 665, password 666, confirm password 667, and save/cancel button 668. The CRS Reports screen 670 is shown in FIGS. 6G1 and 6G2 with a field for CRS Question selection 671, identification information filter field 672, and historical responses and rating information display field 673 for the customer, advisor, cashier, date range set by filter. CRS reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

Figure 6H:
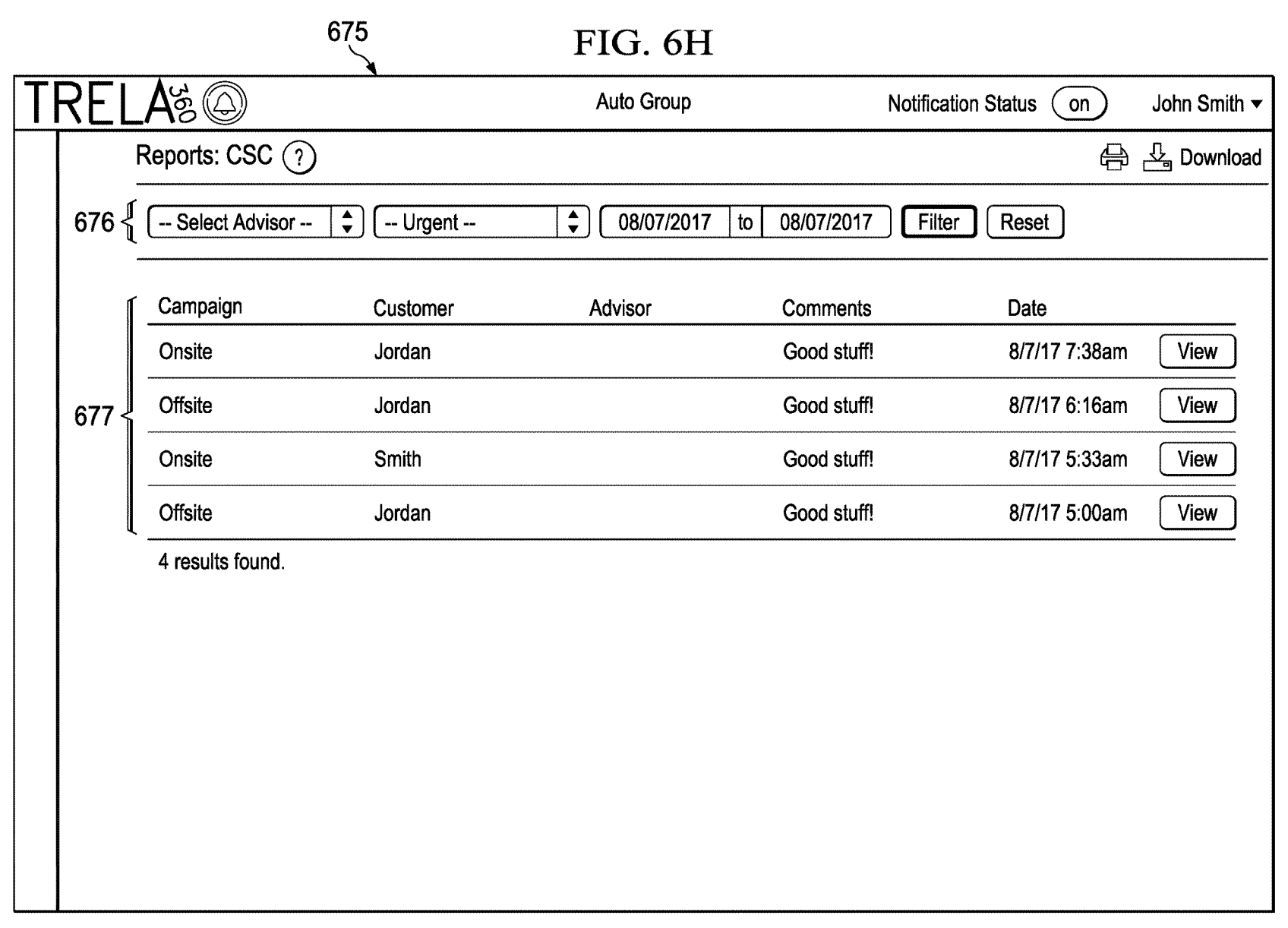

As shown in 6H, 6I1, 6I2, 6I3, 6J, 6K, and 6L, the screen displays for a mobile unit or a desktop unit as generated according to the CSC protocols and other protocols in the present invention as described above. The CSC Reports screen 675 is shown in FIG. 6H with a field for identification information filter field 676, and historical responses and comments display field 677 for the customer, advisor, cashier, and date range set by filter. A Daily Reports screen 680 is shown in FIGS. 6I1, 6I2 and 6I3 with the identification information filter field 681 and the historical ratings report display field 682, likely to return field display 683, active delivery reports field 684, survey completion totals field 685, CSC display field 686, a CRS display field 687, and a comments answered field 688. The Social Media screen 690 in FIG. 6I1 displays a source field 691 and a display report of social media comments and ratings 692, and a Dealer report screen 694 is shown in FIG. 6K with a listing dealer display field 695. A TR Ratings screen 697 in FIG. 6L shows a dealer display field 698 with ratings for each dealer and an unassigned auto group field 699.

Figure 7C:

FIGS. 7A1, 7A2, 7B, 7C, 7D and 7E show the screen displays for a mobile unit or a desktop unit as generated according to the TR rating service protocols according to the present invention. The TR Rating Details screen 700 is shown in FIG. 7A1-7A2 with a auto service group field 701a, an over customer experience display report field 701b, a distribution of ratings field 702, a likely to return distribution field 703, a share comments request distribution field 704, and an enter an email address distribution field 705. The TR Rating reports can be accessed by internal users or members within an entity, group, dealer, department, or company; or, alternatively, reports can be accessed by external users, team members, affiliates or other persons or external companies outside the dealer, department or company so that information can be accessed on a restricted basis relating to that external user, team member, affiliate or other person or company outside the internal user, group, team member, dealer, department or company.

In FIG. 7B, the TR comments screen 710 is shown with satisfaction question fields 711 and 712 and likely to return field 713, as well as additional comments question field 714. The Five Star Rating screen 720 is shown in FIG. 7C with a service department field 721 and a rating field 722. The thank you appreciation screen 730 is shown in FIG. 7D with an overall experience question field 731 and any other comments field 732, and a CSC screen 740 is shown in FIG. 7E with a name field 741, answer field 742, urgent designation 743, a comments field 744 and a submit button 744.

Each of the components, functionalities and steps described for the present invention are considered to be novel because each individually enhances the operation of the computer system over that of a generic computer system. Moreover, the ordered sequence of steps 1-4 of the DCS system, with the additional components, functionalities and steps and with the addition of the subsequent location recognition steps, is believed to be novel in that the ordered combination of steps transforms the claims into patent-eligible subject matter.

Moreover, the sequence of steps ordered in Direct Customer Survey or "DCS", alone or in combination with the additional system components, steps and functionality individually associated with the Customer Response Service ("CRS"), the Comments, Suggestion and Concerns service ("CSC"), and the TRS authenticated survey rating service are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey survey answers from the DCS, CRS and/or CSC systems. The sequence of steps ordered in Customer Response Service ("CRS"), alone or in combination with the additional system components, steps and functionality individually associated with the Direct Customer Survey or "DCS", the Comments, Suggestion and Concerns service ("CSC"), and the IRS authenticated survey rating service are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey, answers from the DCS, CRS and/or CSC systems.

The sequence of steps ordered in the Comments, Suggestion and Concerns service ("CSC"), alone or in combination with the additional system components, steps and functionality individually associated with the Direct Customer Survey or "DCS", the Customer Response Service ("CRS"), and the TRS authenticated survey rating service are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems. The sequence of steps ordered in TRS authenticated survey rating service, alone or in combination with the additional system components, steps and functionality individually associated with the Direct Customer Survey or "DCS", the Comments, Suggestion and Concerns service ("CSC"), and the Customer Response Service ("CRS") are believed to be novel in that the ordered combination of steps transforms the claims into patent-eligible subject matter, and are believed to be novel and enhance the operation of the computer system over that of a generic computer system, as well as the initiation, implementation of filtering and identification of responses and survey answers from the DCS, CRS and/or CSC systems.

The foregoing description of embodiments of the invention has been presented only for the purpose of illustration and description and is not intended to be exhaustive or to limit the invention to the precise forms disclosed. The present invention correlates and associates various customer data provided during stages of surveys and during associated requests for feed-back to provide integrated notifications and notices, as well as integrated data sharing, to team members, associates, dealers, department members, and any other associated or affiliated person. While the preferred embodiment describes a car dealership/service department scenario, the present invention could be used in any retail service situation (or retail sales of goods). Numerous modifications and adaptations thereof will be apparent to those skilled in the art without departing from the spirit and scope of the present invention.

We claim:

1. A communication system supporting the processing of communications between a home network and one or more mobile units, comprising:
a first hardware data processor on the home network coupled to a first mobile unit, said first hardware data processor having data processors executing a plurality of service subsystems, said first hardware data processor detects that a customer is present at the service provider location upon a subsequent visit, said plurality of service subsystems including:
a direct customer survey subsystem using specialized data processors with programmed functionalities to:
(a) receive a first set of customer experience feedback responses provided by a customer using said first mobile unit in response to a first survey request;
(b) evaluate said customer experience feedback responses from said first survey request on a real-time basis in order to determine whether to issue real-time notifications to one or more predetermined personnel if the first set of customer experience feedback responses fail to satisfy a minimum predetermined standard,
(c) issue one or more real-time notifications to said predetermined personnel to notify those one or more predetermined personnel that the first set of customer experience feedback responses from said first survey request fail to satisfy a minimum predetermined standard, (d) prepares and stores database reports on the first sets of customer experience feedback responses from said first survey request;

(e) maintains and supports use of data, customer information, software modules and operational codes on the home network;

a customer response service subsystem using data processors with programmed functionalities for:

(a) initiation, implementation of filtering, and identification of responses and survey answers from the direct customer survey subsystem for one or more customer experience feedback response;

(b) initiation, implementation, execution and operation of a customer response service based on responses to direct customer survey questions;

an authenticated survey rating service subsystem using data processors with programmed functionality that:

(a) receives marked survey responses from the filtering and identification protocols from one or more of the direct customer survey subsystems and the customer response service subsystem;

(b) supports access of said reports by third parties involved with companies that have been given appropriate access to the reports;

(c) populates data fields on a computer database maintained by a user, third party, team member, dealer or department when said notification is transmitted to said predetermined personnel, said data fields include identification and contact information related to said customer;

a home agent on the home network coupled to said first hardware data processor, said home agent using data processors to execute operational subroutines to:

(a) control receipt of one or more communications from said first mobile unit; and (b) manage the processing and evaluation of said one or more communications;

(c) controls the transmission of said first survey request to said mobile unit;

(d) controls the receipt and routing of said first set of customer experience feedback responses from said first survey request from said mobile unit;

(e) controls the receipt and routing of said second set of customer experience feedback responses from said second follow-up survey request from said mobile unit; and, (f) controls the transmission of real-time notifications to said predetermined personnel;

a first non-transitory storage devices coupled to said home agent and first hardware data processor on said home network, said first non-transitory storage devices maintaining information related to the customer and personnel at the home network, said first non-transitory storage devices having information regarding trends relating to customer experience feedback, and, a transceiver subsystem coupled to said home network through a first gateway providing a communications interface for communications between the home network and said first mobile unit, said transceiver subsystem receives and transmits communications between said home network and said mobile unit.

2. The communication system according to claim 1, wherein said direct customer survey subsystem using data processors with programmed functionalities to:

(a) receive a second set of customer experience feedback responses provided by said customer using said first mobile unit in response to a second follow-up survey request;

(b) evaluate said second set of customer experience feedback responses from said second follow-up survey request on a real-time basis in order to determine whether to issue real-time notifications to one or more predetermined personnel if the second set of customer experience feedback responses fail to satisfy a minimum predetermined standard, and (c) issue one or more real-time notifications to said predetermined personnel to notify those predetermined personnel that the second set of customer experience feedback responses from said second follow-up survey request fail to satisfy a minimum predetermined standard.

3. The communication system according to claim 1, further comprising a comments, suggestions and concerns service subsystem using data processors with programmed functionalities for:

(a) initiation, implementation of filtering, and identification of responses and survey, answers from the customer response service subsystem; and (b) initiation, implementation, execution and operation of a comments, suggestions and concerns service based on one or more or the direct customer survey responses and the customer response service responses.

4. The communication system according to claim 1, wherein said authenticated survey rating service subsystem using data processors with programmed functionality that: (a) receives scores associated with responses from said customer to one or more marked questions on said first survey request or said second follow-up survey request, said one or more marked questions on said first survey request or said second follow-up survey request are designated in that manner by the user, team member or associate; (b) evaluates the scores associated with responses from said customer to one or more marked questions on said first survey request or said second follow-up survey request, (c) translates written statement responses into rating scores based on associated with responses from said customer to one or more marked questions on said first survey request or said second follow-up survey request; and (d) calculates a rating score based on the evaluation of the scores associated with responses from said customer to one or more marked questions on said first survey request or said second follow-up survey request.

5. The communication system according to claim 4, wherein said authenticated survey rating service subsystem using data processors with programmed functionality that: (a) normalizes the scores associated with responses from said customer to one or more marked questions on said first survey request or said second follow-up survey request; (b) calculates an overall survey rating score from one or more customer; and (c) transmits the overall survey rating score to one or more of selected personnel, stakeholder, shareholders.

6. The communication system according to claim 5, wherein said authenticated survey rating service subsystem using data processors with programmed functionality that: (a) translates ratings of 0 to n stars based on normalized scores of calculated rating scores associated with responses from said customer to one or more marked questions on said first survey request or said second follow-up survey request, where n is an integer; (b) transmits the normalized scores of calculated rating scores associated with responses from said customer to one or more marked questions on said first survey request or said second follow-up survey request to a website, electronic bulletin board, or chat room for posting; and (c) transmits social media links to the customer with the normalized scores of calculated rating scores associated with responses from said customer to one or more marked questions on said first survey request or said second follow-up survey request.

7. The communication system according to claim 1 further comprising:
one or more data entry terminals located on said home network for access to the hardware data processor, home agent or non-transitory storage devices on the home network.

8. The communication system according to claim 1 further comprising:
a second hardware data processor coupled to said home network and said first non-transitory storage devices, said second hardware data processor facilitating communications to said home network through the Internet.

9. The communication system according to claim 1 wherein one or more of said selected personnel receive notification on a second mobile unit.

10. The communication system according to claim 1 wherein said notification to one or more selected personnel includes survey responses, customer name and service providers and service provided to Customer.

11. The communication system of claim 1 wherein said first hardware data processor transmits a real-time notification to one or more predetermined personnel upon detection of the customer at the service location at a subsequent visit so that the customer experience during the subsequent visit to that location can be enhanced in some manner.

12. The communication system of claim 1 wherein said comments suggestions and concerns service subsystem transmits to the customer links to the comments, suggestions and concerns platform via webpage link, URL, text messages or email message.

13. The communication system of claim 1 wherein said notification to said predetermined personnel are transmitted by a phone call, text message, full text communications, webpage transmission, URL link, push message, and email transmission.

14. The communication system of claim 1 wherein said selected personnel can be specific members of companies, teams, users, or groups.

15. A communication system supporting the processing of communications between a home network and one or more mobile units, comprising:
a first hardware data processor on the home network coupled to a first mobile unit, said first hardware data processor having data processors executing a plurality of service subsystems, said first hardware data processor detects that a customer is present at the service provider location upon a subsequent visit and said plurality of service subsystems including:
a direct customer survey subsystem using specialized data processors with programmed functionalities to:
(a) receive a first set of customer experience feedback responses provided by a customer using said first mobile unit in response to a first survey request;
(b) evaluate said customer experience feedback responses from said first survey request on a real-time basis in order to determine whether to issue real-time notifications to one or more predetermined personnel if the first set of customer experience feedback responses fail to satisfy a minimum predetermined standard,
(c) issue one or more real-time notifications to said predetermined personnel to notify those one or more predetermined personnel that the first set of customer experience feedback responses from said first survey request fail to satisfy a minimum predetermined standard,
(d) prepares and stores database reports on the first and second sets of customer experience feedback responses from said first survey request and said second follow-up survey request, respectively; and
(e) maintains and supports use of data, customer information, software modules and operational codes on the home network;
an authenticated survey rating service subsystem using data processors with programmed functionality that:
(a) receives marked survey responses from the filtering and identification protocols from one or more of the direct customer survey subsystems and the customer response service subsystem,
(b) supports access of said reports by third parties involved with companies that have been given appropriate access to the reports;
a home agent on the home network coupled to said first hardware data processor, said home agent using data processors to execute operational subroutines to:
(a) control receipt of one or more communications from said first mobile unit,
(b) manage the processing and evaluation of said one or more communications;
(c) controls the transmission of said first survey request to said mobile unit;
(d) controls the receipt and routing of said first set of customer experience feedback responses from said first survey request from said mobile unit;
(e) controls the transmission of real-time notifications to said predetermined personnel;
a first non-transitory storage devices coupled to said home agent and first hardware data processor on said home network, said first non-transitory storage devices maintaining information related to the customer and personnel at the home network, said first non-transitory storage devices having information regarding trends relating to customer experience feedback, and,
a transceiver subsystem coupled to said home network through a first gateway providing a communications interface for communications between the home network and said first mobile unit, said transceiver subsystem receives and transmits communications between said home network and said mobile unit.

16. The communication system according to claim 15 wherein the direct customer survey subsystem further uses specialized data processors with programmed functionalities to: (a) receive a second set of customer experience feedback responses provided by said customer using said first mobile unit in response to a second follow-up survey request; (b) evaluate said second set of customer experience feedback responses from said second follow-up survey request on a real-time basis in order to determine whether to issue real-time notifications to one or more predetermined personnel if the second set of customer experience feedback responses fail to satisfy a minimum predetermined standard, (c) issue one or more real-time notifications to said predetermined personnel to notify those predetermined personnel that the second set of customer experience feedback responses from said second follow-up survey request fail to satisfy a minimum predetermined standard.

17. The communication system according to claim 15 wherein said plurality of service subsystems further includes a customer response service subsystem using data processors with programmed functionalities for:
  (a) initiation, implementation of filtering, and identification of responses and survey answers from the direct customer survey subsystem for one or more customer experience feedback response; and
  (b) initiation, implementation, execution and operation of a customer response service based on responses to direct customer survey questions.

18. The communication system according to claim 15 wherein said authenticated survey rating service subsystem using data processors with further programmed functionality that:
  (a) receives scores associated with responses from said customer to one or more marked questions on said first survey request or said second follow-up survey request, said one or more marked questions on said first survey request are designated in that manner by the user, team member or associate; and
  (b) evaluates the scores associated with responses from said customer to one or more marked questions on said first survey request.

19. The communication system according to claim 18 wherein said authenticated survey rating service subsystem using data processors with further programmed functionality that:
  (a) translates written statement responses into rating scores based on associated with responses from said customer to one or more marked questions on said first survey request or said second follow-up survey request; and
  (b) calculates a rating score based on the evaluation of the scores associated with responses from said customer to one or more marked questions on said first survey request or said second follow-up survey request.

20. The communication system according to claim 19 wherein said authenticated survey rating service subsystem using data processors with further programmed functionality that:
  (a) normalizes the scores associated with responses from said customer to one or more marked questions on said first survey request or said second follow-up survey request;
  (b) calculates an overall survey rating score from one or more customer; and
  (c) transmits the overall survey rating score to one or more of selected personnel, stakeholder, shareholders.

21. The communication system according to claim 20 wherein said authenticated survey rating service subsystem using data processors with further programmed functionality that:
  (a) translates ratings of 0 to n stars based on normalized scores of calculated rating scores associated with responses from said customer to one or more marked questions on said first survey request or said second follow-up survey request, where n is an integer; and
  (b) transmits the normalized scores of calculated rating scores associated with responses from said customer to one or more marked questions on said first survey request or said second follow-up survey request to a website, electronic bulletin board, or chat room for posting.

22. The communication system according to claim 21 wherein said authenticated survey rating service subsystem using data processors with further programmed functionality that:
  (a) transmits social media links to the customer with the normalized scores of calculated rating scores associated with responses from said customer to one or more marked questions on said first survey request or said second follow-up survey request.

23. The communication system according to claim 15 further comprising:
  one or more data entry terminals located on said home network for access to the hardware data processor, home agent or non-transitory storage devices on the home network.

24. The communication system according to claim 15 further comprising:
  a second hardware data processor coupled to said home network and said first non-transitory storage devices, said second hardware data processor facilitating communications to said home network through the Internet.

25. The communication system according to claim 15 wherein one or more of said selected personnel receive notification on a second mobile unit.

26. The communication system according to claim 15 wherein said notification to one or more selected personnel includes survey responses, customer name and service providers and service provided to customer.

27. The communication system of claim 15 wherein said first hardware data processor transmits a real-time notification to one or more predetermined personnel upon detection of the customer at the service location at a subsequent visit so that the customer experience during the subsequent visit to that location can be enhanced in some manner.

28. The communication system of claim 15 further comprising:
  a comments, suggestions and concerns service subsystem having data processors with programmed functionalities for:
    (a) initiation, implementation of filtering, and identification of responses and survey answers from the customer response service subsystem;
    (b) initiation, implementation, execution and operation of a comments, suggestions and concerns service based on one or more or the direct customer survey responses and the customer response service responses,
    said comments, suggestions and concerns are then received by the authenticated survey rating service subsystem and processed along with survey responses from the direct customer survey subsystem and the customer response service subsystem.

29. The communication system of claim 15 wherein said notification to aid predetermined personnel are transmitted by a phone call, text message, full text communications, webpage transmission, URL link, push message, and email transmission.

30. The communication system of claim 15 wherein said selected personnel can be specific members of companies, teams, users, or groups.

31. The communication system of claim 30 wherein said processors on the first hardware data processor have functionality that initiates said-comments, suggestions and concerns-service subsystem that provides a comments, suggestions and concerns platform for said customer at the mobile unit to enter comments, suggestions or concerns about the customer's experience, and said comments suggestions and concerns service subsystem transmits to the customer links to the comments, suggestions and concerns platform via webpage link, URL, text messages or email message.

32. The communication system of claim 15 wherein said processors on the first hardware data processor have functionality that populates data fields on a computer database maintained by a user, third party, team member, dealer or department when said notification is transmitted to said predetermined personnel, said data fields include identification and contact information related to said customer.

33. The communication system of claim 15 wherein said processors on the first hardware data processor have functionality that translates ratings of 0 to n stars based on normalized scores of calculated rating scores associated with responses from said customer to one or more marked questions on said first survey request or said second follow-up survey request, where n is an integer.

34. The communication system of claim 15 wherein said processors on the hardware data processor have functionality that transmits the normalized scores of calculated rating scores associated with responses from said customer to one or more marked questions on said first survey request or said second follow-up survey request to a website, electronic bulletin board, or chat room for posting.

35. The communication system of claim 15 wherein said processors on the first hardware data processor have functionality that transmits social media links to the customer with the normalized scores of calculated rating scores associated with responses from said customer to one or more marked questions on said first survey request or said second follow-up survey request.

36. A communication system supporting the processing of communications between a home network and one or more mobile units, comprising:
- a first hardware data processor on the home network coupled to a first mobile unit, said first hardware data processor having processors executing a plurality of customer service subsystems, said first hardware data processor detects that a customer is present at the service provider location upon a subsequent visit, said plurality of customer service subroutines including:
  - a direct customer survey subsystem using specialized data processors with programmed functionalities to:
    - (a) receive a first set of customer experience feedback responses provided by a customer using said first mobile unit in response to a first survey request;
    - (b) evaluate said customer experience feedback responses from said first survey request on a real-time basis in order to determine whether to issue real-time notifications to one or more predetermined personnel if the first set of customer experience feedback responses fail to satisfy a minimum predetermined standard,
    - (c) issue one or more real-time notifications to said predetermined personnel to notify those one or more predetermined personnel that the first set of customer experience feedback responses from said first survey request fail to satisfy a minimum predetermined standard,
    - (d) maintains and supports use of data, customer information, software modules and operational codes on the home network; and
    - (e) supports access of said reports by third parties involved with companies that have been given appropriate access to the reports;
  - a customer response service subsystem using data processors with programmed functionalities for:
    - (a) initiation, implementation of filtering, and identification of responses and survey answers from the direct customer survey subsystem for one or more customer experience feedback response;
    - (b) initiation, implementation, execution and operation of a customer response service based on responses to direct customer survey questions;
- a home agent on the home network coupled to said first hardware data processor, said home agent using data processors to execute operational subroutines to:
  - (a) control receipt of one or more communications from said first mobile unit,
  - (b) manage the processing and evaluation of said one or more communications;
  - (c) controls the transmission of said first survey request and said second follow-up survey request to said mobile unit;
  - (d) controls the receipt and routing of said first set of customer experience feedback responses from said first survey request from said mobile unit; and
  - (e) controls the transmission of real-time notifications to said predetermined personnel;
- a first non-transitory storage devices coupled to said home agent and first hardware data processor on said home network, said first non-transitory storage devices maintaining information related to the customer and personnel at the home network, said first non-transitory, storage devices having information regarding trends relating to customer experience feedback, and,
- a transceiver subsystem coupled to said home network through a first gateway providing a communications interface for communications between the home network and said first mobile unit, said transceiver subsystem receives and transmits communications between said home network and said mobile unit.

37. The communication system of claim 36 wherein said direct customer survey subsystem uses specialized data processors with further programmed functionalities to
  (a) receive a second set of customer experience feedback responses provided by said customer using said first mobile unit in response to a second follow-up survey request; and
  (b) evaluate said second set of customer experience feedback responses from said second follow-up survey request on a real-time basis in order to determine whether to issue real-time notifications to one or more predetermined personnel if the second set of customer experience feedback responses fail to satisfy a minimum predetermined standard, and
  (c) issue one or more real-time notifications to said predetermined personnel to notify those predetermined personnel that the second set of customer experience feedback responses from said second follow-up survey request fail to satisfy a minimum predetermined standard.

38. The communication system of claim 36 wherein said direct customer survey subsystem uses specialized data processors with further programmed functionalities that:
  (a) prepares and stores database reports on the first and second sets of customer experience feedback responses from said first survey request and said second follow-up survey request, respectively.

39. The communication system according to claim 36 further comprising:

one or more data entry terminals located on said home network for access to the hardware data processor, home agent or non-transitory storage devices unit on the home network.

40. The communication system according to claim 36 further comprising:
a second hardware data processor coupled to said home network and said first non-transitory storage devices, said second hardware data processor facilitating communications to said home network through the Internet.

41. The communication system according to claim 36 wherein one or more of said selected personnel receive notification on a second mobile unit.

42. The communication system according to claim 36 wherein said notification to one or more selected personnel includes survey responses, customer name and service providers and service provided to customer.

43. The communication system of claim 36 wherein said first hardware data processor transmits a real-time notification to one or more predetermined personnel upon detection of the customer at the service location at a subsequent visit so that the customer experience during the subsequent visit to that location can be enhanced in some manner.

44. The communication system of claim 36 wherein said comments suggestions and concerns service subsystem transmits to the customer links to the comments, suggestions and concerns platform via webpage link, URL, text messages or email message.

45. The communication system of claim 36 wherein said notification to said predetermined personnel are transmitted by a phone call, text message, full text communications, webpage transmission, URL link, push message, and email transmission.

46. The communication system of claim 36 wherein said selected personnel can be specific members of companies, teams, users, or groups.

47. The communication system of claim 36 further comprising:
a comments, suggestions and concerns service subsystem having data processors with programmed functionalities for:
  (a) initiation, implementation of filtering, and identification of responses and survey answers from the customer response service subsystem; and
  (b) initiation, implementation, execution and operation of a comments, suggestions and concerns service based on one or more or the direct customer survey responses and the customer response service responses.

48. The communication system of claim 36 wherein said processors on the first hardware data processor have functionality that populates data fields on a computer database maintained by, a user, third party, team member, dealer or department when said notification is transmitted to said predetermined personnel, said data fields include identification and contact information related to said customer.

49. The communication system of claim 36 wherein said processors on the first hardware data processor executing an authenticated survey rating service subsystem using data processors with programmed functionality that:
  (a) receives marked survey responses from the filtering and identification protocols from one or more of the direct customer survey subsystems, the customer response service subsystem, and the comments, suggestions and concerns service subsystem;
  (b) supports access of said reports by third parties involved with companies that have been given appropriate access to the reports;
  (c) populates data fields on a computer database maintained by a user, third party, team member, dealer or department when said notification is transmitted to said predetermined personnel, said data fields include identification and contact information related to said customer;
  (d) receives scores associated with responses from said customer to one or more marked questions on said first survey request or said second follow-up survey request, said one or more marked questions on said first survey request or said second follow-up survey request are designated in that manner by the user, team member or associate;
  (e) evaluates the scores associated with responses from said customer to one or more marked questions on said first survey request or said second follow-up survey request,
  (f) calculates a rating score based on the evaluation of the scores associated with responses from said customer to one or more marked questions on said first survey request or said second follow-up survey request; and,
  (g) normalizes the scores associated with responses from said customer to one or more marked questions on said first survey request or said second follow-up survey request
  (h) calculates an overall survey rating score from one or more customer; and
  (i) transmits the overall survey rating score to one or more of selected personnel, stakeholder, shareholders.

50. The communication system of claim 49 wherein said processors on the first hardware data processor have functionality that translates written statement responses into rating scores based on associated with responses from said customer to one or more marked questions on said first survey request or said second follow-up survey request.

51. The communication system of claim 49 wherein said processors on the first hardware data processor have functionality that translates ratings of 0 to n stars based on normalized scores of calculated rating scores associated with responses from said customer to one or more marked questions on said first survey request or said second follow-up survey request, where n is an integer.

52. The communication system of claim 49 wherein said processors on the first hardware data processor have functionality that transmits the normalized scores of calculated rating scores associated with responses from said customer to one or more marked questions on said first survey request or said second follow-up survey request to a website, electronic bulletin board, or chat room for posting.

53. The communication system of claim 49 wherein said processors on the first hardware data processor have functionality that transmits social media links to the customer with the normalized scores of calculated rating scores associated with responses from said customer to one or more marked questions on said first survey request or said second follow-up survey request.

* * * * *